United States Patent
Karabinis et al.

(10) Patent No.: US 12,495,354 B2
(45) Date of Patent: Dec. 9, 2025

(54) SYSTEMS/METHODS OF TRANSMISSION OVER A PLURALITY OF PATHS

(71) Applicant: ENK Wireless, Inc., Cary, NC (US)

(72) Inventors: Peter D. Karabinis, Cary, NC (US); Dimitrios P. Karabinis, Edmonds, WA (US)

(*) Notice: Subject to any disclaimer, the term of this patent is extended or adjusted under 35 U.S.C. 154(b) by 545 days.

(21) Appl. No.: 18/174,461

(22) Filed: Feb. 24, 2023

(65) Prior Publication Data

US 2023/0247538 A1 Aug. 3, 2023

Related U.S. Application Data

(60) Continuation of application No. 17/165,425, filed on Feb. 2, 2021, now Pat. No. 11,606,742, which is a
(Continued)

(51) Int. Cl.
*H04W 4/00* (2018.01)
*H04L 67/51* (2022.01)
(Continued)

(52) U.S. Cl.
CPC ............. *H04W 48/16* (2013.01); *H04L 67/51* (2022.05); *H04L 69/18* (2013.01); *H04W 40/32* (2013.01);
(Continued)

(58) Field of Classification Search
CPC ...... H04W 48/16; H04W 40/32; H04L 67/51; H04L 69/18
(Continued)

(56) References Cited

U.S. PATENT DOCUMENTS

| 4,631,734 A | 12/1986 | Foschini |
| 6,097,771 A | 8/2000 | Foschini |

(Continued)

FOREIGN PATENT DOCUMENTS

| CN | 102232828 A | 11/2011 |
| CN | 105657717 A | 6/2016 |

(Continued)

OTHER PUBLICATIONS

U.S. Patent and Trademark Office, "Non-Final Office Action," U.S. Appl. No. 18/166,830, filed Jun. 23, 2023, 10 pgs.
(Continued)

*Primary Examiner* — Temica M Beamer
(74) *Attorney, Agent, or Firm* — Carlson, Caspers, Vandenburgh, & Lindquist, P.A.

(57) ABSTRACT

Embodiments are disclosed wherein a plurality of transmission paths is identified and then used by a first system in transmitting information to a second system. According to some embodiments, the first system is configured to perform operations comprising: transmitting information to the second system by transmitting first data over a first transmission path of the plurality of transmission paths; transmitting information to the second system by transmitting second data over a second transmission path of the plurality of transmission paths; and causing the second system to aggregate the first data with the second data that is received thereat via the first transmission path and the second transmission path respectively.

20 Claims, 10 Drawing Sheets

Related U.S. Application Data continuation of application No. 17/082,907, filed on Oct. 28, 2020, now Pat. No. 11,601,872, which is a continuation of application No. 16/781,091, filed on Feb. 4, 2020, now Pat. No. 10,856,215, which is a division of application No. 16/385,608, filed on Apr. 16, 2019, now Pat. No. 10,595,267, which is a division of application No. 15/868,281, filed on Jan. 11, 2018, now Pat. No. 10,334,515.

(60) Provisional application No. 62/451,245, filed on Jan. 27, 2017, provisional application No. 62/445,929, filed on Jan. 13, 2017.

(51) Int. Cl.
| | | |
|---|---|---|
| *H04L 69/18* | (2022.01) | |
| *H04W 40/32* | (2009.01) | |
| *H04W 48/16* | (2009.01) | |
| *H04L 5/00* | (2006.01) | |
| *H04W 8/00* | (2009.01) | |
| *H04W 84/04* | (2009.01) | |
| *H04W 88/04* | (2009.01) | |

(52) U.S. Cl.
CPC .... *H04J 2211/005* (2013.01); *H04J 2211/006* (2013.01); *H04L 5/0007* (2013.01); *H04W 8/005* (2013.01); *H04W 84/047* (2013.01); *H04W 88/04* (2013.01)

(58) Field of Classification Search
USPC ...................................................... 455/434
See application file for complete search history.

(56) References Cited

U.S. PATENT DOCUMENTS

| | | | |
|---|---|---|---|
| 6,317,466 | B1 | 11/2001 | Foschini et al. |
| 6,763,073 | B2 | 7/2004 | Foschini et al. |
| 6,888,809 | B1 | 5/2005 | Foschini et al. |
| 6,973,843 | B2 | 12/2005 | Shyy et al. |
| 7,006,795 | B2 | 2/2006 | Foschini et al. |
| 7,050,510 | B2 | 5/2006 | Foschini et al. |
| 7,116,722 | B2 | 10/2006 | Foschini et al. |
| 7,155,229 | B2 | 12/2006 | Dent |
| 7,203,490 | B2 | 4/2007 | Karabinis et al. |
| 7,444,170 | B2 | 10/2008 | Karabinis |
| 7,831,201 | B2 | 11/2010 | Karabinis |
| 7,848,774 | B2 | 12/2010 | Park |
| 8,018,907 | B2 | 9/2011 | Kubler et al. |
| 8,108,004 | B2 | 1/2012 | Karabinis |
| 8,170,474 | B2 | 5/2012 | Karabinis et al. |
| 8,340,592 | B2 | 12/2012 | Karabinis |
| 9,232,406 | B2 | 1/2016 | Karabinis |
| 9,264,991 | B1 | 2/2016 | Vleugels et al. |
| 9,338,690 | B2 | 5/2016 | Torsner et al. |
| 10,057,385 | B1 | 8/2018 | Nguyen et al. |
| 10,136,470 | B2 | 11/2018 | Cook |
| 10,159,097 | B2 | 12/2018 | Ji et al. |
| 10,181,985 | B1 | 1/2019 | Passaglia et al. |
| 10,334,515 | B2 | 6/2019 | Karabinis |
| 10,375,730 | B2 | 8/2019 | Kim et al. |
| 10,477,457 | B2 | 11/2019 | Park et al. |
| 10,548,068 | B2 | 1/2020 | Lee et al. |
| 10,555,321 | B2 | 2/2020 | Andou et al. |
| 10,595,267 | B2 | 3/2020 | Karabinis |
| 10,638,484 | B2 | 4/2020 | Seo et al. |
| 10,749,644 | B2 | 8/2020 | Islam et al. |
| 10,791,562 | B2 | 9/2020 | Ryoo et al. |
| 10,856,215 | B2 | 12/2020 | Karabinis |
| 10,880,032 | B2 | 12/2020 | Yi et al. |
| 10,893,518 | B2 | 1/2021 | Shen et al. |
| 10,904,830 | B2 | 1/2021 | Yi et al. |
| 10,925,033 | B2 | 2/2021 | Wang et al. |
| 10,944,450 | B2 | 3/2021 | Park et al. |
| 10,958,384 | B2 | 3/2021 | Hwang et al. |
| 10,966,228 | B2 | 3/2021 | Park et al. |
| 10,979,265 | B2 | 4/2021 | Yi et al. |
| 11,012,963 | B2 | 5/2021 | Ren et al. |
| 11,026,199 | B2 | 6/2021 | Nam et al. |
| 11,050,599 | B2 | 6/2021 | Zhang et al. |
| 11,071,172 | B2 | 7/2021 | He et al. |
| 11,076,365 | B2 | 7/2021 | Kim et al. |
| 11,095,412 | B2 | 8/2021 | Dou et al. |
| 11,139,937 | B2 | 10/2021 | Kim et al. |
| 11,140,640 | B2 | 10/2021 | Tooher et al. |
| 11,160,051 | B2 | 10/2021 | Park et al. |
| 11,219,036 | B2 | 1/2022 | Yi et al. |
| 11,284,439 | B2 | 3/2022 | Yi et al. |
| 11,316,643 | B2 | 4/2022 | Yang |
| 11,317,397 | B2 | 4/2022 | Yi et al. |
| 11,329,779 | B2 | 5/2022 | Qin et al. |
| 11,363,548 | B2 | 6/2022 | Kim et al. |
| 11,419,115 | B2 | 8/2022 | Xue et al. |
| 11,576,165 | B2 | 2/2023 | Ryu et al. |
| 11,601,872 | B2 | 3/2023 | Karabinis |
| 11,658,788 | B2 | 5/2023 | Cao et al. |
| 11,664,942 | B2 | 5/2023 | Chou et al. |
| 11,765,646 | B2 | 9/2023 | Karabinis |
| 11,818,703 | B2 | 11/2023 | Yi et al. |
| 11,838,244 | B2 | 12/2023 | Pelletier et al. |
| 11,849,445 | B2 | 12/2023 | Ryoo et al. |
| 11,877,230 | B2 | 1/2024 | Park et al. |
| 11,889,408 | B2 | 1/2024 | Karabinis |
| 11,974,217 | B1 | 4/2024 | Karabinis |
| 12,015,569 | B2 | 6/2024 | Luo et al. |
| 12,057,981 | B2 | 8/2024 | Park et al. |
| 12,069,694 | B2 | 8/2024 | Adjakple et al. |
| 2004/0264592 | A1 | 12/2004 | Sibecas et al. |
| 2006/0176271 | A1 | 8/2006 | Polivy et al. |
| 2006/0226991 | A1 | 10/2006 | Rivas |
| 2007/0047678 | A1 | 3/2007 | Sibecas et al. |
| 2008/0031370 | A1 | 2/2008 | Guey et al. |
| 2008/0246629 | A1 | 10/2008 | Tsui et al. |
| 2009/0168730 | A1 | 7/2009 | Baum et al. |
| 2009/0190926 | A1 | 7/2009 | Charlet et al. |
| 2009/0224983 | A1 | 9/2009 | Laroia et al. |
| 2009/0285173 | A1 | 11/2009 | Koorapaty et al. |
| 2010/0111097 | A1 | 5/2010 | Karabinis et al. |
| 2010/0135445 | A1 | 6/2010 | Sari |
| 2010/0195566 | A1 | 8/2010 | Krishnamurthy et al. |
| 2012/0170533 | A1 | 7/2012 | Ahn et al. |
| 2012/0258715 | A1 | 10/2012 | Souissi et al. |
| 2012/0275378 | A1 | 11/2012 | Lee |
| 2012/0316414 | A1 | 12/2012 | Greene |
| 2013/0135988 | A1* | 5/2013 | Kim .................. H04L 1/1887 370/216 |
| 2013/0223294 | A1 | 8/2013 | Karjalainen et al. |
| 2013/0279614 | A1 | 10/2013 | Walton et al. |
| 2014/0006496 | A1 | 1/2014 | Dearman et al. |
| 2014/0010149 | A1 | 1/2014 | Cook |
| 2014/0029485 | A1 | 1/2014 | Bowman et al. |
| 2014/0081087 | A1 | 3/2014 | Yu |
| 2014/0086120 | A1* | 3/2014 | Mishra ................ H04W 24/02 370/310 |
| 2014/0148138 | A1 | 5/2014 | Chou |
| 2014/0249937 | A1 | 9/2014 | McNally |
| 2014/0293890 | A1 | 10/2014 | Davydov et al. |
| 2014/0295766 | A1 | 10/2014 | Matsumoto et al. |
| 2014/0328313 | A1 | 11/2014 | Merlin et al. |
| 2014/0355591 | A1 | 12/2014 | Oh et al. |
| 2015/0054654 | A1 | 2/2015 | Albinali |
| 2015/0072622 | A1 | 3/2015 | Hwang |
| 2015/0085737 | A1 | 3/2015 | Han et al. |
| 2015/0163853 | A1* | 6/2015 | In ........................ H04L 69/14 455/73 |
| 2015/0180549 | A1 | 6/2015 | Nagasaki |
| 2015/0264677 | A1 | 9/2015 | He et al. |
| 2015/0382277 | A1* | 12/2015 | Ljung .................. H04W 40/12 455/445 |
| 2016/0081064 | A1 | 3/2016 | Kwak et al. |
| 2016/0087766 | A1 | 3/2016 | Sun et al. |

(56) References Cited

U.S. PATENT DOCUMENTS

| | | | |
|---|---|---|---|
| 2016/0119739 A1* | 4/2016 | Hampel | H04W 4/70 370/329 |
| 2016/0219424 A1 | 7/2016 | Xu | |
| 2016/0269930 A1 | 9/2016 | Huang et al. | |
| 2016/0286340 A1 | 9/2016 | Zhu | |
| 2017/0010666 A1 | 1/2017 | Tanaka et al. | |
| 2017/0126459 A1 | 5/2017 | Dutronc et al. | |
| 2017/0169693 A1 | 6/2017 | Obaidi et al. | |
| 2017/0318563 A1 | 11/2017 | Yang et al. | |
| 2017/0338978 A1 | 11/2017 | Monsen | |
| 2018/0054724 A1 | 2/2018 | Cariou et al. | |
| 2018/0077708 A1 | 3/2018 | Lepp et al. | |
| 2018/0159958 A1 | 6/2018 | Olive et al. | |
| 2018/0176937 A1 | 6/2018 | Chen et al. | |
| 2018/0218220 A1 | 8/2018 | Jung et al. | |
| 2018/0234869 A1 | 8/2018 | Sirotkin et al. | |
| 2019/0341993 A1 | 11/2019 | Karabinis | |
| 2019/0342901 A1 | 11/2019 | Karabinis | |
| 2019/0364558 A1 | 11/2019 | Kim et al. | |
| 2020/0067513 A1 | 2/2020 | Dgani et al. | |
| 2020/0074857 A1 | 3/2020 | Karabinis | |
| 2021/0345263 A1 | 11/2021 | Tooher et al. | |
| 2022/0039094 A1 | 2/2022 | Lee et al. | |
| 2022/0095385 A1 | 3/2022 | Yi et al. | |
| 2023/0118032 A1 | 4/2023 | Chou et al. | |
| 2023/0171676 A1 | 6/2023 | Park et al. | |
| 2023/0179341 A1 | 6/2023 | Marinier et al. | |
| 2024/0056276 A1 | 2/2024 | Pelletier et al. | |
| 2024/0073914 A1 | 2/2024 | Haghighat et al. | |
| 2024/0138011 A1 | 4/2024 | Deenoo et al. | |
| 2024/0196314 A1 | 6/2024 | Karabinis | |
| 2024/0205804 A1 | 6/2024 | Karabinis | |
| 2024/0205982 A1 | 6/2024 | Liu et al. | |

FOREIGN PATENT DOCUMENTS

| | | |
|---|---|---|
| EP | 2091218 A1 | 8/2009 |
| EP | 3520525 B1 | 8/2019 |
| EP | 3547591 A1 | 10/2019 |
| EP | 3829099 A1 | 6/2021 |
| WO | 2010053841 A1 | 5/2010 |
| WO | 2015114420 A1 | 8/2015 |
| WO | 2016127551 A1 | 8/2016 |
| WO | 2018084544 A1 | 5/2018 |
| WO | 2018085145 A1 | 5/2018 |
| WO | 2018128427 A1 | 7/2018 |
| WO | 2018128440 A1 | 7/2018 |
| WO | 2018133700 A1 | 7/2018 |

OTHER PUBLICATIONS

U.S. Patent and Trademark Office, "Non-Final Office Action," U.S. Appl. No. 18/172,067, filed Jun. 23, 2023, 6 pgs.
U.S. Patent and Trademark Office, "Notice of Allowance and Fees Due," U.S. Appl. No. 17/443,710, filed Mar. 30, 2023, 16 pgs.
T. Kim et al., "Evolution of Power Saving Technologies for 5G New Radio," in IEEE Access, vol. 8, pp. 198912-198924, 2020, doi: 10.1109/ACCESS.2020.3035186.
Bandwidth adaptation in NR, Agenda Item 5.1.8, InterDigital Communications, 3GPP Tsg Ran WG1 Nr Ad-Hoc Meeting, Spokane, USA, Jan. 16 - 20, 2017, 5 pgs.
Huawei, HiSilicon, Mechanisms of bandwidth adaptation, Agenda Item: 5.1.3, 3GPP Tsg Ran WG1 Nr Ad Hoc Meeting, R1-1700011, Spokane, USA, Jan. 16 - 20, 2017, 5 pgs.
Intel Corporation, On the bandwidth adaptation for NR, Agenda item: 5.1.3.1, 3GPP Tsg-Ran WG1 Nr Ad-Hoc Meeting, R1-1700362, Spokane, USA, Jan. 16- 20, 2017, 3 pgs.
LG Electronics, Further discussion on bandwidth adaptation, 3GPP Tsg Ran WG1 Meeting NR-AH1, R1-1700497, Spokane, USA, Jan. 16 - 20, 2017, 5 pgs.
LS on Ue Rf Bandwidth Adaptation in Nr, 3GPP Tsg-Ran WG1 Meeting #87, R1-1613663, Reno, USA, Nov. 14 - 18, 2016, 1 pg.
MCC Support, Final Report of 3GPP Tsg Ran WG1 #86bis v1.0.0 (Lisbon, Portugal, Oct. 10 - 14, 2016), 3GPP Tsg Ran WG1 Meeting #87, R1-1611081, Reno, USA, Nov. 14 - 18, 2016, 160 pgs.
Mediatek et al., Way Forward on bandwidth adaptation in NR, Agenda item 8.1.2.2, 3GPP Tsg-Ran WG1 #86bis Lisbon, Portugal, Oct. 10 - 14, 2016, 3 pgs.
Mediatek et al., Way Forward on bandwidth adaptation in NR, Agenda item 8.1.2.2, 3GPP Tsg-Ran WG1 #86bis Lisbon, R1-1611041, Portugal, Oct. 10 - 14, 2016, 4 pgs.
U.S. Patent and Trademark Office, "Non-Final Office Action," U.S. Appl. No. 18/308,356, filed Mar. 28, 2024, 9 pgs.
U.S. Patent and Trademark Office, "Non-Final Office Action," U.S. Appl. No. 18/396,894, filed Apr. 9, 2024, 14 pgs.
U.S. Patent and Trademark Office, "Non-Final Office Action," U.S. Appl. No. 18/363,781, filed May 7, 2024, 9 pgs.
U.S. Patent and Trademark Office, "Non-Final Office Action," U.S. Appl. No. 18/587,798, filed May 7, 2024, 9 pgs.
U.S. Patent and Trademark Office, "Notice of Allowance and Fees Due," U.S. Appl. No. 18/396,894, filed Apr. 30, 2024, 6 pgs.
"5G Radio Access" Ericsson White Paper, Ericsson AB (10 pages) (Apr. 2016).
Foschini et al., "On Limits of Wireless Communications in a Fading Environment when Using Multiple Antennas" Wireless Personal Communications 6:311-335 (1998).
Foschini, Gerard J. "Layered Space-Time Architecture for Wireless Communication in a Fading Environment When Using Multi-Element Antennas" Bell Labs Technical Journal 1(2):41-59 (1996).
Golden et al., "V-BLAST: A High Capacity Space-Time Architecture for the Rich-Scattering Wireless Channel" Bell Laboratories (18 pages) (1998).
Karabinis, Peter D. "Maximum-Power and Amplitude-Equalizing Algorithms for Phase Control in Space Diversity Combining" The Bell System Technical Journal 62(1):63-89 (Jan. 1983).
Sharma et al., "A Review on Bell Labs Layered Space Time Architecture (V-BLAST)" International Journal for Advance Research in Engineering and Technology 2(IV):147-154 (Apr. 2014).
U.S. Patent and Trademark Office, "Final Office Action," U.S. Appl. No. 17/082,907, Nov. 30, 2022, 10 pgs.
U.S. Patent and Trademark Office, "Non-Final Office Action," U.S. Appl. No. 17/081,357, Mar. 23, 2022, 6 pgs.
U.S. Patent and Trademark Office, "Non-Final Office Action," U.S. Appl. No. 17/082,907, Aug. 3, 2022, 11 pgs.
U.S. Patent and Trademark Office, "Non-Final Office Action," U.S. Appl. No. 17/165,425, Oct. 20, 2022, 7 pgs.
U.S. Patent and Trademark Office, "Non-Final Office Action," U.S. Appl. No. 17/659,796, Jan. 20, 2023, 6 pgs.
U.S. Patent and Trademark Office, "Notice of Allowance and Fees Due," U.S. Appl. No. 17/081,357, Apr. 19, 2022, 6 pgs.
U.S. Patent and Trademark Office, "Notice of Allowance and Fees Due," U.S. Appl. No. 17/081,357, Jan. 6, 2023, 5 pgs.
U.S. Patent and Trademark Office, "Notice of Allowance and Fees Due," U.S. Appl. No. 17/082,907, Jan. 6, 2023, 5 pgs.
U.S. Patent and Trademark Office, "Notice of Allowance and Fees Due," U.S. Appl. No. 17/165,425, Dec. 7, 2022, 12 pgs.
U.S. Patent and Trademark Office, "Notice of Allowance and Fees Due," U.S. Appl. No. 17/659,796, Feb. 9, 2023, 5 pgs.
Wolniansky et al., "V-BLAST: An Architecture for Realizing Very High Data Rates Over the Rich-Scattering Wireless Channel" 1998 URSI International Symposium on Signals, Systems, and Electronics. Conference Proceedings (Cat. No. 98EX167) (6 pages) (1998).
Zacarias et al., "BLAST Architectures" S-72.333 Postgraduate Course in Radio Communications (6 pages) (2004).
U.S. Patent and Trademark Office, "Non-Final Office Action," U.S. Appl. No. 18/396,894, Feb. 28, 2024, 7 pgs.
R1-1610652, Slides, "WF on symbol level alignment," Agenda Item 8.1.2.1, Source LG Electronics et al., 3GPP TSG RAN WG1 Meeting #86bis, Lisbon, Portugal, Oct. 10-14, 2016, 4 pgs.
R1-1610789, Slides, "WF on Using Scaled Numerology for DL Control," Agenda Item 8.1.7.1, Source Qualcomm, ZTE, 3GPP TSG RAN WG1 Meeting #86bis, Lisbon, Portugal, Oct. 10-14, 2016, 5 pgs.

(56) References Cited

OTHER PUBLICATIONS

R1-1610883, Slides, "WF on Using Scaled Numerology for Control Transmission," Agenda Item 8.1.7.1, Source Qualcomm et al., 3GPP TSG RAN WG1 Meeting #86bis, Lisbon, Portugal, Oct. 10-14, 2016, 5 pgs.
R1-1610960, Slides, "WF on RACH Preamble," Agenda Item 8.1.5.2, Source NTT Docomo et al., 3GPP TSG RAN WG1 Meeting #86bis, Lisbon, Portugal, Oct. 10-14, 2016, 2 pgs.
R1-1610999, Slides, "WF on UL Power Control," Agenda Item 8.1.4.5, Source Huawei et al., 3GPP TSG RAN WG1 Meeting #86bis, Lisbon, Portugal, Oct. 10-14, 2016, 2 pgs.
R1-1611040, "Offline outcome of Thursday afternoon on 8.1.2," Agenda Item 8.1.2, Source NTT Docomo, Inc., 3GPP TSG RAN WG1 Meeting #86bis, Lisbon, Portugal, Oct. 10-14, 2016, 4 pgs.
R1-1611060, "Offline Outcome of Friday Morning," Agenda Item 8.1.2, Source NTT Docomo, Inc., 3GPP TSG RAN WG1 Meeting #86bis, Lisbon, Portugal, Oct. 10-14, 2016, 2 pgs.
R1-1611655, "Mechanisms of bandwidth adaptation for control and data reception in single-carrier and multi-carrier cases," Agenda Item 7.1.1, Source Huawei and HiSilicon, 3GPP TSG RAN WG1 Meeting #87, Reno, USA, Nov. 14-18, 2016, 4 pgs.
R1-1611838, "Discussion on Dynamic Bandwidth Adaptation," Agenda Item 7.1.4.1, Source LG Electronics, 3GPP TSG RAN WG1 Meeting #87, Reno, USA, Nov. 14-18, 2016, 4 pgs.
R1-1612119, "On UE-specific Bandwidth Adaptation for Single Carrier Operation," Agenda Item 7.1.1, Source MediaTek Inc., 3GPP TSG RAN WG1 Meeting #87, Reno, USA, Nov. 14-18, 2016, 5 pgs.
R1-1612315, "Bandwidth adaptation in NR," Agenda Item 7.1.4.3, Source InterDigital Communications, 3GPP TSG-RAN WG1 #87, Reno, USA, Nov. 14-18, 2016, 5 pgs.
R1-1612439, "Bandwidth adaption for UE power saving," Agenda Item, 7.1.1, Source Samsung, Reno, USA, Nov. 14-18, 2016, 2 pgs.
R1-1613218, Slides, Way Forward on UE Bandwidth adaptation in NR, Agenda Item 7.1.4, Source MediaTek et al., 3GPP TSG-RAN WG1 #87, Reno, USA, Nov. 14-18, 2016, 5 pgs.
R1-1613663, "LS on UE RF Bandwidth Adaption in NR," Source Ran WG1, 3GPP TSG-RAN WG1 Meeting #87, Reno, USA, Nov. 14-18, 2016, 1 pg.
U.S. Patent and Trademark Office, "Non-Final Office Action," U.S. Appl. No. 19/170,606, dated May 12, 2025, 13 pages.
U.S. Appl. No. 62/373,089, filed Aug. 10, 2016.
U.S. Appl. No. 62/374,106, filed Aug. 12, 2016.
U.S. Appl. No. 62/400,950, filed Sep. 28, 2016.
U.S. Appl. No. 62/412,024, filed Oct. 24, 2016.
U.S. Appl. No. 62/416,235, filed Nov. 2, 2016.
U.S. Appl. No. 62/420,462, filed Nov. 10, 2016.
U.S. Appl. No. 62/420,588, filed Nov. 11, 2016.
U.S. Appl. No. 62/425,369, filed Nov. 22, 2016 (with English translation).
U.S. Appl. No. 62/439,434, filed Dec. 27, 2016.
U.S. Appl. No. 62/440,262, filed Dec. 29, 2016.
U.S. Appl. No. 62/442,093, filed Jan. 4, 2017.
U.S. Appl. No. 62/442,237, filed Jan. 4, 2017.
U.S. Appl. No. 62/444,198, filed Jan. 9, 2017.
United States Patent and Trademark Office, "Non-Final Office Action", U.S. Appl. No. 18/955,340, Feb. 21, 2025, 8 pgs.
X. Zhu, S. Han, P.-C. Huang, A. K. Mok and D. Chen, "MBStar: A Real-time Communication Protocol for Wireless Body Area Networks," 2011 23rd Euromicro Conference on Real-Time Systems, Porto, Portugal, 2011, pp. 57-66, doi: 10.1109/ECRTS.2011.14.
U.S. Patent and Trademark Office, "Non-Final Office Action," U.S. Appl. No. 18/363,909, Jun. 20, 2024, 7 pgs.
U.S. Patent and Trademark Office, "Notice of Allowance and Fees Due," U.S. Appl. No. 18/587,798, Jun. 27, 2024, 8 pgs.
U.S. Patent and Trademark Office, "Notice of Allowance and Fees Due," U.S. Appl. No. 18/172,067, Jan. 24, 2024, 6 pgs.
U.S. Patent and Trademark Office, "Notice of Allowance and Fees Due," U.S. Appl. No. 18/166,830, Jul. 26, 2023, 7 pgs.
U.S. Patent and Trademark Office, "Notice of Allowance and Fees Due," U.S. Appl. No. 18/172,067, Jul. 25, 2023, 5 pgs.
U.S. Patent and Trademark Office, "Non-Final Office Action," U.S. Appl. No. 18/594,718, Apr. 24, 2024, 11 pgs.
U.S. Patent and Trademark Office, "Notice of Allowance and Fee(s) Due," U.S. Appl. No. 18/397,042, Mar. 15, 2024, 10 pgs.
U.S. Patent and Trademark Office, "Non-Final Office Action," U.S. Appl. No. 18/295,820, Aug. 14, 2024, 12 pgs.
U.S. Patent and Trademark Office, "Non-Final Office Action," U.S. Appl. No. 18/308,471, Aug. 14, 2024, 11 pgs.
U.S. Patent and Trademark Office, "Non-Final Office Action," U.S. Appl. No. 18/172,067, Dec. 8, 2023, 15 pgs.
U.S. Patent and Trademark Office, "Non-Final Office Action," U.S. Appl. No. 18/308,356, Dec. 21, 2023, 7 pgs.
U.S. Patent and Trademark Office, "Notice of Allowance and Fee(s) Due," U.S. Appl. No. 18/467,796, Dec. 13, 2023, 8 pgs.
U.S. Patent and Trademark Office, "Notice of Allowance and Fees Due," U.S. Appl. No. 18/308,356, May 8, 2024, 5 pgs.
U.S. Patent and Trademark Office, "Notice of Allowance and Fees Due," U.S. Appl. No. 18/594,718, May 21, 2024, 7 pgs.
U.S. Patent and Trademark Office, "Non-Final Office Action," U.S. Appl. No. 18/467,796, Nov. 14, 2023, 16 pgs.
Bhandari, S.; Moh, S. A Priority-Based Adaptive MAC Protocol for Wireless Body Area Networks. Sensors 2016, 16, 401. https://doi.org/10.3390/s16030401.
Gomez, C.; Oller, J.; Paradells, J. Overview and Evaluation of Bluetooth Low Energy: An Emerging Low-Power Wireless Technology. Sensors Dec. 2012, 11734-11753. https://doi.org/10.3390/s120911734.
Laya, A.; Alonso, L.; Alonso-Zarate, J.; Chatzimisios, P.; Reliable Machine-to-Machine Multicast Services with Multi-Radio Cooperative Retransmissions. Mobile Networks and Applications manuscript. Retrieved from https://upcommons.upc.edu/bitstream/handle/2117/79432/MultiradioMONE-D.pdf. Retrieved on Feb. 17, 2025.
Otto, C.; Milenkovix, A.; Sanders, C.; Jovanov, E.; System Architecture of a Wireless Body Area Sensor Network for Ubiquitous Health Monitoring. Journal of Mobile Multimedia, Vo. 1, No. 4 (2006) 307-326, Retrieved from https://alexmilenkovich.github.io/publications/files/coamej_jmm06.pdf.
R1-1608710, "Frame Structure for Ultra-Low Latency Scheduled-based UL Access," Agenda Item 8.1.2.2, Source Idaho National Laboratory, 3GPP TSG RAN WG1 Meeting #86bis, Lisbon, Portugal, Oct. 10-14, 2016, 5 pgs.
R1-1608759, "Discussion of NR Numerology," Agenda Item 8.1.2.1, Source CATT, 3GPP TSG RAN WG1 Meeting #86bis, Lisbon, Portugal, Oct. 10-14, 2016, 5 pgs.
R1-1608783, "NR Numerology Agnostic Synchronization Channel Design," Agenda Item 8.1.5.1, Source CATT, 3GPP TSG RAN WG1 #86bis, Lisbon, Portugal, Oct. 10-14, 2016, 3 pgs.
R1-1608807, "TDD frame structure with mixed numerology," Agenda Item 8.1.2.2, Source Fujitsu, 3GPP TSG RAN WG1 Meeting #86bis, Lisbon, Portugal, Oct. 10-14, 2016, 4 pgs.
R1-1608920, "Discussion on numerology of NR," Agenda Item 8.1.2.1, Source Spreadtrum Communications, 3GPP TSG RAN WG1 Meeting #86bis, Lisbon, Portugal, Oct. 10-14, 2016, 4 pgs.
R1-1608961, "Reference numerology for NR," Agenda Item 8.1.2.1, Source ZTE and ZTE Microelectronics, 3GPP TSG RAN WG1 Meeting #86bis, Lisbon, Portugal, Oct. 10-14, 2016, 6 pgs.
R1-1608963, "About RB grid definition and Handling Inter-numerology Interference in NR," Agenda Item 8.1.2.1, Source ZTE and ZTE Microelectronics, 3GPP TSG RAN WG1 Meeting #86bis, Lisbon, Portugal, Oct. 10-14, 2016, 8 pgs.
R1-1609045, "RB grid for mixed numerology," Agenda Item 8.1.2.1, Source Samsung, 3GPP TSG RAN WG1 #86bis, Lisbon, Portugal, Oct. 10-14, 2016, 3 pgs.
R1-1609050, "Numerology for URLLC," Agenda Item 8.1.2.1, Source Samsung, 3GPP TSG RAN WG1 Meeting #86bis, Lisbon, Portugal, Oct. 10-14, 2016, 4 pgs.
R1-1609112, "Numerology for NR synchronization signal," Agenda Item 8.1.5.1, Source Samsung, 3GPP TSG RAN WG1 Meeting #86bis, Lisbon, Portugal, Oc. 10-14, 2016, 4 pgs.

(56) References Cited

OTHER PUBLICATIONS

R1-1609145, "Discussion on numerology multiplexing for supporting different service requirements," Agenda Item 8.1.2.2, Source NEC, 3GPP TSG RAN WG1 Meeting #86bis, Lisbon, Portugal, Oct. 10-14, 2016, 3 pgs.
R1-1609146, "Discussion on numerology of synchronization signals," Agenda Item 8.1.5.1, Source NEC, 3GPP TSG RAN WG1 Meeting #86bis, Lisbon, Portugal, Oct. 10-14, 2016, 2 pgs.
R1-1609153, "Discussion on PSS.SSS.PBCH in numerology multiplexing," Agenda Item 8.1.2.1, Source NEC, 3GPP TSG RAN WG1 Meeting #86bis, Lisbon, Portugal, Oct. 10-14, 2016, 2 pgs.
R1-1609265, "Numerology for NR Synchronization Signal," Agenda Item 8.1.5.1, Source LG Electronics, 3GPP TSG RAN WG1 Meeting #86bis, Lisbon, Portugal, Oct. 10-14, 2016, 7 pgs.
R1-1609273, "Overall structure of DL Control Transmission for NR," Agenda item 8.1.7.1, Source LG Electronics, 3GPP TSG RAN WG1 Meeting #86bis, Lisbon, Portugal, Oct. 10-14, 2016, 5 pgs.
R1-1609302, "Discussion on High Mobility Numerology and RS Design," Agenda Item 8.1.2.1, Source Cmcc, 3GPP TSG RAN WG1 Meeting #86bis, Lisbon, Portugal, Oct. 10-14, 2016, 4 pgs.
R1-1609425, "Discussion on UE behavior on mixed numerology carrier," Agenda Item 8.1.2.1, Source Huawei, HiSilicon, 3GPP TSG RAN WG1 Meeting #86bis, Lisbon, Portugal, Oct. 10-14, 2016, 4 pgs.
R1-1609428, "Numerology for 70 GHz and above," Agenda Item 8.1.2.1, Source Huawei, HiSilicon, 3GPP TSG RAN WG1 Meeting #86bis, Lisbon, Portugal, Oct. 10-14, 2016, 6 pgs.
R1-1609503, "NR Reference numerology and time alignment," Agenda Item 8.1.2.1, Source Intel Corporation, 3GPP TSG RAN WG1 Meeting #86b, Lisbon, Portugal, Oct. 10-14, 2016, 4 pgs.
R1-1609504, "Slot and mini-slot numerology and alignment," Agenda Item 8.1.2.1, Source Intel Corporation, 3GPP TSG RAN WG1 Meeting #86bis, Lisbon, Portugal, Oct. 10-14, 2016, 4 pgs.
R1-1609659, "Guard Band Arrangement Supporting Mixed Numerology," Agenda Item 8.1.2.1, Source Nokia, Alcatel-Lucent Shanghai Bell, 3GPP TSG RAN WG1 #86bis, Lisbon, Portugal, Oct. 10-14, 2016, 4 pgs.
R1-1609660, "Intra-carrier Sub-band for mixed numerology," Agenda Item 8.1.2.1, Source Nokia, Alcatel-Lucent Shanghai Bell, 3GPP TSG RAN WG1 Meeting #86bis, Lisbon, Portugal, Oct. 10-14, 2016, 3 pgs.
R1-1609676, "MBSFN reference signal design," Agenda Item AI 7.2.4.2, Source Ericsson, 3GPP TSG WG1 Meeting #86, Lisbon, Portugal, Oct. 10-14, 2016, 3 pgs.
R1-1609698, "Remaining numerology related aspects," Agenda Item 8.1.2.1, Source Panasonic, 3GPP TSG RAN WG1 Meeting #86bis, Lisbon, Portugal, Oct. 10-14, 2016, 3 pgs.
R1-1609875, "Numerology for DL synchronization signal in NR," Agenda Item 8.1.5.1, Source Sharp, 3GPP TSG RAN WG1 Meeting #86bis, Lisbon, Portugal, Oct. 10-14, 2016, 4 pgs.
R1-1609876, "Numerology for PRACH Preamble in NR," Agenda Item 8.1.5.2, Source Sharp, 3GPP TSG RAN WG1 Meeting #86bis, Lisbon, Portugal, Oct. 10-14, 2016, 3 pgs.
R1-1609919, "Flexible Frame Structure and Control Signaling for NR," Agenda Item 8.1.2.2, Source Motorola Mobility, 3GPP TSG RAN WG1 #86bis, Lisbon, Portugal, Oct. 10-14, 2016, 4 pgs.
R1-1609978, "Design Options for Longer Cyclic Prefix and Link Level Simulation Results," Agenda Item 7.2.4.1, Source Qualcomm Inc., 3GPP TSG RAN WG1 #86bis, Lisbon, Portugal, Oct. 10-14, 2016, 7 pgs.
R1-1609979, "RS Pattern for Longer CP," Agenda Item 7.2.4.2, Source Qualcomm Inc., 3GPP TSG RAN WG1 #86b, Lisbon, Portugal, Oct. 10-14, 2016, 9 pgs.
R1-1610080, "Remaining numerology aspects," Agenda Item 8.1.2.1, Source NTT Docomo, Inc., 3GPP TSG RAN WG1 Meeting #86bis, Lisbon, Portugal, Oct. 10-14, 2016, 4 pgs.
R1-1610123, "URLLC numerology and frame structure design," Agenda Item 8.1.2.1, Source Qualcomm Inc., 3GPP TSG RAN WG1 #86bis, Lisbon, Portugal, Oct. 10-14, 2016, 10 pgs.
R1-1610125, "NR RB Size Design: 16 vs 12," Agenda Item 8.1.2.1, Source Qualcomm Inc., 3GPP TSG RAN WG1 #86bis, Lisbon, Portugal, Oct. 10-14, 2016, 9 pgs.
R1-1610126, "Scaled CP vs ECP delay spread Doppler and SNR tradeoff study," Agenda Item 8.1.2.1, Source Qualcomm, 3GPP TSG RAN WG1 Meeting #86bis, Lisbon, Portugal, Oct. 10-14, 2016, 10 pgs.
R1-1610127, "Numerology tradeoff case study," Agenda Item 8.1.2.1, Source Qualcomm, 3GPP TSG RAN WG1 Meeting #86bis, Lisbon, Portugal, Oct. 10-14, 2016, 9 pgs.
R1-1610129, "Summary of 86-19 discussion on slot structure use cases," Agenda Item 8.1.2.2, Source Qualcomm Inc., 3GPP TSG RAN WG1 Meeting #86bis, Lisbon Portugal, Oct. 10-14, 2016, 20 pgs.
R1-1610130, "Scaled Numerology Control Design for NR," Agenda Item 8.1.2.2, Source Qualcomm Inc., 3GPP TSG RAN WG1 #86-BIS, Lisbon, Portugal, Oct. 10-14, 2016, 10 pgs.
R1-1610131, "NR numerology scaling and alignment," Agenda Item 8.1.2.2, Source Qualcomm Inc., 3GPP TSG RAN WG1 #86-BIS, Lisbon, Portugal, Oct. 10-14, 2016, 5 pgs.
R1-1610156, "Single beam SYNC design," Agenda Item 8.1.5.1, Source Qualcomm Inc., 3GPP TSG RAN WG1 #86b, Lisbon, Portugal, Sep. 10-14, 2016, 6 pgs.
R1-1610286, "Numerology for NR Synchronization Signals," Agenda Item 8.1.5.1, Source Nokia, Alcatel-Lucent Shanghai Bell, 3GPP TSG RAN WG1 #86bis, Lisbon, Portugal, Oct. 10-14, 2016, 4 pgs.
R1-1610300, "CP length for NR," Agenda Item 8.1.2.1, Source Vodafone Group PLC Orange, 3GPP TSG RAN WG1 Meeting #86bis, Lisbon, Portugal, Oct. 10-14, 2016, 3 pgs.
R1-1610310, "eMBMS RS Design Considerations," Agenda Item 7.2.4.2, Source Nokia et al., 3GPP TSG RAN WG1 Meeting #86-bis, Lisbon, Portugal, Oct. 10-14, 2016, 5 pgs.
R1-1610426, "Numerology design and link-level simulation results for high speed scenario," Agenda Item 8.1.2.1, Source ETRI, 3GPP TSG RAN WG1 Meeting #86bis, Lisbon, Portugal, Oct. 10-14, 2016, 9 pgs.
R1-1610500, Slides, "WF on Numerology for forward compatibility," Agenda Item 8.1.2.1, Source InterDigital et al., 3GPP TSG RAN WG1 Meeting #86bis, Lisbon, Portugal, Oct. 10-14, 2016, 3 pgs.
R1-1610503, Slides, "WF on Alignments among different numerologies in frequency domain," Agenda Item 8.1.2.1, Source LG Electronics, 3GPP TSG RAN WG1 Meeting #86bis, Lisbon, Portugal, Oct. 10-14, 3 pgs.
R1-1610521, Slides, "WF on Subframe duration," Agenda Item 8.1.2.1, Source ZTE et al., 3GPP TSG RAN WG1 #86b, Lisbon, Portugal, Oct. 10-14, 2016, 3 pgs.
R1-1610558, Slides, "WF on Synchronization Signal for NR initial access," Agenda Item 8.1.5.1, Source Huawei, HiSilicon, 3GPP TSG RAN WG1 Meeting #86bis, Lisbon, Portugal, Oct. 11-14, 2016, 3 pgs.

* cited by examiner

SYSTEMS/METHODS OF TRANSMISSION OVER A PLURALITY OF PATHS

CROSS-REFERENCE TO RELATED APPLICATIONS

The present application is a continuation of U.S. patent application Ser. No. 17/165,425, filed Feb. 2, 2021, which is a continuation of U.S. patent application Ser. No. 17/082,907, filed Oct. 28, 2020, now U.S. Pat. No. 11,601,872, which is a continuation of U.S. patent application Ser. No. 16/781,091, filed Feb. 4, 2020, now U.S. Pat. No. 10,856,215, which is a divisional of U.S. patent application Ser. No. 16/385,608, filed Apr. 16, 2019, now U.S. Pat. No. 10,595,267, which is a divisional of U.S. patent application Ser. No. 15/868,281, filed Jan. 11, 2018, now U.S. Pat. No. 10,334,515, which claims priority to U.S. Provisional Application No. 62/445,929, filed Jan. 13, 2017, entitled Systems/Methods of Bandwidth Reduction Using Auxiliary Devices, and to U.S. Provisional Application No. 62/451,245, filed Jan. 27, 2017, entitled Additional Systems/Methods of Bandwidth Reduction Using Auxiliary Devices and/or Access Points all of which are incorporated herein by reference in their entirety as if fully set forth herein.

TECHNICAL FIELD

The present application relates generally to communication of information, and relates more particularly to implicitly conveying information.

BACKGROUND

Wireless communications systems/methods are increasingly being used to provide voice, data and/or multimedia services. As the use of wireless systems/methods continues to increase, limited availability in electromagnetic spectrum may adversely constraint such systems/methods in their ability to transmit/receive voice/data/multimedia content effectively and/or at a rate that is satisfactory to end users.

SUMMARY

The According to various embodiments of inventive concepts, a base station may communicate with a destination device (e.g., a smartphone) and receive information regarding one or more auxiliary devices that are capable of communicating with the destination device. In accordance with some embodiments, the base station receives the information regarding the one or more auxiliary devices that are capable of communicating with the destination device from the destination device. Each of said one or more auxiliary devices may be assigned, by the base station and/or destination device, a reference index and/or an identity which may be relayed to the base station, destination device and/or to the relevant auxiliary device that is associated with said reference index and/or identity. Responsive to such information, the base station may transmit N bits to a specific auxiliary device whose reference index and/or identity correlates, relates or is a priori associated with a specific sequence of L bits, other than the N bits, that the base station also desires to relay to the destination device. The specific auxiliary device that receives the N bits transfers the N bits to the destination device (and, according to some embodiments, also transfers at least some said specific sequence of L bits to the destination device). The destination device then knows, via a priori arrangement (and/or by actually receiving said at least some of said specific sequence of L bits from said specific auxiliary device), to augment/append the N bits with at least some bits of the specific sequence of L bits, since the N bits were received at the destination device from said specific auxiliary device. Other auxiliary devices would be associated with other specific sequences of L bits. Thus, a destination device may receive N+L bits while the base station transmits only N bits. Access points that may function in a plurality of modes (concurrently or separately), including functions of an auxiliary device are also disclosed.

Embodiments of inventive concepts described herein are applicable to military systems/methods and alternatively or additionally applicable to commercial systems/methods including cellular systems/methods and home/office systems/methods. In these and other applications, some embodiments may provide bandwidth reduction, range extension, Quality-of-Service improvement, data rate enhancement and/or improved privacy, security and encryption. For example, some embodiments may maximize spectrum efficiency, reduce electromagnetic spectrum bandwidth requirements, extend communications range, reduce Bit Error Rate and/or provide encryption.

More particularly, embodiments herein include a method of conveying N bits of information and L bits of information, for a total of N+L bits of information, from a transmitter to a destination device via an auxiliary device. The method comprises selecting, by said transmitter and from a plurality of auxiliary devices that are respectively associated with different possible states of said L bits of information, an auxiliary device that is associated with a state of the L bits of information to be conveyed to the destination device, wherein $L \geq 1$. The method also comprises conveying the N+L bits of information from the transmitter to the destination device via the selected auxiliary device, without the transmitter transmitting any of said L bits of information to the destination device or the selected auxiliary device, by the transmitter transmitting a signal to the selected auxiliary device, wherein the signal comprises said N bits of information, wherein $N \geq 0$.

In some embodiments, the method further comprises refraining by the transmitter from conveying any of the N bits of information and any of the L bits of information directly to the destination device.

In some embodiments, said plurality of auxiliary devices comprises M auxiliary devices that are associated with different respective ones of at least $2^L$ different possible states of said L bits, wherein $M \geq 2^L \geq 2$, wherein said state of said L bits of information is one of the at least $2^L$ different possible states.

In some embodiments, the plurality of auxiliary devices includes the destination device acting as an auxiliary device.

In some embodiments, one or more auxiliary devices of said plurality of auxiliary devices are proximate to the destination device. In some embodiments, said proximate to the destination device comprises being on a person who is using the destination device.

In some embodiments, said selecting comprises associating by the transmitter said state of said L bits that the transmitter is to convey to the destination device with an index of the auxiliary device to be selected; and wherein said index of said auxiliary device is predetermined to be associated with said state of said L bits. In some embodiments, the transmitter conveying the N+L bits of information to the destination device by transmitting the signal comprising the N bits of information to the selected auxiliary device is based on the selected auxiliary device and/or the destination device augmenting said N bits by appending thereto at least some of said L bits of information upon receiving the signal comprising said N bits of information. For example, in some embodiments, it is predetermined that said destination device and/or said auxiliary device is to augment said N bits by appending said N bits by at least some of said L bits at an end of said N bits, beyond the end of said N bits and/or prior to the end of said N bits. Alternatively, in some embodiments, it is predetermined that said destination device and/or said auxiliary device is to augment said N bits by appending said N bits by at least some of said L bits at a beginning of said N bits, prior to the beginning of said N bits and/or beyond the beginning of said N bits. Alternatively, in some embodiments, it is predetermined that said destination device and/or said auxiliary device is to augment said N bits by appending said N bits by at least some of said L bits at a location beyond a beginning but before an end of said N bits. Alternatively, in some embodiments, it is predetermined that said destination device and/or said auxiliary device is to augment said N bits by appending said N bits by at least some of said L bits and distributing said at least some of said L bits over a plurality of different non-contiguous locations of said N bits.

In some embodiments, said N bits and said L bits of information are to be conveyed to the destination device as bits in a predetermined order. For example, in some embodiments, said predetermined order comprises said N bits appended by at least some of said L bits at an end of said N bits, beyond the end of said N bits and/or before the end of said N bits. Alternatively, in some embodiments, said predetermined order comprises said N bits appended by at least some of said L bits at a beginning of said N bits, beyond the beginning of said N bits and/or prior to the beginning of said N bits. Alternatively, in some embodiments, said predetermined order comprises said N bits appended by at least some of said L bits at a location beyond a beginning but before an end of said N bits. Alternatively, in some embodiments, said predetermined order comprises said N bits appended by at least some of said L bits and said at least some of said L bits distributed over a plurality of different non-contiguous locations of said N bits.

In some embodiments, the method further comprises providing privacy, security and/or encryption by conveying by the transmitter, via said auxiliary device, to the destination device said N+L bits of information via a transmission by the transmitter to said auxiliary device that does not include any of said L bits of information.

In some embodiments, conveying the N+L bits of information from the transmitter to the destination device via the selected auxiliary device comprises conveying N bits of first information and L bits of first information, for a total of N+L bits of first information to the destination device, via a first auxiliary device of the plurality of auxiliary devices that is associated with a state of said L bits of first information, by transmitting a signal comprising the N bits of first information to the first auxiliary device. In this case, the method may further comprise conveying N bits of second information and L bits of second information, for a total of N+L bits of second information, to the destination device via a second auxiliary device of the plurality of auxiliary devices that is associated with a state of said L bits of second information, by transmitting a signal comprising said N bits of second information to the second auxiliary device. For example, in some embodiments, each one of said first and second auxiliary devices is attached, installed and/or positioned in/on a building. Alternatively, in some embodiments, each one of said first and second auxiliary devices is attached and/or situated on a person.

In some embodiments, the method further comprises receiving information indicating one or more of the plurality of auxiliary devices as being proximate to and/or capable of communicating with the destination device.

In some embodiments, one or more auxiliary devices of said plurality of auxiliary devices are integrated with the destination device.

Embodiments herein also include a transmitter configured to perform the method according to any of the above embodiments. For example, some embodiments include a transmitter comprising communication circuitry and processing circuitry. The processing circuitry is configured to select, from a plurality of auxiliary devices that are respectively associated with different possible states of L bits of information, an auxiliary device that is associated with a state of L bits of information to be conveyed to a destination device, wherein $L \geq 1$; and convey N+L bits of information from the transmitter to the destination device via the selected auxiliary device, without the transmitter transmitting any of said L bits of information to the destination device or the selected auxiliary device, by transmitting via the communication circuitry a signal to the selected auxiliary device, wherein the signal comprises N bits of information, wherein $N \geq 0$.

Embodiments herein further include a method for a destination device to be conveyed N bits of information and L bits of information, for a total of N+L bits of information, from a transmitter. The method comprises receiving at the destination device a signal from an auxiliary device of a plurality of auxiliary devices that are respectively associated with different possible states of the L bits of information, wherein the signal comprises the N bits of information to be conveyed to the destination device but is devoid of said L bits of information to be conveyed to the destination device, wherein $L \geq 1$ and $N \geq 0$; and determining the N+L bits of information conveyed by the transmitter to the destination device as including the N bits of information comprised in the received signal and L bits that have a state associated with the auxiliary device from which the signal is received.

In some embodiments, determining the N+L bits of information comprises augmenting by the destination device said N bits of information by appending thereto at least some of the L bits with a state that is associated with the auxiliary device from which the signal is received.

In some embodiments, the method further comprises: identifying at least one auxiliary device that is proximate to and/or capable of communicating with the destination device; and informing the transmitter of the identified at least one auxiliary device that is proximate to and/or capable of communicating with the destination device;

In some embodiments, the method comprises the destination device receiving said N bits of information and said L bits of information by communicating with the auxiliary device and not receiving any of said N bits of information directly from the transmitter and not receiving any of said L bits of information directly from the transmitter.

In some embodiments, said plurality of auxiliary devices comprises M auxiliary devices that are associated with different respective ones of at least $2^L$ different possible states of L bits, wherein $M \geq 2^L \geq 2$; and said state of said L bits of information is one of the at least $2^L$ different possible states.

In some embodiments, wherein the plurality of auxiliary devices includes the destination device acting as an auxiliary device.

In some embodiments, wherein one or more auxiliary devices of said plurality of auxiliary devices are proximate to the destination device. For example, in some embodiments said proximate to the destination device comprises being on a person who is using the destination device.

In some embodiments, an index of said auxiliary device from which the signal is received is predetermined to be associated with said state of said L bits of information. For example, in some embodiments, determining the N+L bits of information comprises augmenting by the destination device said N bits of information by appending thereto at least some of the L bits with a state that is associated with the auxiliary device from which the signal is received, and said augmenting by the destination device comprises forming by the destination device a sequence of bits comprising the N+L bits of information. In some embodiments, said augmenting by the destination device said N bits of information comprises appending thereto at least some of said L bits at an end of said N bits and/or appending thereto at least some of said L bits at a distance from the end of said N bits. Alternatively, in some embodiments, said augmenting by the destination device said N bits of information comprises appending thereto at least some of said L bits at a beginning of said N bits and/or appending thereto at least some of said L bits at a distance from the beginning of said N bits. Alternatively, in some embodiments, said augmenting by the destination device said N bits of information comprises appending thereto at least some of said L bits at a location thereof beyond a beginning but before an end of said N bits and/or appending thereto at least some of said L bits at a location thereof prior to the beginning and/or following the end of said N bits. Alternatively, in some embodiments, said augmenting by the destination device said N bits of information comprises appending thereto at least some of said L bits over a plurality of different non-contiguous locations of said N bits.

In some embodiments, said augmenting by the destination device said N bits of information by appending thereto at least some of said L bits of information comprises forming by the destination device a sequence of bits comprising the N+L bits of information. For example, in some embodiments, said augmenting by the destination device said N bits of information comprises appending thereto at least some of said L bits at an end of said N bits and/or appending thereto at least some of said L bits at a distance from the end of said N bits, wherein said distance from the end of said N bits comprises a distance following said end and/or a distance prior to said end. Alternatively, in some embodiments, said augmenting by the destination device said N bits of information comprises appending thereto at least some of said L bits at a beginning of said N bits and/or appending thereto at least some of said L bits at a distance from the beginning of said N bits, wherein said distance from the beginning of said N bits comprises a distance following said beginning and/or a distance prior to said beginning. Alternatively, in some embodiments, said augmenting by the destination device said N bits of information comprises appending thereto at least some of said L bits at a location thereof beyond a beginning but before an end of said N bits and/or appending thereto at least some of said L bits at a location thereof prior to the beginning and/or following the end of said N bits. Alternatively, in some embodiments, said augmenting by the destination device said N bits of information comprises appending thereto at least some of said L bits over a plurality of different non-contiguous locations of said N bits.

In some embodiments, the signal that is received at the destination device from the auxiliary device comprises at least one frequency that is mutually exclusive to frequencies used for cellular communications.

In some embodiments, the signal that is received at the destination device from the auxiliary device comprises frequencies that are used for cellular communications.

In some embodiments, the signal that is received at the destination device from the auxiliary device is based upon a protocol that differs from a protocol used by said transmitter to transmit a signal comprising said N bits of information to the auxiliary device.

In some embodiments, the signal that is received at the destination device from the auxiliary device is based upon a protocol that is used by said transmitter to transmit a signal comprising said N bits of information to the auxiliary device.

In some embodiments, the method further comprises providing privacy, security and/or encryption by the destination device being conveyed said N bits of information and said L bits of information via a transmission that is limited to only said N bits of information.

In some embodiments, the method further comprises being conveyed the N+L bits of information from the transmitter by receiving the signal from the auxiliary device as a first auxiliary device of the plurality of auxiliary devices, and further comprising being conveyed another N+L bits of information from the transmitter by receiving a signal from a second auxiliary device of the plurality of auxiliary devices associated with a state of L bits of information to be conveyed via the second auxiliary device. For example, in some embodiments, the method further comprises receiving by said destination device information from said first auxiliary device and from said second auxiliary device over respective first and second time intervals that overlap with one another at least partially. Alternatively, in some embodiments, the method further comprises receiving by said destination device information from said first auxiliary device and from said second auxiliary device over respective first and second time intervals that do not overlap with one another. In some embodiments, at least one of said first and second auxiliary devices is attached to, installed and/or positioned in/on, a building. In some embodiments, at least one of said first and second auxiliary devices is attached to, and/or is situated on, a person. In some embodiments, the method comprises receiving by said destination device information from said first and second auxiliary devices using respective first and second frequency sets that are at least partially mutually exclusive with one another. In some embodiments, the method comprises receiving by said destination device information from said first and second auxiliary devices using respective first and second frequency sets that are at least partially overlapping with one another. In some embodiments, the method comprises receiving by said destination device information from said first and second auxiliary devices using respective first and second frequency sets that are at least partially mutually exclusive with one another. In some embodiments, the method comprises receiving by said destination device information from said first and second auxiliary devices using respective first and second frequency sets that are at least partially overlapping with one another.

In some embodiments, one or more auxiliary devices of said plurality of auxiliary devices is integrated with the destination device.

In some embodiments, the destination device receives information from at least one auxiliary device over first and second time intervals that do not overlap with one another, receives information from at least one auxiliary device via first and second protocols that differ from one another and/or receives information from at least one auxiliary device via first and second frequency sets whose frequencies are at least partially mutually exclusive with one another.

In some embodiments, the method comprises the destination device receiving information indirectly from the transmitter via said auxiliary device and also receives information directly from the transmitter. For example, in some embodiments, the method comprises the destination device receiving information directly from the transmitter via frequencies of a cellular frequency band and receiving information indirectly from the transmitter via said auxiliary device via frequencies that are at least partially mutually exclusive to frequencies of said cellular frequency band. Alternatively, in some embodiments, the method comprises the destination device receiving information directly from the transmitter and receiving information indirectly from the transmitter concurrently with one another. In some embodiments, the method comprises the destination device receiving information directly from the transmitter via frequencies of a cellular frequency band and receiving information indirectly from the transmitter via said auxiliary device via frequencies of said cellular frequency band. For example, the method may comprise the destination device receiving information directly from the transmitter and further receiving information indirectly from the transmitter, via said auxiliary device, concurrently with receiving information directly from the transmitter.

In some embodiments, the method comprises the destination device receiving first information and receiving second information, concurrently with one another, from respective first and second auxiliary devices of said plurality of auxiliary devices.

In some embodiments, the destination device comprises a smartphone.

Embodiments herein also include a destination device configured to perform the method according to any of the above embodiments. For example, embodiments herein include a destination device comprising communication circuitry and processing circuitry. The processing circuitry is configured to: receive via the communication circuitry a signal from an auxiliary device of a plurality of auxiliary devices that are respectively associated with different possible states of L bits of information that a transmitter is to convey to the destination device, wherein the signal that is received from the auxiliary device comprises N bits of information that the transmitter is also to convey to the destination device but is devoid of said L bits of information, wherein $L \geq 1$ and $N \geq 0$; and determine N+L bits of information conveyed by the transmitter to the destination device as including the N bits of information comprised in the received signal from the auxiliary device and L bits that have a state associated with the auxiliary device from which the signal is received.

Embodiments herein further include a method of conveying N bits of information and L bits of information, for a total of N+L bits of information, from a transmitter to a destination device. The method comprises receiving, at an auxiliary device and from the transmitter, a signal that comprises the N bits of information to be conveyed to the destination device and that is devoid of the L bits of information to be conveyed to the destination device, wherein $L \geq 1$ and $N \geq 0$; and responsive to receiving the signal from the transmitter, conveying the N+L bits of information from the auxiliary device to the destination device based on the auxiliary device being associated with a state of the L bits of information to be conveyed, wherein said conveying comprises the auxiliary device transmitting to the destination device a signal that comprises the N bits of information.

In some embodiments, the method further comprises appending said N bits of information with at least some bits of said L bits of information responsive to having received the signal comprising said N bits of information. For example, in some embodiments, said transmitting by the auxiliary device a signal comprising said N bits of information comprises transmitting by the auxiliary device a signal comprising said N bits of information and at least some bits of said L bits of information.

In some embodiments, the method comprises determining, based on the auxiliary device having been selected to receive said signal that comprises said N bits of information, that the auxiliary device has received from the transmitter said N bits of information and, further, said L bits of information, in addition to the N bits of information, even though the signal received at the auxiliary device comprises said N bits of information and is devoid of said L bits of information, In some embodiments, said auxiliary device is an auxiliary device of a plurality of auxiliary devices comprising M auxiliary devices that are associated with different respective ones of at least $2^L$ different possible states of L bits, wherein $M \geq 2^L \geq 2$; and said state of said L bits of information is one of the at least $2^L$ different possible states.

In some embodiments, at least one of the plurality of auxiliary devices is proximate to the destination device. In some embodiments, said proximate to the destination device comprises being on a person who is using the destination device.

In some embodiments, said signal that is transmitted by said auxiliary device comprises information received at the auxiliary device from the transmitter; and an index of said auxiliary device is predetermined to be associated with said state of said L bits of information.

In some embodiments, it is predetermined that, responsive to the auxiliary device having transmitted said signal comprising said N bits of information and responsive to the destination device having received said signal transmitted by the auxiliary device, said destination device is to augment said N bits conveyed by said signal received at the destination device by at least some bits of said L bits.

In some embodiments, the signal that is transmitted by the auxiliary device comprises at least one frequency that is mutually exclusive to frequencies used for cellular communications.

In some embodiments, the signal that is transmitted by the auxiliary device comprises frequencies used for cellular communications.

In some embodiments, the signal that is transmitted by the auxiliary device is based upon a protocol that differs from a protocol used by said transmitter to transmit a signal comprising said N bits of information to the auxiliary device.

In some embodiments, the signal that is transmitted by the auxiliary device is based upon a protocol that is used by said transmitter to transmit a signal comprising said N bits of information to the auxiliary device.

In some embodiments, the method further comprises providing privacy, security and/or encryption by conveying to the destination device N bits of information and L bits of information via explicit reception at the auxiliary device that is does not include any of said L bits of information.

In some embodiments, said auxiliary device comprises a first auxiliary device of a plurality of auxiliary devices, wherein the plurality of auxiliary devices includes a second auxiliary device configured to convey another N+L bits of information from the transmitter to the destination device via the second auxiliary device. For example, in some embodiments, said first auxiliary device and said second auxiliary device are configured to transmit/receive information to/from the destination device over respective first and second time intervals that overlap with one another at least partially. Alternatively, in some embodiments, said first auxiliary device and said second auxiliary device are configured to transmit/receive information to/from the destination device over respective first and second time intervals do not overlap with one another. In some embodiments, at least one of said first and second auxiliary devices is attached to, installed and/or positioned in/on, a building. In some embodiments, at least one of said first and second auxiliary devices is attached to, and/or is situated on, a person. In some embodiments, said first and second auxiliary devices are configured to transmit/receive information to/from the destination device using respective first and second frequency sets that are at least partially mutually exclusive with one another. In other embodiments, said first and second auxiliary devices are configured to transmit/receive information to/from the destination device using respective first and second frequency sets that are at least partially overlapping with one another. In some embodiments, said first and second auxiliary devices are configured to transmit/receive information to/from the destination device using respective first and second frequency sets that are at least partially mutually exclusive with one another. In some embodiments, said first and second auxiliary devices are configured to transmit/receive information to/from the destination device using respective first and second frequency sets that are at least partially overlapping with one another. In some embodiments, said first auxiliary device and said second auxiliary device convey information to the destination device using respective first and second protocols that differ with one another. In some embodiments, said first auxiliary device conveys information to the destination device using a protocol and wherein said second auxiliary device conveys information to the destination device also using said protocol.

In some embodiments, the method further comprises: identifying the auxiliary device as being proximate to and/or capable of communicating with the destination device; and informing the transmitter that the auxiliary device is proximate to and/or capable of communicating with the destination device;

In some embodiments, the auxiliary device is integrated with the destination device.

In some embodiments, said auxiliary device comprises at least one auxiliary device; the method further comprising: transmitting/receiving information by the at least one auxiliary device to/from the destination device and/or the transmitter over first and second time intervals that do not overlap with one another; transmitting/receiving information by the at least one auxiliary device to/from the destination device and/or the transmitter via first and second protocols that differ from one another; and/or transmitting/receiving information by the at least one auxiliary device to/from the destination device and/or the transmitter via first and second frequency sets whose frequencies are at least partially mutually exclusive with one another.

In some embodiments, the method further comprises receiving information directly from the transmitter and also receiving information directly from the destination device. For example, in some embodiments, the method further comprises transmitting/receiving information directly to/from the transmitter via frequencies of a cellular frequency band and transmitting/receiving information directly to/from the destination device via frequencies that are at least partially mutually exclusive with frequencies of said cellular frequency band. In other embodiments, the method further comprises transmitting/receiving information directly to/from the transmitter and transmitting/receiving information directly to/from the destination device concurrently with one another. In still other embodiments, the method further comprises transmitting/receiving information directly to/from the transmitter via frequencies of a cellular frequency band and transmitting/receiving information directly to/from the destination device via frequencies of said cellular frequency band.

In some embodiments, said auxiliary device is a first auxiliary device included in a plurality of auxiliary devices that also includes a second auxiliary device; and wherein said first and second auxiliary devices transmit/receive concurrently with one another.

In some embodiments, the auxiliary device comprises a smartphone.

In some embodiments, the method further comprises responsive to having received the signal from the transmitter, transmitting the signal to the destination device at a second power level that is less than a first power level with which the transmitter transmitted the received signal.

Embodiments also include an auxiliary device configured to perform the method of any of the above embodiments. For example, embodiments include an auxiliary device configured for a transmitter to convey N bits of information and L bits of information, for a total of N+L bits of information, to a destination device via the auxiliary device. The auxiliary device comprises communication circuitry and processing circuitry. The processing circuitry is configured to: receive, via the communication circuitry and from the transmitter, a signal that comprises the N bits of information to be conveyed to the destination device and that is devoid of the L bits of information to be conveyed to the destination device, wherein $L \geq 1$ and $N \geq 0$; and responsive to receiving the signal from the transmitter, convey the N+L bits of information to the destination device based on the auxiliary device being associated with a state of the L bits of information to be conveyed, wherein the processing circuitry is configured to convey the N+L bits of information by transmitting via the communication circuitry to the destination device a signal that comprises the N bits of information.

Embodiments also include a system that comprises two or more of the transmitter, the destination device, and the auxiliary device as described herein.

Embodiments further include corresponding computer programs and non-transitory computer readable mediums configured for performing the processing herein.

BRIEF DESCRIPTION OF THE DRAWINGS

The FIG. 1 is a schematic illustration of a base station ("BTS"), auxiliary device ("AD") configuration and destination device ("DD") configuration according to embodiments of the present inventive concepts. The BTS, $AD_1$-$AD_4$ and/or the DD may also be connected with one another, to an internet/intranet, a facility of at least one service provider and/or other devices such as, for example, appliances, entertainment units, etc. (not shown in FIG. 1).

DETAILED DESCRIPTION

Figure 1:
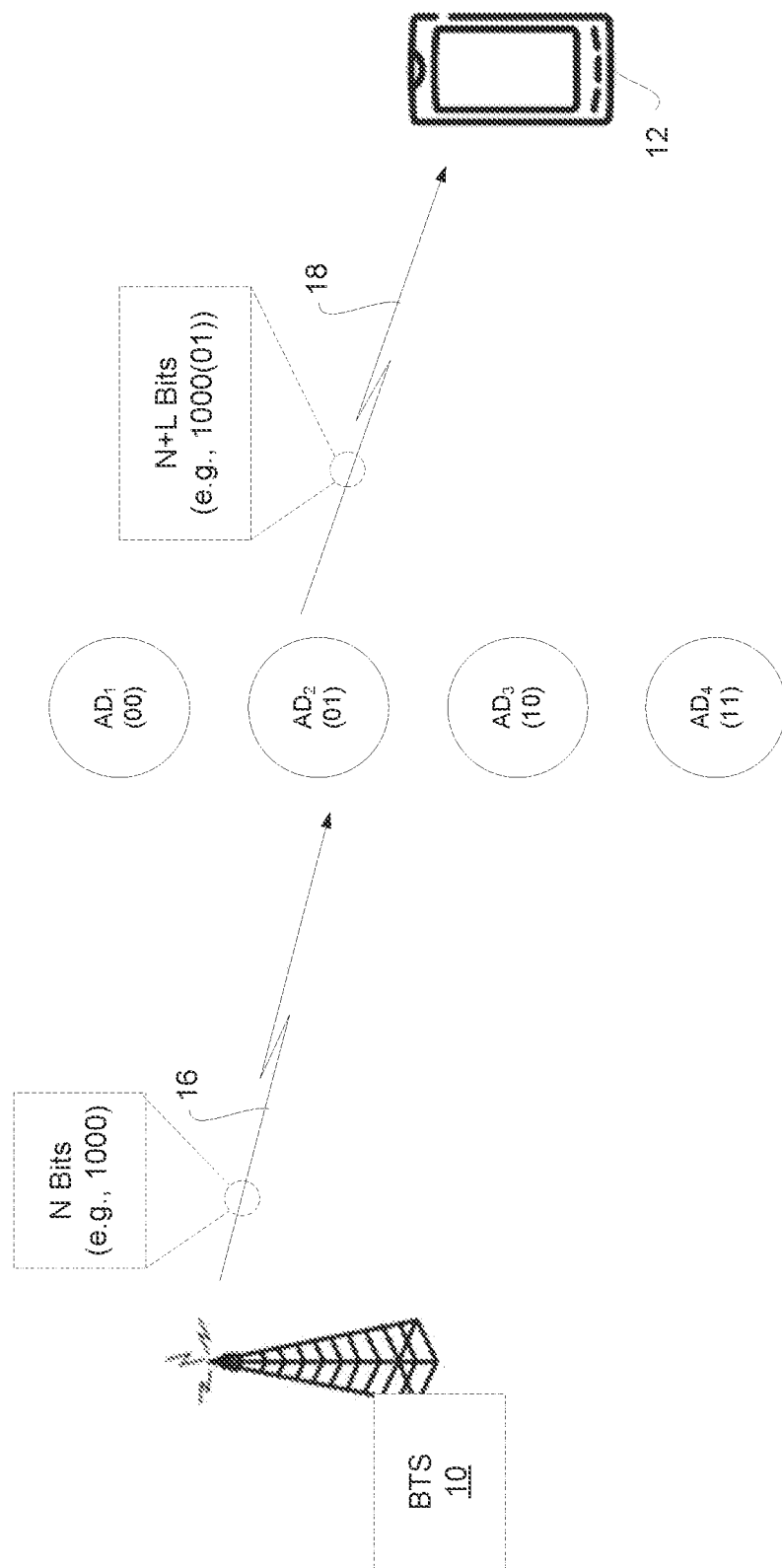

According to some embodiments described herein, a destination device, such as, for example, a smartphone, is proximate to, is equipped with and/or is capable of communicating with a plurality of auxiliary devices. A base station ("BTS" or "BTS 10" as may be referred to below with respect to some of the figures) in such embodiments may select to convey a block of N bits of information (N≥0) to, for example, one auxiliary device, of the plurality of auxiliary devices. Then, said one auxiliary device may convey the block of N bits of information to the destination device. Selecting by the BTS said one auxiliary device, of the plurality of auxiliary devices, may be based on (e.g., may be responsive to) a block of L bits of information (L≥1) that the BTS also desires to convey to the destination device over and above the block of N bits of information. The plurality of auxiliary devices may include at least $2^L$ different/distinct auxiliary devices respectively associated with different possible states of the block of L bits of information. For example, each of the plurality of auxiliary devices may, according to some embodiments, be associated uniquely with an index ("j") that relates to (e.g., is associated with) a respective state of said block of L bits of information. It will be understood that the term BTS, base transceiver station or simply base station, as used herein, may denote any terrestrial and/or space-based transmitter, receiver and/or transceiver, not just a transmitter, receiver and/or transceiver of a conventional (or non-conventional) base station of a cellular or non-cellular system.

In some embodiments, said plurality of auxiliary devices may be proximate to said destination device (e.g., may be proximate to a smartphone wherein the smartphone is the destination device) and may be connected (wirelessly and/or physically via cable and/or other means) to the destination device (e.g., to an antenna, receiver, transmitter, processor and/or other component thereof). In some embodiments, said plurality of auxiliary devices may be on a person who is carrying and/or is using the destination device (e.g., integrated with, or attached to, clothes or other materials/devices that the person is wearing and/or carrying). According to additional embodiments, at least one of the plurality of auxiliary devices may be integrated with the destination device (e.g., may be inside of the destination device so that the at least one auxiliary device may always be proximate to the destination device), and may be connected (wirelessly and/or physically via wire and/or other means) to the destination device (e.g., to an antenna, receiver, transmitter, processor and/or other component thereof). In other embodiments, at least one auxiliary device of said plurality of auxiliary devices may be proximate to said BTS and may be connected (wirelessly, physically via cable and/or via other means) to the BTS. In further embodiments, at least one first auxiliary device of the plurality of auxiliary devices may be proximate to and/or connected to the BTS and at least one second auxiliary device of the plurality of auxiliary devices may be proximate to and/or connected to the destination device and/or the destination device may be equipped with (e.g., integrated with) said at least one second auxiliary device and may be connected thereto wirelessly and/or physically via wire and/or other means. In yet further embodiments, a first plurality of auxiliary devices may be proximate to the BTS and a second plurality of auxiliary devices may be proximate to the destination device; wherein the first plurality of auxiliary devices comprises a number $N_1$ of auxiliary devices; $N_1 \geq 1$; wherein the second plurality of auxiliary devices comprises a number $N_2$ of auxiliary devices; $N_2 \geq 1$; and wherein $N_1$ may differ from $N_2$. It will be understood that a plurality of auxiliary devices may be connected (wirelessly and/or otherwise) to both the BTS and to the destination device, directly and/or via one or more intervening elements; and that said first plurality of auxiliary devices and said second plurality of auxiliary devices may be connected (wirelessly and/or otherwise) to one another, to the BTS and/or to the destination device, directly and/or via one or more intervening elements. It will further be understood that frequencies and/or frequency bands used by different auxiliary devices to relay/receive information to/from different destination devices (or to/from a single destination device) and/or to/from at least one BTS may be different and may depend on instruction(s) received by at least one auxiliary device from at least one BTS and/or from at least one destination device.

The term "proximate" as used herein may denote 10 feet or less, 30 feet or less or 100 feet or less, as may be relevant to a particular embodiment. In general, the term proximate as used herein denotes a distance that is less than another distance that is associated with the particular embodiment and/or a relevant communications system architecture. For example, a distance between a destination device (e.g., a smartphone) and a base station may be 1000 feet wherein a distance between the destination device and an auxiliary device may be 87 feet. Accordingly, it may be said that the auxiliary device is proximate to the destination device.

In accordance with one exemplary embodiment that is illustrated in FIG. 1, comprising four auxiliary devices that may be denoted as $AD_1$, $AD_2$, $AD_3$ and $AD_4$, or $AD_j$, j=1, 2, 3, 4; an index value of j such as, for example, j=1 may be associated with a "00" state of the block of L bits of information; an index value of j such as, for example, j=2 may be associated with a "01" state of the block of L bits of information; an index value of j such as, for example, j=3 may be associated with a "10" state of the block of L bits of information; and an index value of j such as, for example, j=4 may be associated with a "11" state of the block of L bits of information. Accordingly, the four auxiliary devices of the present example may also be denoted as $AD_1(00)$, $AD_2(01)$, $AD_3(10)$ and $AD_4(11)$, as is illustrated in FIG. 1.

It will be appreciated by those skilled in the art that any other association between auxiliary device index value and respective bit state of the block of L bits of information may be possible. It will be understood that the block of L bits of information may be appended and/or joined/added contiguously with/to the block of N bits of information; such as, for example, nnnnll, llnnnn, nnllnn, nllnnn or nnnlln; wherein "l" denotes a bit state of the block of L bits of information and "n" denotes a bit state of the block of N bits of information. Further, according to additional embodiments, the block of L bits of information may be appended to, and/or added contiguously or non-contiguously with/to the block of N bits of information and may also be interleaved with one or more other bits "x" that do not relate to either the N block of bits or to the L block of bits; such as, for example, lnnlnn, nlnnnl, nnnlnxl, lxxnnlnn, nnnnxxxlxxl etc.; wherein "x" denotes a bit space that is not used/occupied for/by any bit of said block of N bits and is not used/occupied for/by any bit of said block of L bits. It follows that, in some embodiments, the block of N bits of information may not be a contiguous block of N bits.

Continuing with the present exemplary embodiment that is illustrated in FIG. 1, let's assume that the BTS 10 shown therein is to relay, for example, a sequence of bits, such as, for example, the sequence of bits of "100001" to the destination device 12. Having knowledge by the BTS 10 of the four auxiliary devices that are proximate to the destination device 12, and having knowledge by the BTS 10 that an auxiliary device with index j=2 is associated with a "01" bit state, the BTS 10 may transmit a signal 16 indicating a "1000" bit state to auxiliary device $AD_2$. Upon reception of the signal 16 indicating the "1000" bit state by auxiliary device $AD_2$, the auxiliary device $AD_2$ may relay the received "1000" bit state to the destination device 12, e.g., by transmitting a signal 18 indicating the "1000" bit state. The destination device 12, also having knowledge of the auxiliary devices associated therewith and their respective index-to-bit state association, upon reception of the "1000" bit state from auxiliary device $AD_2$ the destination device 12 may append the received "1000" bit state with the bit state "01". It is noted that, in accordance with some embodiments, the auxiliary device $AD_2$ may convey (per the present example) the entire bit sequence 100001 to the destination device 12; that is, instead of having the destination device 12 perform appending/augmentation of the received sequence "1000" by "01", said appending and/or augmentation may be performed by the auxiliary device. Further, in accordance with other embodiments, said appending/augmentation may be performed partially by the auxiliary device and partially by the destination device 12. Thus, for the present example, the destination device 12 may be the recipient of six (6) bits of information, "100001", whereas the BTS 10 may only transmit four (4) bits of information, "1000". Accordingly, the BTS 10 may achieve a reduction in bandwidth, a range extension (by using 16-QAM modulation instead of 64-QAM) and/or a Quality-of-Service improvement (e.g., a Bit-Error-Rate improvement).

It will be understood that the term "append/appending" as used herein refers to adding bits (i.e., appending bits) (e.g., by the destination device and/or by the auxiliary device) at an end of a received bit sequence, at a beginning of a received bit sequence; and/or at any other location or locations of a received bit sequence, contiguously or non-contiguously and/or interleaved with one or more other bits "x" that do not relate to said received bit sequence; i.e., do not relate to the block of N bits or the block of L bits, as illustrated above. Further, "append/appending" may depend on an understanding, algorithm and/or convention that may have been established between the BTS, the auxiliary device and/or the destination device and for the wireless network to which the BTS, auxiliary device and destination device belong to, are registered with and/or are functioning in. Still referring to FIG. 1, those skilled in the art will appreciate that if, for example, instead of the bit sequence "100001", the BTS 10 desired to relay to the destination device 12 a different bit sequence such as, for example, a sequence of "100011", the BTS 10 could have transmitted "1000" to auxiliary device number 4 (i.e., $AD_4$), followed by auxiliary device number 4 relaying that which it would have received "1000" (either appended, partially appended or un-appended) to the destination device 12, followed by the destination device 12 appending, partially appending or not appending at all) the "1000" sequence by "11" thus acquiring that which the BTS 10 intended to relay to the destination device; i.e., the bit sequence "100011".

Figure 2:
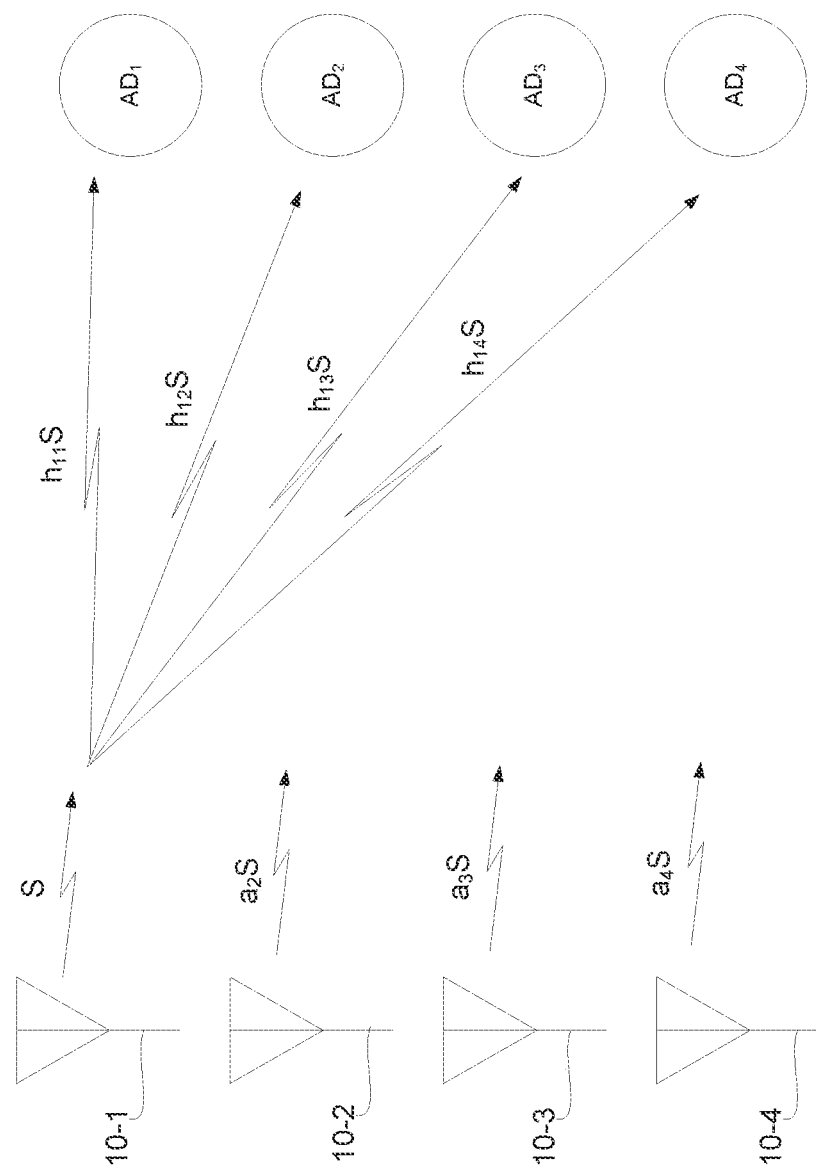
FIG. 2 is a schematic illustration of base station antennas transmitting various signals to auxiliary devices.

According to some embodiments, the BTS 10 may be equipped with a plurality of antennas. As an example, and referring now to FIG. 2, let's assume that the BTS 10 is equipped with four antennas 10-1, 10-2, 10-3 and 10-4 that, in this example, are configured to transmit a signal "S" by antenna 10-1, a signal "$a_2S$" by antenna 10-2, a signal "$a_3S$" by antenna 10-3 and a signal "$a_4S$" by antenna 10-4, as is illustrated in FIG. 2. The coefficients $a_2$, $a_3$ and $a_4$ may, in general, be complex-valued. As will be appreciated by those skilled in the art, the signal S being transmitted by antenna 10-1 may be received by each one of the four auxiliary devices that are illustrated in FIG. 2, as illustrated therein. It will be understood that $h_{11}$, $h_{12}$, $h_{13}$ and $h_{14}$, as used in FIG. 2, denote channel coefficients associated, respectively, with propagation paths from antenna 10-1 to the four auxiliary devices, as will be appreciated by those skilled in the art. The channel coefficients $h_{11}$, $h_{12}$, $h_{13}$ and $h_{14}$ may, in general, be complex-valued. Further to the above, the signal $a_2S$ being transmitted by antenna 10-2 also may be received by each one of the four auxiliary devices of FIG. 2 (with, in general, various other channel coefficients associated therewith that may also be complex-valued, as those skilled in the art will appreciate) and each one of the signals being transmitted by antennas 10-3 and 10-4, i.e., the signals $a_3S$ and $a_4S$, respectively, also may be received by each one of the four auxiliary devices of FIG. 2 weighted by, in general, various other complex-valued channel coefficients. Accordingly, letting $Y_1$, $Y_2$, $Y_3$ and $Y_4$ denote signals received by auxiliary devices one through four, respectively, we may write:

$$Y_1 = h_{11}S + h_{21}a_2S + h_{31}a_3S + h_{41}a_4S;$$

$$Y_2 = h_{12}S + h_{22}a_2S + h_{32}a_3S + h_{42}a_4S;$$

$Y_3 = h_{13}S + h_{23}a_2S + h_{33}a_3S + h_{43}a_4S$; and $Y_4 = h_{14}S + h_{24}a_2S + h_{34}a_3S + h_{44}a_4S$.

If the signal S corresponds, for example, to the bit sequence "1000" transmitted by the BTS 10 of FIG. 1, we may desire to have $Y_1 = 0$, $Y_2 = 1$, $Y_3 = 0$ and $Y_4 = 0$ so that auxiliary device number 2, labeled as $AD_2(01)$ in FIG. 1, receives a measure of the signal while auxiliary devices 1, 3 and 4 do not receive a substantial measure of S. Accordingly, using estimates of the various channel coefficients ($h_{11}$, $h_{21}$, . . . , $h_{34}$, $h_{44}$), a vector-matrix equation of the form Y=HA may be solved to yield $A = H^{-1}Y$; where $A = (1, a_2, a_3, a_4)^T$, and $Y = (0, 1, 0, 0)^T$ for the above example, and where H denotes a channel matrix whose coefficients comprise the various channel coefficients ($h_{11}$, $h_{21}$, . . . , $h_{34}$, $h_{44}$) defined above, as will be appreciated by those skilled in the art. We note that if, for example, the signal S were intended for $AD_4(11)$ then the vector A may be calculated with the vector Y having been set to $Y = (0, 0, 0, 1)^T$. In the above notation, it will be understood that $H^1$ denotes an inverse of matrix H and that $A^T$ denotes a transpose of vector A (the term "vector A" may also be referred to as "A vector"). It will be understood that said estimates of the various channel coefficients ($h_{11}$, $h_{21}$, . . . , $h_{34}$, $h_{44}$) may be estimated using techniques known to those skilled in the art, such as, for example, techniques based on processing of one or more pilot signals. It will further be understood that the vector A may be defined to have a fixed coefficient (e.g., a unity coefficient) in any location other than its first location; e.g., $A = (a_1, a_2, 1, a_4)^T$; and that instead of said fixed coefficient being assigned the value of unity (i.e., "1"), it may be assigned a value associated with any other number such as, for example, 1.75. Accordingly, we may have $A = (a_1, a_2, 1.75, a_4)^T$ and proceed therefrom to calculate the other coefficients/components/values of A, namely $a_1$, $a_2$, and $a_4$ using the vector-matrix equation $A = H^{-1}Y$, as discussed above. As another example, besides the one just given, we may have $A = (a_1, a_2, 0.87 + j0.97, a_4)^T$ and proceed therefrom to calculate the other coefficients/components/values of A, namely $a_1$, $a_2$, and $a_4$ in accordance with the vector-matrix equation $A = H^{-1}Y$, as discussed earlier; wherein $j = (-1)^{1/2}$.

Figure 3:
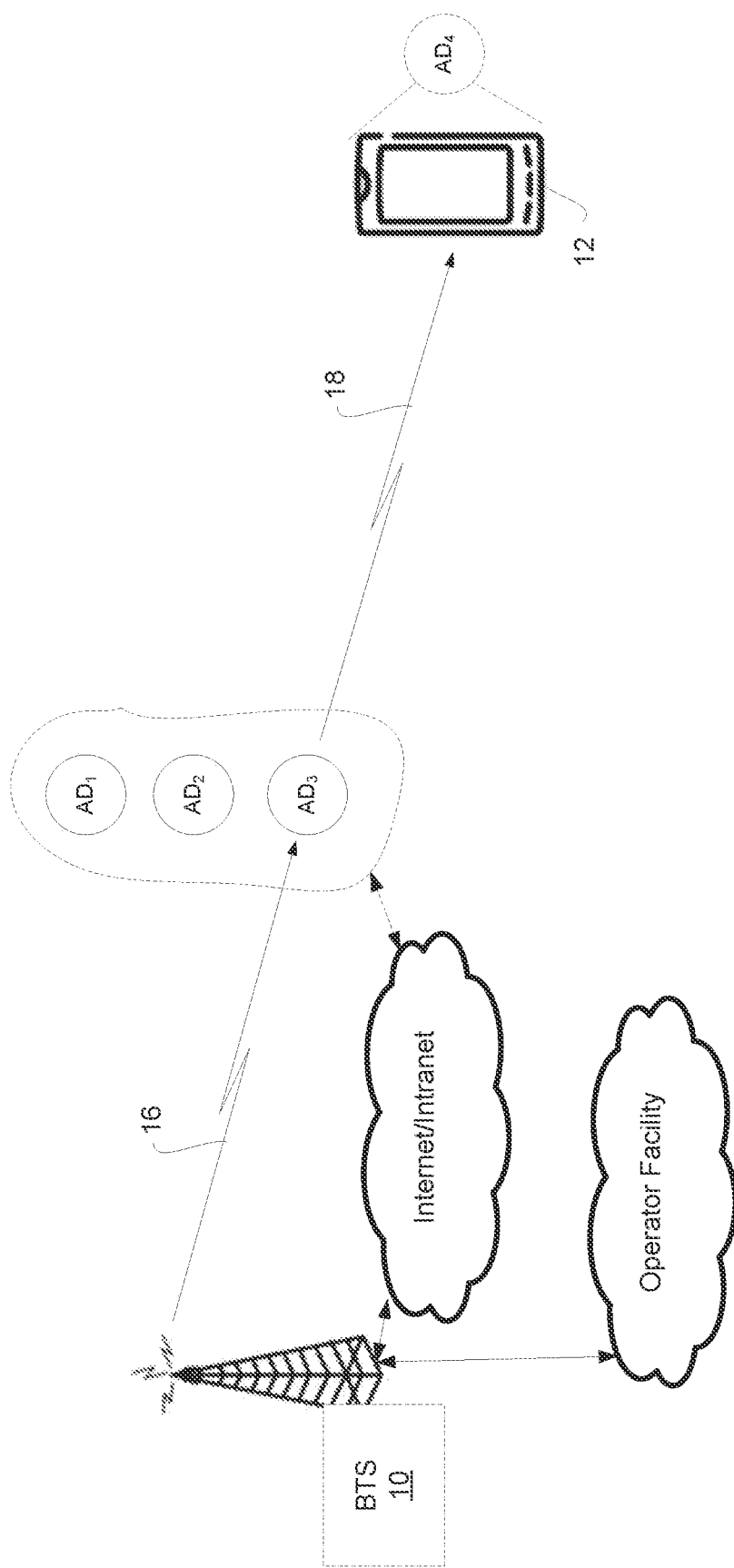
FIG. 3 is a schematic illustration of additional embodiments of inventive concepts comprising the BTS communicating directly with the DD and also communicating indirectly with the DD via one or more ADs ($AD_1$-$AD_3$). The auxiliary devices $AD_1$-$AD_3$ and/or the DD may also be connected with one another, with an internet/intranet and/or a facility of at least one service provider (as indicated by the dotted arrow of FIG. 3) and/or to other devices such as, for example, appliances, entertainment units, etc. (not shown in FIG. 3).

It will be understood that the Destination Device ("DD"), that may, for example, be a smartphone, may act as its own auxiliary device; i.e., the DD may act as an Auxiliary Device ("AD") by receiving directly from the BTS information (alternatively or additionally to receiving from auxiliary devices at least one of which may be integrated with the DD). This type of an arrangement would, of course, have to be established in cooperation with the BTS. FIG. 3 illustrates an example of such embodiments. Referring to FIG. 3, a DD 12 (e.g., a smartphone) may be configured to receive data from three Auxiliary Devices (i.e., from $AD_1$, $AD_2$ and/or $AD_3$) and the DD may also be configured to receive data directly from the BTS 10 (not illustrated in FIG. 3). In some sense, the DD may act as a fourth AD when receiving data directly from the BTS 10. Accordingly, for example, data received at the DD 12 from $AD_1$ may be augmented by "00"; data received at the DD from $AD_2$ may be augmented by "01"; data received at the DD from $AD_3$ may be augmented by "10"; and data received at the DD directly from the BTS 10 may be augmented by "11" (i.e., based on the DD acting as an auxiliary device $AD_4$). It will be understood that the term "data received" as used in the present paragraph means, according to some embodiments, data received per subcarrier; i.e., if, for example, a plurality of subcarriers is concurrently (and/or non-concurrently) being received at the DD from, for example, $AD_1$, then, data relayed by each one of the plurality of subcarriers that is being received at the DD from $AD_1$ may be augmented by "00". It will also be understood that at least one of the auxiliary devices being illustrated in FIGS. 1, 2 and/or 3 may also be a destination device that is acting as an auxiliary device relative to the DD being illustrated in FIGS. 1, 2 and/or 3 (not necessarily to the exclusion of any other function thereof). Stated differently, according to some embodiments, a destination device may also comprise functions of an auxiliary device and/or an auxiliary device may also comprise functions of a destination device. The term "configured to" as used herein denotes an inherent capability without further modification, not to the exclusion of any other inherent capabilities. For example, a destination device may be "configured to" communicate directly with a BTS (such as BTS 10) in the sense that the destination device is inherently capable, without further modification, of communicating directly with the BTS. The destination device may for instance possess the necessary structure (e.g., in the form of hardware, software/programming, or combination of hardware and software/programming) that provides this inherent capability. The destination device's inherent capability to communicate directly with the BTS, though, does not exclude the destination device from also being inherently capable of communicating indirectly with the BTS, e.g., via one or more auxiliary devices. Indeed, in some embodiments, the destination device may be configured to communicate either directly or indirectly with the BTS, depending on whether the BTS instructs the destination device to communicate with it directly or indirectly, depending on the state of L bits to be conveyed, depending on whether any auxiliary devices are proximate to the destination device, and/or depending on which mode of operation the destination device operates in.

Still referring to FIGS. 1 and/or 2, as appropriate, in accordance with an Orthogonal Frequency Division Multiplexed (OFDM), Orthogonal Frequency Division Multiple Access (OFDMA), Single Carrier Frequency Division Multiple Access (SC-FDMA) protocol and/or any other system/method/protocol wherein a carrier may comprise a plurality of subcarriers that may be transmitted by the BTS 10 concurrently with one another (or substantially concurrently with one another), with each one of the subcarriers generally transporting different information (e.g., different bit sequences), it may be desirable, according to some embodiments, to have, for example, a first subcarrier (or a first group of subcarriers) be received at, for example, $AD_1(00)$, while a second subcarrier (or a second group of subcarriers) is being received at, for example, $AD_3(10)$. Accordingly, a bit sequence relayed by the first subcarrier may be appended by "00" (or each bit sequence of each respective subcarrier of the first group of subcarriers may be appended by "00") and a bit sequence relayed by the second subcarrier may be appended by "10" (or each bit sequence of each respective subcarrier of the second group of subcarriers may be appended by "10"). In order to achieve this, according to some embodiments, the first subcarrier (or the first group of subcarriers) may be transmitted by the BTS using an "A vector" which may be derived, for example, in accordance with $Y = (1, 0, 0, 0)^T$ while the second subcarrier (or the second group of subcarriers) may be transmitted by the BTS 10 using an "A vector" that may be derived, for example, in accordance with $Y = (0, 0, 1, 0)^T$. It will be understood that said first subcarrier (or said first group of subcarriers) and said second subcarrier (or said second group of subcarriers) may be transmitted by the BTS 10 concurrently with one another, or substantially concurrently with one another and that, each one of said first subcarrier (or said first group of subcarriers) and said second subcarrier (or said second group of subcarriers) may, concurrently (or substantially concurrently) with one another, arrive at respective first and second auxiliary devices that may be physically distinct and/or different from one another.

In accordance with further embodiments, and still referring to FIG. 2 and to the description thereof, it will be understood that a plurality of auxiliary devices, such as those illustrated in FIG. 2, may be used by a BTS 10, comprising a plurality of antennas, as illustrated in FIG. 2, to transmit concurrently and co-frequency a plurality of signals to the auxiliary devices (see description and equations above via which the BTS directs a measure of a signal to a specific one of the four auxiliary devices via an appropriate A vector selection while maintaining a substantially zero measure of that signal at auxiliary devices other than said specific one of the four auxiliary devices). More specifically, using a plurality of BTS antennas, as illustrated in FIG. 2 and described above, four different signals may be launched by the BTS 10, concurrently, wherein any two signals of said four signals may comprise at least some frequencies that are mutually non-exclusive between said any two signals. In some embodiments, a first signal of said four signals comprises non-zero frequency content, following transmission by the BTS, throughout a frequency range from $f_1$ to $f_2$, $f_1<f_2$, while a second signal of said four signals also comprises non-zero frequency content, following transmission by the BTS 10, throughout said frequency range from $f_1$ to $f_2$. Each one of said four signals may comprise an entire OFDM, OFDMA and/or SC-FDMA carrier (or some variation thereof), wherein said entire OFDM, OFDMA and/or SC-FDMA carrier comprises a plurality of subcarriers that may occupy an entire 4G-LTE bandwidth, such as, for example, 5 MHz, 10 MHz, 20 MHz, according to some embodiments. Thus, in accordance with some embodiments, the auxiliary devices may be used to enable forward link concurrent and co-channel transmission of a plurality of signals, without producing unacceptable levels of interference, thus increasing spectral efficiency. Concurrent and co-channel return link transmission of a plurality of signals, using a plurality of auxiliary devices and a plurality of BTS antennas, is also possible as will be described further below in reference to FIG. 5.

According to further embodiments, in order for the BTS 10 to direct different subcarriers to appropriate different auxiliary devices (in order to achieve appropriate appending of one or more bits thereof), instead of and/or in conjunction with using different "A vector" coefficients for different subcarriers (or for different groups of subcarriers) a first time shift may be introduced by the BTS 10 in transmitting a first subcarrier (or a first group of subcarriers) and a second time shift, that may differ from the first time shift, may be introduced by the BTS 10 in transmitting a second subcarrier (or a second group of subcarriers); wherein each one of said first and second time shifts may represent, according to some embodiments, a plus or a minus "delta" about a nominal transmission time (or any other delta about the nominal transmission time); and wherein each auxiliary device (or at least one auxiliary device) of the plurality of auxiliary devices may be configured to examine said time shift or "delta" to determine whether or not a particular reception is intended for it, in order to process that reception, in accordance with principles described herein, and to refrain from processing other receptions that are intended for other auxiliary devices. A number of different time shifts may be used by the BTS 10 corresponding uniquely to a number of auxiliary devices.

According to additional embodiments, instead of, or in conjunction with using different "A vector" coefficients for different subcarriers (or for different groups of subcarriers) and/or a first time shift in transmitting the first subcarrier (or the first group of subcarriers) and a second time shift, that may differ from the first time shift, in transmitting the second subcarrier (or the second group of subcarriers), a first modulation may be used by the BTS 10 in transmitting the first subcarrier (or the first group of subcarriers) and a second modulation, that may differ from the first modulation, may be used by the BTS in transmitting the second subcarrier (or the second group of subcarriers). Said first modulation may be, for example, any one of (or any combination and/or variation of) QPSK, OQPSK, GMSK, PPM PAM, FSK, any variant of QAM (e.g., 4 QAM, 8 QAM, 16 QAM, 32 QAM, 64 QAM, etc.) or any variant of PSK such as, for example, 8 PSK, and/or any other modulation. Same may be said for said second modulation; wherein each auxiliary device (or at least one auxiliary device) of the plurality of auxiliary devices may be configured to examine said modulation and/or said time shift or "delta" in order to determine the auxiliary device that a reception is intended for.

In yet other embodiments, in lieu of, or in addition to, any one of the techniques described above for directing a carrier/subcarrier (or carriers/subcarriers) to a desired auxiliary device of the plurality of auxiliary devices, an Internet Protocol ("IP") address, or any other address or coordinate (geographic and/or otherwise), associated therewith may be used by the BTS 10 to direct said carrier/subcarrier (or said carriers/subcarriers) to said desired auxiliary device using said IP address, or said any other address or coordinate, of the desired auxiliary device as a discriminator in order to direct said carrier/subcarrier (or said carriers/subcarriers) to said desired auxiliary device. Still in accordance with further embodiments, in lieu of, or in addition to, any one of the techniques described above for directing a carrier/subcarrier (or carriers/subcarriers) to a desired auxiliary device of the plurality of auxiliary devices, different bands of frequencies and/or different polarizations (e.g., linear, vertically polarized, horizontally polarized, right-hand circularly polarized, left-hand circularly polarized) may be used by the BTS 10 as a discriminator in order to direct different carriers/subcarriers to different desired auxiliary devices that may be associated, respectively, via an index assignment thereof, with said different bands of frequencies and/or different polarizations.

It will be understood that a destination device (e.g., a smartphone) may be configured to detect/identify one or more auxiliary devices that may be proximate thereto and/or are capable of communicating therewith (without necessarily being proximate thereto), and relay such information to the BTS 10 and/or to the one or more auxiliary devices. Alternatively, or in combination with the above, one or more (or all) auxiliary devices may be configured to detect/identify one or more destination devices (e.g., smartphones) that may be proximate thereto and/or are capable of communicating therewith and relay such information to the BTS and/or to the destination devices. Such information may, for example, comprise a unique identity associated with each one of the detected/identified auxiliary devices and/or destination devices and an index associated therewith. It is noted that an index associated with an auxiliary device may be destination device dependent owing to one auxiliary device being able to serve a plurality of destination devices concurrently. It is pointed out that some destination devices may act as auxiliary devices. The specific way in which received bits are to be appended by an auxiliary device and/or by a destination device (e.g., at an end of a received bit sequence, at a beginning of a received bit sequence, in-between beginning and end, continuously, non-continuously, interleaved or in accordance with some combination thereof as discussed earlier) may be decided by the auxiliary device, by the destination device and/or by the BTS as long as all devices involved in the decision (i.e., the auxiliary device, the destination device and/or the BTS) have knowledge of, and/or agree with, the decision. It will also be understood that a BTS may be configured to detect/identify one or more auxiliary devices, that may be proximate to one another, and may also be proximate to a destination device and/or may be capable of communicating with the destination device (without necessarily being proximate thereto), and relay such information to the destination device and/or to the one or more auxiliary devices. The BTS may perform such functions using location information (e.g., GPS coordinates) that may have been received at the BTS from said one or more auxiliary devices and destination device and/or the BTS may perform such functions using other means that may be independent of said one or more auxiliary devices, destination device and/or GPS coordinates.

According to some embodiments, the BTS 10 transmits information to one or more auxiliary devices and/or to one or more destination devices using frequencies allocated to a cellular communications system for cellular communications (i.e., frequencies of a cellular band of frequencies), whereas the one or more auxiliary devices transmit information to a destination device using at least one frequency that is mutually exclusive to frequencies allocated for cellular communications and/or using at least one frequency that is mutually exclusive to frequencies allocated for cellular communications in the vicinity of the BTS and/or the destination device. In other embodiments, the BTS 10 transmits information to one or more auxiliary devices and/or to one or more destination devices using frequencies allocated to a cellular communications system for cellular communications, and the one or more auxiliary devices transmit information to a destination device using frequencies allocated to a cellular communications system for cellular communications and/or frequencies of a satellite band of frequencies that may be used terrestrially.

According to yet other embodiments, the BTS 10 transmits information to one or more auxiliary devices using a first protocol, such as, for example, a 4G LTE protocol and/or a 5G protocol, whereas the one or more auxiliary devices transmit information to a destination device using a second protocol that differs from the first protocol, such as, for example, a Bluetooth protocol and/or a Wi-Fi protocol. In other embodiments, the BTS 10 transmits information to one or more auxiliary devices using the first protocol, and the one or more auxiliary devices transmit information to a destination device also using the first protocol and/or a variant thereof. Said variant may, for example be, a 5G protocol whereas the BTS 10 uses a 4G protocol.

The destination device 12 may be capable of various modes of operation whereby according to a first mode of operation, the destination device is configured to receive information from one or more auxiliary devices and is not configured to receive information directly from the BTS 10 (i.e., whether acting as an auxiliary device or otherwise); according to a second mode of operation, the destination device is configured to receive information directly from the BTS 10 (e.g., apart from acting as an auxiliary device) and is not configured to receive information from any auxiliary device; according to a third mode of operation, the destination device is configured to receive information directly from the BTS 10 (i.e., either with the destination device acting as an auxiliary device or not acting as an auxiliary device) and is also configured to receive information from one or more auxiliary devices. Besides the above and, according to some embodiments in conjunction with at least some of the above, the destination device may be capable of functioning, or be configurable to operate, in additional modes (i.e., the destination device may be configurable to perform further functions that may be associated with other modes) such as, for example, multi-band operation (cellular frequencies used in the US, cellular frequencies used in Europe, cellular frequencies used in Japan, etc.), multi-protocol operation (GSM, CDMA, 4G LTE, 5G, etc.). In some embodiments, the destination device in cooperation with the BTS 10 and/or in cooperation with one or more auxiliary devices (or the BTS 10 in cooperation with the destination device and/or in cooperation with one or more auxiliary devices) establishes a mode of operation responsive to at least one of a location of the destination device, a distance of the destination device from the BTS 10, a time-of-day, a velocity associated with the destination device, a size of data that is to be transmitted (from the BTS 10 to the destination device and/or from the destination device to the BTS 10) and a security/privacy concern associated with the destination device and/or the BTS 10. The mode of operation may also depend upon other concerns/parameters as will surely occur to those skilled in the art.

Regarding the security/privacy concern mentioned above, those skilled in the art will appreciate that, a level of security, privacy and/or encryption may be provided using inventive concepts and embodiments described herein owing to certain specific information being relayed via means other than direct transmission but instead, via means of auxiliary device selection and relying on the auxiliary device selection to provide information bits that are then appended to bits that may have been transmitted and received via said direct transmission. It is pointed out that, according to some embodiments, a number of bits of information that may be transmitted explicitly, over-the-air and/or otherwise, by said direct transmission (e.g., by a BTS, auxiliary device and/or destination device) may be zero. In such embodiments, a transmitter (such as a transmitter of a BTS and/or destination device) may make an auxiliary device selection and inform the selected auxiliary device of the selection (wirelessly and/or otherwise via, for example, the internet) and then, send an appropriate signal thereto that is devoid of explicit information content related to the N+L bits to be conveyed. Accordingly, in such embodiments, the selected auxiliary device sends a signal to the destination device and that signal may not explicitly include any of the N+L information bits. To this void of explicit information bits, the destination device may still receive L bits of information whose state is associated with the specific auxiliary device that has sent an appropriate signal to the destination device, as discussed earlier. Thus, the destination device may receive N+L bits of information, wherein the number N may be zero, but wherein the number L is greater than zero. Thus, the destination device is the recipient of information that the transmitter desired to convey to the destination device without the transmitter having explicitly conveyed information thereto by explicitly transmitting information bits thereto/therefor. That is, the transmitter implicitly conveys the L bits of information via its selection of which auxiliary device is to send a signal (e.g., comprising the N bits of information) to the destination device.

Implicitly conveying the L bits of information may thereby avoid the L bits of information being transmitted over-the-air in some embodiments so as to provide a form of security, privacy, and/or encryption with respect to the L bits of information.

It will be understood that although various inventive concepts, as described hereinabove, have been applied to BTS transmissions (i.e., to forward link transmissions from the BTS to the destination device), the various inventive concepts are also applicable to destination device transmissions (i.e., to return link transmissions from the destination device to the BTS), as will be appreciated by those skilled in the art. It will also be understood that for a return link application of one or more of the inventive concepts described herein, in order to provide a return link embodiment, that which has been referred to thus far as the destination device becomes the transmitter and that which has been referred to thus far as the BTS becomes the destination device or receiver.

Figure 4:
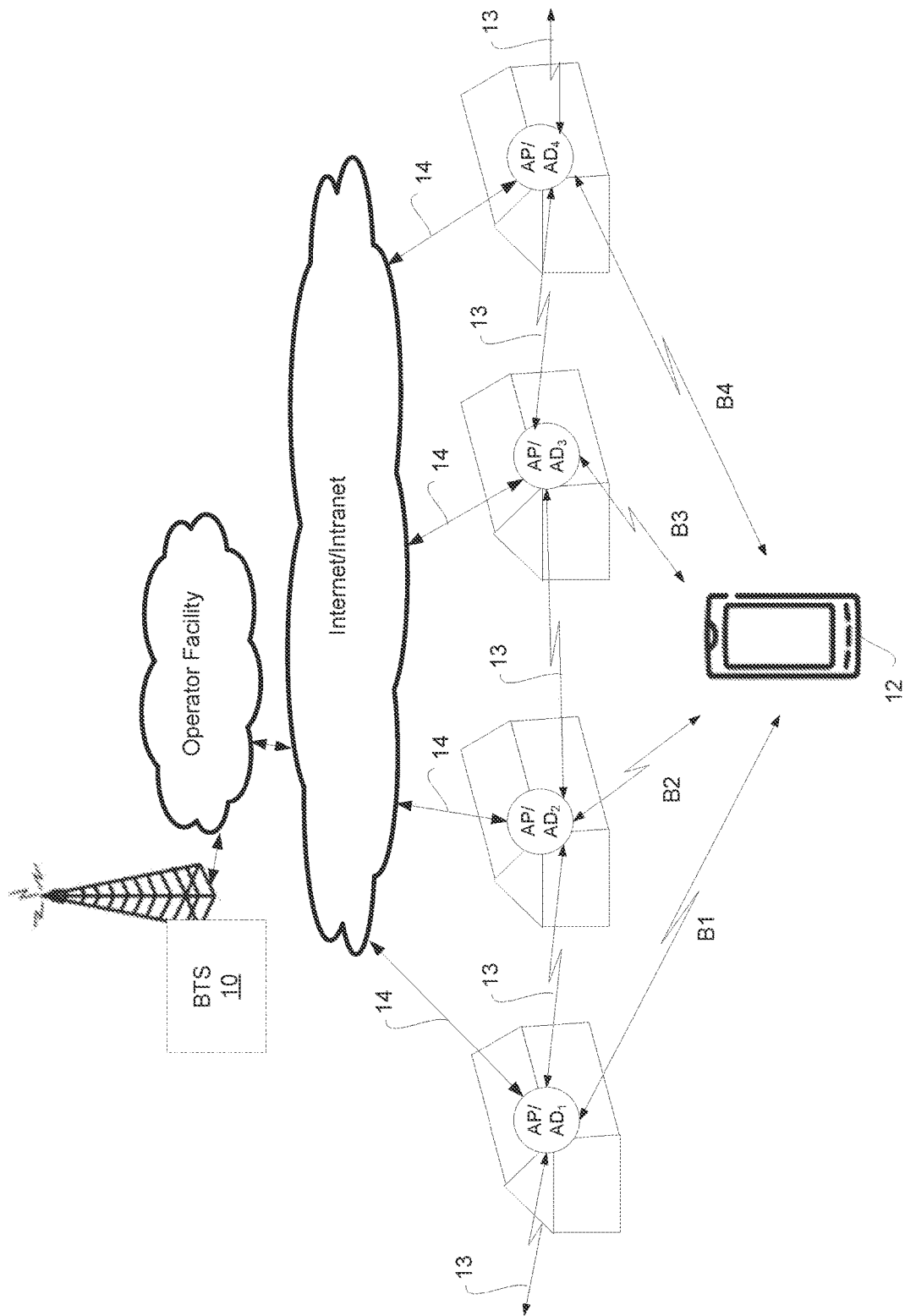
FIG. 4 is a schematic illustration of embodiments wherein structures such as, for example, homes/buildings, etc. are equipped with access points ("APs") that may also function as ADs in providing communications to a DD such as, for example, a smartphone. The access points that may also function as auxiliary devices, $(AP/AD)_1$-$(AP/AD)_4$, may be connected to one another wirelessly via links 13 and/or via the internet/intranet via links 14. Each one of $(AP/AD)_1$-$(AP/AD)_4$, may use a respective different band of frequencies B1-B4 to communicate with a DD. Each one of $(AP/AD)_1$-$(AP/AD)_4$, may be a multi-mode, multi-band device that is at least partially self-regulating in that it coordinates frequency use/reuse and/or bandwidth requirements with other APs/ADs (that may be near-by/proximate APs/ADs).

According to additional embodiments, a structure such as, for example, a vehicle (e.g., a car, truck, train, airplane, drone), a building (e.g., a home, business), a light post, a road, a highway, etc. may be equipped with at least one access point and/or at least one auxiliary device (and in accordance with some embodiments, may be equipped with a plurality of access points and/or a plurality of auxiliary devices) that may be connected to the internet (and/or an intranet) and to at least one facility of at least one service provider such as, for example, AT&T Wireless, Verizon, Sprint, T-Mobile, etc. The at least one access point and/or auxiliary device may, according to some embodiments, be similar to a femtocell and may be configured to transmit/receive cellular frequencies (and/or other frequencies) that the at least one operator is authorized to use. Imagine now a community, town and/or city in which at least some structures, as those mentioned above, are equipped/configured with at least one access point and/or auxiliary device. In at least some instances, a user device (e.g., a smartphone) may spend a percentage of time (that may be a large percentage of time) being served by one or more such access points and/or auxiliary devices while reducing communications load/traffic from/to one or more conventional base stations. Accordingly, a substantially regular lattice of access points and/or auxiliary devices (or a plurality of access points and/or auxiliary devices that need not necessarily be configured in accordance with said substantially regular lattice) may be provided by said at least one operator to serve user devices. Such access points and/or auxiliary devices may be configured to operate in an "open access mode", similar to the way a conventional base station operates, whereby any user device that is registered with and/or is authenticated by said at least one operator may receive communications service. Accordingly, unlike a femtocell configuration whereby only a predetermined number of user devices may be authorized to receive communications service, as may be determined/specified by an owner of the femtocell, one or more access points and/or auxiliary devices, operating in said open access mode, may be configured to provide service to any user device associated with the at least one operator. FIG. 4 is illustrative of such a concept according to some embodiments.

In reference to FIG. 4, at least some (and in some embodiments all) of said one or more access points and/or auxiliary devices may be connected with one another (wirelessly and/or otherwise; via links 13 and/or 14 of FIG. 4), may be connected to the internet (or to an intranet; e.g., a private IP-based network; links 14) and may also be connected with at least one conventional base station in order to provide improved communications service to a user device by, for example, providing hand-off between one access point and another and/or between one access point and the at least one conventional base station (depending, for example, on movement of the user device and/or a level of interference). According to some embodiments, diversity transmission and/or diversity reception to/from the user device and the at least one base station and/or one or more access points may also be provided using techniques known to those skilled in the art.

Still referring to FIG. 4, in accordance with yet additional embodiments, at least some (and in accordance with some embodiments all) of said access points ("APs") may further be configured to serve as Auxiliary Devices ("ADs"), as discussed earlier, not necessarily to the exclusion of any other function thereof as described herein. Such ADs may be configured to, for example, receive information from a BTS 10 (such as, for example, a conventional BTS), wirelessly and/or otherwise, and convey such information to a destination device (such as, for example, a smartphone). The information received from said BTS 10 may be, for example, one or more subcarriers in accordance with, for example, a 4G LTE protocol, as described earlier. In order to provide communications to a specific Destination Device ("DD"), a group of access points that may be proximate to said specific DD and may be commanded to operate as ADs therefor, may receive information from the BTS 10 wirelessly (as described earlier) and/or via the internet/intranet (links 14). The information that may be received by an AD via the internet/intranet and/or otherwise may, for example, be data relating to how said AD may configure a DFT/FFT thereof and/or what bins of said DFT/FFT may be looked at by (i.e., are relevant to) said AD and need to be relayed to the DD 12 so that the DD 12 may perform an appropriate augmentation thereto of the L bits as discussed earlier. In some embodiments, the information that may be received at an AD via the internet/intranet and/or otherwise, may comprise said data relating to the DFT/FFT of the AD, a number of subcarriers, data associated with a number of subcarriers that may be relayed by the AD to a DD, data associated with an IDFT/IFFT of the AD and/or other data. In further embodiments, all information required by an AD in order to serve a DD 12 may be received at the AD via the internet/intranet.

Access points as described above may be provided by a single service provider or a group of service providers in cooperation with one another. An access point may be connected to the internet/intranet via fiber-optical cable and may thus provide very large information flow (that may comprise bi-directional information flow). An access point may be multi-mode capable and multi-band capable and may provide an entertainment service (e.g., television, movies on demand, etc.), an internet service and/or a mobile multimedia service (e.g., service to smartphones). An access point may be configured to provide information to user devices (e.g., televisions, personal computers, smartphones, home appliances, vehicles, etc.) using wireless and/or wired means such as, for example, cellular frequencies, unlicensed band frequencies, microwave frequencies, any other frequencies including those that may be allocated to Internet-of-Things ("IoT") communications, copper cable, infrared link(s), ultraviolet link(s), fiber optical cable and/or any other means that allows/allow a connection to be established (either directly and/or indirectly) between the access point and a user device and further allows/allow transference of information. Thus, according to some embodiments, an access point ("AP") that may also be able to function as an auxiliary device ("AD"), such as those indicated in FIG. 4 as "(AP/AD)$_1$," through "(AP/AD)$_4$," may be a multi-mode, multi-band multi-media and/or a multi-medium (in terms of connectivity and transference of information) device.

Further, the access point may be configured to provide information to one or more user devices (e.g., smartphones) using any technology, air interface and/or protocol including an Internet-of-Things ("IoT") interface/protocol, a Fourth Generation Long Term Evolution ("4G LTE") interface/protocol, an Ultra Wide Band ("UWB") interface/protocol, a Wi-Fi interface/protocol, a WiMAX interface/protocol, an Orthogonal Frequency Division Multiplexed ("OFDM") interface/protocol, an Orthogonal Frequency Division Multiple Access ("OFDMA") interface/protocol, a single Carrier Frequency Division Multiple Access ("SC-FDMA") interface/protocol, a Code Division Multiplexed ("CDM") interface/protocol, a Code Division Multiple Access ("CDMA") interface/protocol, a Time Division Multiplexed ("TDM") interface/protocol, a Time Division Multiple Access ("TDMA") interface/protocol and/or any other interface/protocol and/or technology. It will be understood that a transference of information between the access point and a plurality of user devices may involve a plurality of different technologies and/or protocols and may also involve different frequency bands and/or transmission means. FIG. 4, for example, illustrates a plurality of access points that may be operating as auxiliary devices (not necessarily to the exclusion of any other mode/function thereof), wherein each is using a different band of frequencies (B1 through B4) to communicate with a destination device. According to some embodiments, the access point may communicate with a smartphone wirelessly using, for example, a 4G LTE protocol and cellular frequencies, while the access point may communicate wirelessly with a first television using, for example, a UWB protocol and may be further communicating with a second television using non-wireless means such as, for example, fiber optical cable transmission means. Further, the access point may be communicating with a computer using a wireless Wi-Fi protocol and an unlicensed band of frequencies. Many other combinations of the above are possible as will be appreciated by those skilled in the art.

According to some embodiments, in lieu of the above or in combination with the above, a substantially regular lattice of drones (or one or more drones that do not necessarily conform to said substantially regular lattice), each one of which may be equipped with an access point and/or auxiliary device, may be deployed by said at least one operator over a geographic area such as, for example, a city, town and/or community in order to provide communications service to user devices.

A plurality of access points, that may also be capable of functioning as auxiliary devices, may be interconnected with one another (for example, see links 13 and/or 14 of FIG. 4) directly, indirectly, wirelessly and/or otherwise. This interconnection between the plurality of access points may allow a transference of information from a first access point to a second access point and/or towards a final destination that may be a facility of the at least one operator and/or a BTS. Further, the interconnections between access points may provide/enable a distributed intelligence whereby various access points (such as, for example, access points that are proximate to one another) share information (e.g., frequency usage, Quality-of-Service, data rate required by a DD, diversity operation required by a DD or should be offered to a DD, a hand-off that should take place in order to improve service to/from a DD and/or levels of interference) and may thus be able to adaptively vary frequencies being used, bandwidth, protocol, power level, connectivity with one another and/or antenna directivity/pointing.

An access point that is situated in/on a structure may provide a plurality of functions and/or a plurality of communications modes to a plurality of different devices some of which may be associated with the structure (or a user/owner of the structure) and some of which may have nothing to do with the structure (or the user/owner of the structure) but may simply be proximate to the structure and/or are capable of connecting and communicating with the access point. If, for example, my house is equipped with an access point (call it "my access point"), my smartphone may be served by my access point using cellular and/or other than cellular frequencies (e.g., Wi-Fi frequencies). Further, a smartphone of someone else who happens to be proximate to my house may also be served by my access point using a frequency band that may differ from that used by my access point to serve my smartphone. Thus, a plurality of smartphones that are registered with one or more operators and are proximate to my access point, may be served, by said one or more operators, via my access point, in accordance with a service profile of each. Further, said one or more operators may use my access point selectively in providing other services/modes. Such other services/modes that may be provided selectively may, for example, include a television/entertainment service for my house and/or an internet service for my house. Such services that are provided selectively may require, for enablement, a special access code that may be provided to the user (e.g., to me for my house) by an operator providing the service. Accordingly, a regime is envisioned whereby each building/structure of a plurality of buildings/structures is equipped with an "open" access point that is configured to serve each device of a plurality of devices in its vicinity in accordance with a service profile of each. An "operator's operator" may install and maintain a plurality of open access points, at least one of which may be installed and maintained by said operator's operator on each of said building/structure of said plurality of buildings/structures. The operator's operator may then lease usage of a number of said plurality of open access points to an operator (such as Verizon or AT&T Wireless). Each open access point may comprise a multi-mode and/or multi-band functionality so that each open access point may be leased and used by a plurality of operators (e.g., by both Verizon and AT&T Wireless).

For the avoidance of doubt, it will be understood that an entity that is labeled, or referred to, herein as an access point may also be capable of functioning as an auxiliary device, not to the exclusion of any aspect of its access point functionality. It will further be understood that, as a destination device changes location and/or for any other reason(s), a number of access points and/or auxiliary devices that may be capable, or allowed/instructed, to serve the destination device may change. This change may be dynamic and may take place (subject to appropriate coordination between all devices involved) as often as once per signaling interval.

According to some embodiments, an access point may be capable of transmitting and/or receiving over a plurality of different bands of frequencies (or "frequency bands") that may be used for cellular communications, such as, for example, a 700 MHz band of frequencies, a 900 MHz band of frequencies, a 1,500 MHz frequency band, a 1,700 MHz frequency band, etc. (see illustration of FIG. 4; links B1-B4). Accordingly, in some embodiments, a destination device that may be receiving, for example, carriers/subcarriers from say four different auxiliary devices (as is illustrated in FIG. 4), may be receiving over four different bands of frequencies (see links B1-B4 of FIG. 4); wherein each of the bands of frequencies may be associated with an index that may be indicative of a state of the L bits that may be appended by the destination device to bits conveyed thereto by each carrier/subcarrier from a specific auxiliary device.

Figure 5:
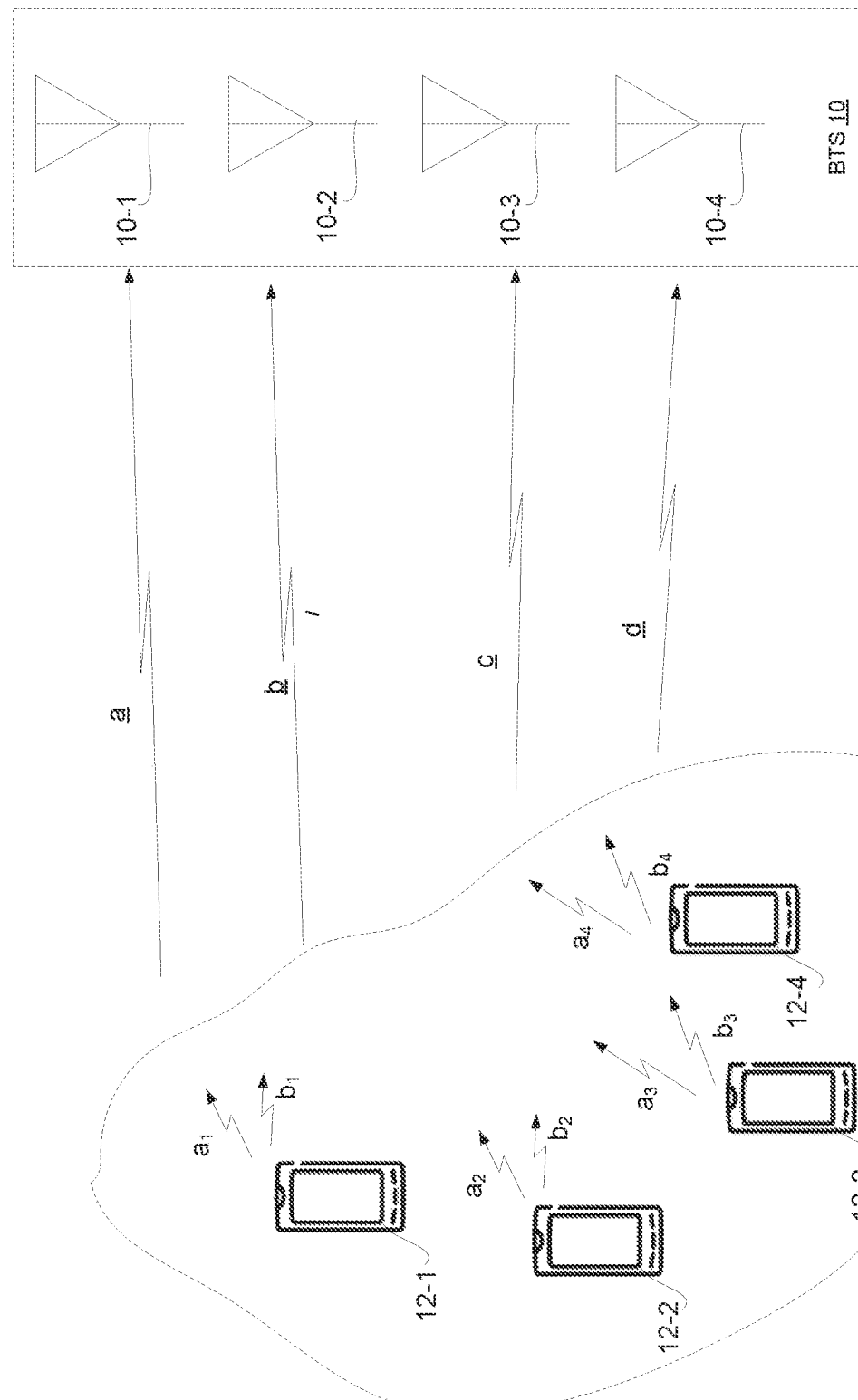
FIG. 5 is a schematic illustration of embodiments wherein a plurality of devices are used to launch, concurrently and co-frequency, a plurality of signals towards a respective plurality of antennas of a BTS.

According to embodiments of FIG. 5, a plurality of devices, such as, for example, the four devices labeled 12-1 through 12-4 in FIG. 5, may be used to launch, according to some embodiments, concurrently and co-frequency, a plurality of signals (e.g., four signals according to the example of FIG. 5) towards a respective plurality of antennas of a BTS 10 (e.g., towards antennas 10-1 through 10-4 of BTS 10 of FIG. 5). Specifically, in reference to FIG. 5, signals $\underline{a}$, $\underline{b}$, $\underline{c}$, and $\underline{d}$ may, according to some embodiments, be launched/transmitted by the ensemble of devices 12-1 through 12-4 towards the BTS 10; wherein said launched/transmitted may occur concurrently and co-channel. More specifically, one of the devices 12-1 through 12-4 may be labelled as a "master", wherein that master desires to communicate/transmit information to the BTS 10. For purposes of illustration, we will call device 12-1 the master. The master, with possible support from the BTS 10 and/or with input(s) from other devices, some of which may be other "slave" devices that may be proximate thereto, may become aware of the presence of said other slave devices (i.e., devices 12-2, 12-3, 12-4), and may then exchange information therewith and coordinate transmissions therewith whereby device 12-1 (the master) transmits a signal $a_1$; device 12-2 (a slave) transmits, concurrently and co-frequency with device 12-1, a signal $a_2$; device 12-3 (a second slave) transmits, concurrently and co-frequency with device 12-1 and device 12-2, a signal $a_3$; and device 12-4 (a third slave) transmits, concurrently and co-frequency with device 12-1, device 12-2 and device 12-3, a signal $a_4$, as is illustrated in FIG. 5. Accordingly, $\underline{a}=a_1+a_2+a_3+a_4$, wherein all component signals of $\underline{a}$, $a_1$, $a_2$, $a_3$ and $a_4$, occur concurrently (i.e., overlap in time) and further, are transmitted co-frequency (i.e., overlap in frequency). The master may become cognizant of said other slave devices (i.e., devices 12-2, 12-3, 12-4) by communicating with the BTS 10 and/or with said other slave devices. It is underscored that the component signals of signal $\underline{a}$ are launched/transmitted, by devices 12-1 through 12-4, as illustrated in FIG. 5, such that antenna 10-1 of the BTS 10 receives a measure of information that is associated with and/or is related to signal $\underline{a}$ while antennas 10-2, 10-3 and 10-4 of the BTS 10 (see FIG. 5) do not receive said measure of information that is associated with and/or is related to signal $\underline{a}$ (or receive a negligible measure of such information); this may be accomplished by using the approach that has already been described in reference to FIG. 2. Other approaches that may occur to those skilled in the art may also be used. Associating with antennas 10-1 through 10-4 "auxiliary device" meaning, receiving at 10-1 may be associated with appending any received bits at 10-1 by the bits "00"; similarly, receiving at 10-2 may be associated with appending any received bits at 10-2 with "01"; receiving at 10-3 may be associated with appending any received bits at 10-3 with "10"; and receiving at 10-4 may be associated with appending any received bits at 10-4 with "11". Alternatively, receiving simultaneously and co-frequency at 10-1 through 10-4 may be employed to increase bandwidth efficiency. Yet further, receiving simultaneously but not co-frequency at 10-1 through 10-4 may be used to allow a plurality of transmitters, such as all four mobile devices 12-1 through 12-4 of FIG. 5, to perform appending.

A correspondence that may be made between FIG. 2 and FIG. 5 may be as follows: the auxiliary devices 1 through 4 of FIG. 2 correspond to BTS 10 antennas 10-1 through 10-4 of FIG. 5; the signal "S" of FIG. 2 corresponds to signal "$a_1$" of FIG. 5; the signal "$a_2S$" of FIG. 2 corresponds to signal "$a_2$" of FIG. 5; the signal "$a_3S$" of FIG. 2 corresponds to signal "$a_3$" of FIG. 5; and the signal "$a_4S$" of FIG. 2 corresponds to signal "$a_4$" of FIG. 5. Accordingly, in a similar fashion, the remaining antennas of the BTS 10 of FIG. 5, antennas 10-2, 10-3 and 10-4, may receive information measures that may be associated with and/or are related to signals $\underline{b}$, $\underline{c}$ and $\underline{d}$, respectively. Each one of signals $\underline{b}$, $\underline{c}$ and $\underline{d}$, may be independent of one another and may also be independent of signal $\underline{a}$. Further, in some embodiments, each one of signals $\underline{b}$, $\underline{c}$ and $\underline{d}$, may occur concurrently and co-frequency with signal $\underline{a}$. In accordance with other embodiments, each one of signals $\underline{a}$, $\underline{b}$, $\underline{c}$ and $\underline{d}$, may occur concurrently with one another but may not necessarily be co-frequency with one another.

In some embodiments, for example, device 12-1 transmits a signal $b_1$; device 12-2 transmits, concurrently and co-frequency with device 12-1, a signal $b_2$; device 12-3 transmits, concurrently and co-frequency with device 12-1 and device 12-2, a signal $b_3$; and device 12-4 transmits, concurrently and co-frequency with device 12-1, device 12-2 and device 12-3, a signal $b_4$, as is illustrated in FIG. 5. Accordingly, $\underline{b}=b_1+b_2+b_3+b_4$, wherein all component signals of $\underline{b}$, $b_1$, $b_2$, $b_3$ and $b_4$, occur concurrently (i.e., overlap in time) and further, are transmitted co-frequency (i.e., overlap in frequency). Although not shown in FIG. 5, the devices 12-1 through 12-4 may also transmit respective component signals, for signals $\underline{c}$ and $\underline{d}$, in much the same way as described above for signals $\underline{a}$ and $\underline{b}$. The signals $\underline{a}$, $\underline{b}$, $\underline{c}$ and $\underline{d}$ may be formed by devices 12-1 through 12-4 (as described above) and may be launched concurrently with one another. Device 12-1 may be transmitting $x_1=a_1+b_1+c_1+d_1$; device 12-2 may be transmitting $x_2=a_2+b_2+c_2+d_2$; device 12-3 may be transmitting $x_3=a_3+b_3+c_3+d_3$; and device 12-4 may be transmitting $x_4=a_4+b_4+c_4+d_4$ such that, signals $x_1$, $x_2$, $x_3$ and $x_4$ may combine at the various antennas of BTS 10 to yield:

$\underline{a}=a_1+a_2+a_3+a_4$; at antenna 10-1;

$\underline{b}=b_1+b_2+b_3+b_4$; at antenna 10-2;

$\underline{c}=c_1+c_2+c_3+c_4$; at antenna 10-3; and $\underline{d}=d_1+d_2+d_3+d_4$; at antenna 10-4.

Further to the above, it will be understood that situations may arise wherein a first system is not using all frequencies that have been allocated to it (e.g., by the FCC), whereas a second system is using nearly all, or all, frequencies allocated to it. In order for the second system to potentially use at least some frequencies allocated to the first system and not being used by the first system, a communications connection between the two systems may be used. The communications connection may be a wireless and/or non-wireless connection and may be used to inform, in the present example, the second system of frequencies that are available for use by the second system, on an opportunistic, temporary, secondary and/or non-interfering basis, while the first system is not using such frequencies. Further, as soon as the first system needs to use frequencies that it has allowed the second system to use, the first system may, via said communications connection, notify the second system to release, let go, and/or cease usage of such frequencies. A compensation by the second system to the first system may also be provided for allowing by the first system the second system to use frequencies of the first system. Accordingly, a regime is envisioned whereby a plurality of systems are interconnected with one another and share with one another frequencies, as allowed by traffic loads associated therewith. That is, system 1 may be connected to system 2, to system 3, . . . and to system 7 (assuming there are 7 systems that are capable of sharing frequencies). Similarly, system 2 may be connected to system 1, to system 3, to system 4, . . . and to system 7; etc. A system belonging to said 7 systems that needs frequencies in addition to its own may make a request and, responsive to said request, at least one (possibly more than one) of the 7 systems may respond with an allocation of frequencies for the system making the request. It is pointed out that the opportunistic usage of frequencies as described above, via said communications connection, appears to be more reliable than other approaches such as, for example, sensing used/unused frequencies.

The present approach of using said communications connection, as described above, may be based on an algorithm that takes into account a plurality of variables that may include, estimation of interference levels and/or feedback (via said communications connection) of an interference level and may further take into account, for example, geography, a location of system that is requesting frequencies, distance between one system and another, time-of-day and/or weather conditions. Said algorithm and communications connection as described above, may maximize frequency usage and/or frequency reuse between a plurality of systems while minimizing harmful interference. As those skilled in the art can appreciate, frequency reuse comprises a plurality of systems that may be using a given frequency or a given set of frequencies concurrently with one another while, preferably, avoiding harmful interference.

In view of the above, a transmitter according to some embodiments herein implicitly conveys certain information (e.g., L bits) to a destination device by explicitly conveying other information (e.g., N bits and/or any other signal) to the destination device via a certain one of multiple auxiliary devices. Different ones of the multiples auxiliary devices in this regard are negotiated as, designated as, or otherwise understood by the transmitter and the destination device as being associated with different information (e.g., different values for L bits). Accordingly, the mere relay of a signal from the transmitter to the destination device via a certain one of the auxiliary devices implicitly indicates certain information (e.g., certain values for L bits) to the destination device. The relayed signal may itself convey information (e.g., N bits) to the destination device in some embodiments.

In other embodiments, a transmitter implicitly conveys certain information (e.g., L bits) to an auxiliary device for relay of that information to a destination device. The transmitter may similarly implicitly convey the certain information to the auxiliary device by explicitly conveying other information (e.g., N bits and/or any other signal) to the auxiliary device. The auxiliary device may for instance be one of multiple auxiliary devices associated with different information (e.g., different values for the L bits). Accordingly, the mere reception by a certain auxiliary device of a signal from the transmitter implicitly indicates the certain information (e.g., certain values for the L bits) to the certain auxiliary device. The received signal may itself convey information (e.g., N bits) to the auxiliary device in some embodiments. Regardless, the auxiliary device may then relay the implicitly conveyed information (e.g., the L bits) to the destination device. In some embodiments, the auxiliary device may also relay any explicitly conveyed information (e.g., the N bits) to the destination device. For example, in one embodiment, the auxiliary device forms N+L bits by appending the L bits to the N bits and transmits a signal to the destination device explicitly indicating the N+L bits.

Figure 6:
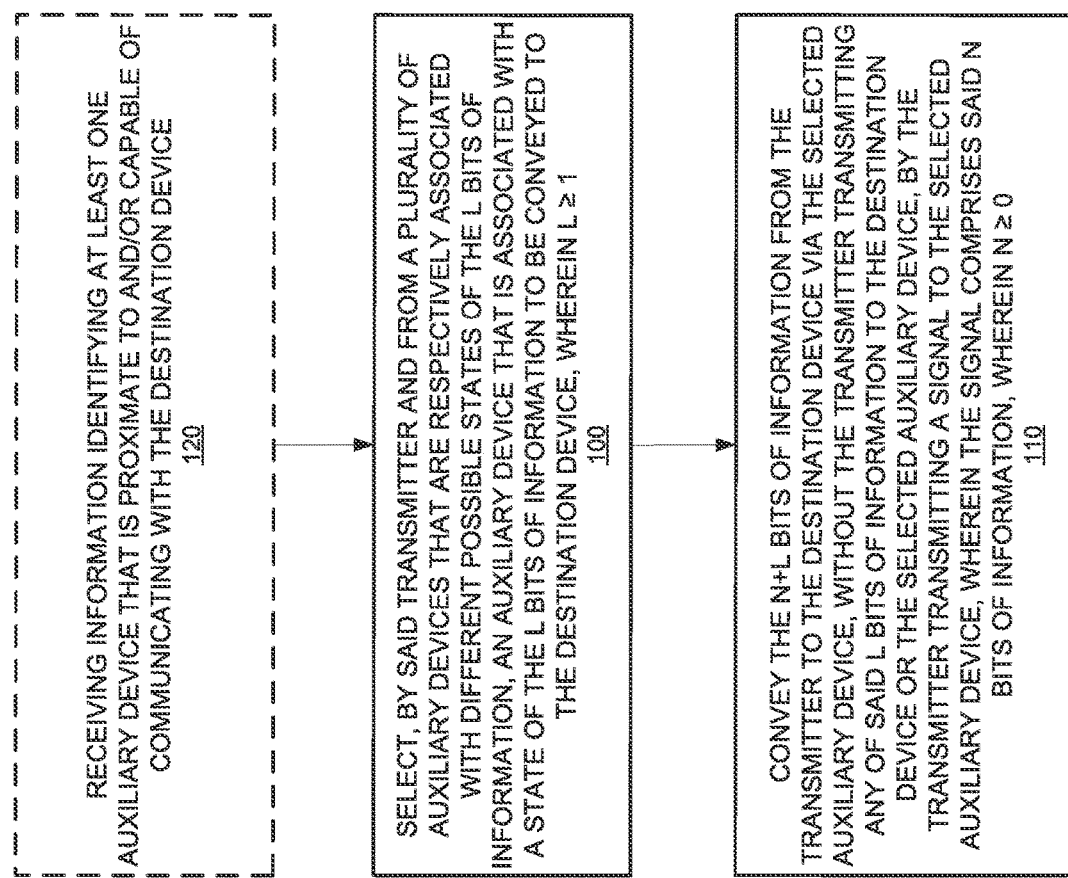
FIG. 6 is a logic flow diagram illustrating processing performed by a transmitter according to some embodiments.

Broadly, then, a transmitter herein may perform processing shown in FIG. 6 according to some embodiments for conveying N+L bits of information from the transmitter to a destination device via auxiliary device selection. The processing comprises selecting, by said transmitter and from a plurality of auxiliary devices that are respectively associated with different possible states of L bits, an auxiliary device that is associated with a state of L bits of information to be conveyed to the destination device, wherein L≥1 (Block 100). The processing further includes conveying the N+L bits of information from the transmitter to the destination device via the selected auxiliary device, without the transmitter transmitting any of said L bits of information to the destination device or the selected auxiliary device, by the transmitter transmitting a signal to the selected auxiliary device, wherein the signal comprises N bits of information, and wherein N≥0 (Block 110).

In some embodiments, the processing may also comprise receiving information indicating one or more of the plurality of auxiliary devices as being proximate to and/or capable of communicating with the destination device (Block 120).

Figure 7:
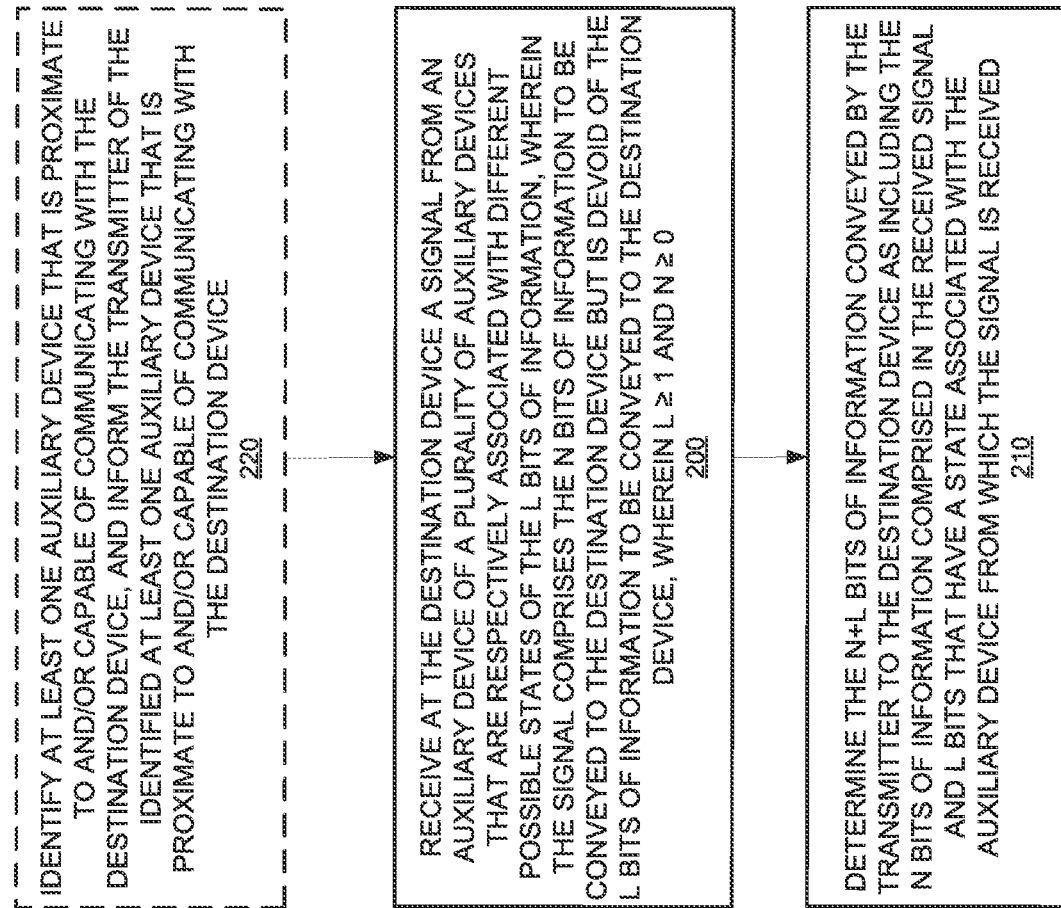
FIG. 7 is a logic flow diagram illustrating processing performed by a destination device according to some embodiments.

Correspondingly, a destination device may perform processing shown in FIG. 7 according to some embodiments for being conveyed N+L bits of information from a transmitter. The processing includes receiving at the destination device a signal from an auxiliary device of a plurality of auxiliary devices that are respectively associated with different possible states of L bits (Block 200). Here, the signal comprises N bits of information to be conveyed to the destination device but is devoid of L bits of information to be conveyed to the destination device, wherein L≥1 and N≥0. The processing further includes determining the N+L bits of information conveyed by the transmitter to the destination device as including the N bits of information comprised in the received signal and L bits that have a state associated with the auxiliary device from which the signal is received (Block 210). In some embodiments, for example, determining the N+L bits of information comprises augmenting by the destination device said N bits of information by appending thereto at least some of the L bits with a state that is associated with the auxiliary device from which the signal is received.

In one or more embodiments, processing may also include identifying at least one auxiliary device that is proximate to and/or capable of communicating with the destination device and informing the transmitter of the identified at least one auxiliary device that is proximate to and/or capable of communicating with the destination device (Block 220).

Figure 8:
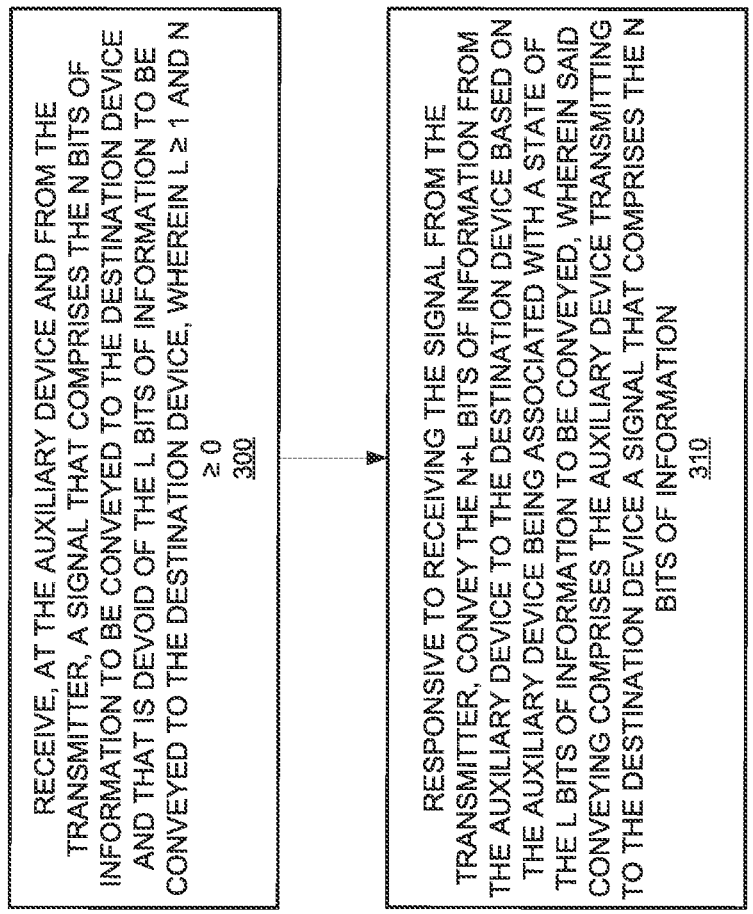
FIG. 8 is a logic flow diagram illustrating processing performed by an auxiliary device according to some embodiments.

Still further, an auxiliary device herein may perform processing shown in FIG. 8 according to some embodiments for conveying N+L bits of information from a transmitter to a destination device via the auxiliary device. The processing comprises receiving, at the auxiliary device and from the transmitter, a signal that comprises N bits of information to be conveyed to the destination device and that is devoid of L bits of information to be conveyed to the destination device, wherein L≥1 and N≥0 (Block 300). The processing also includes responsive to receiving the signal from the transmitter, conveying the N+L bits of information from the auxiliary device to the destination device based on the auxiliary device being associated with a state of the L bits of information to be conveyed, wherein said conveying comprises the auxiliary device transmitting to the destination device a signal that comprises the N bits of information (Block 310). In some embodiments, for example, the method also comprises appending said N bits of information with at least some bits of said L bits of information responsive to having received the signal comprising said N bits of information.

In one or more embodiments, transmitting by the auxiliary device a signal comprising said N bits of information comprises transmitting by the auxiliary device a signal comprising said N bits of information and at least some bits of said L bits of information.

Note that the transmitter as described above may perform the processing herein by implementing any functional means or units. In one embodiment, for example, the transmitter comprises respective circuits configured to perform the steps shown in FIG. 6. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the transmitter contains instructions executable by the processing circuitry whereby the transmitter is configured to carry out the processing herein.

Figure 9:
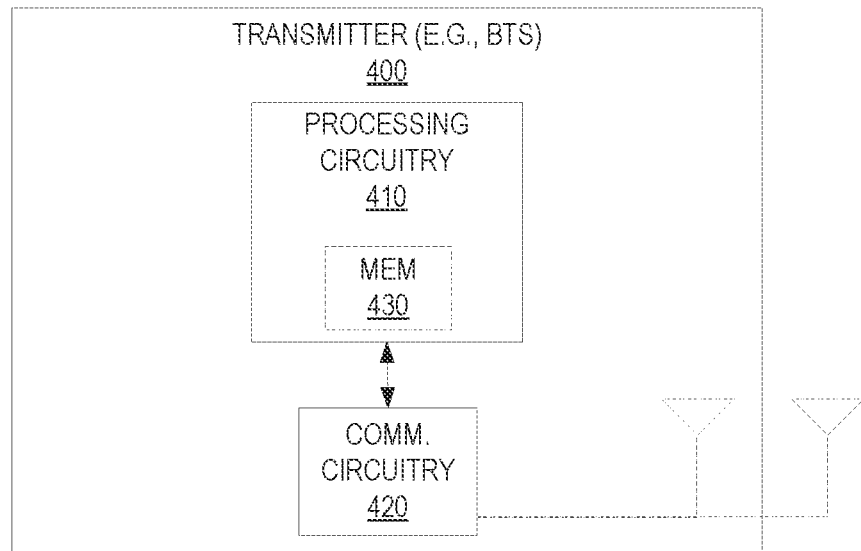
FIG. 9 is a schematic illustration of a transmitter according to some embodiments.

FIG. 9 illustrates additional details of a transmitter 400 in accordance with one or more embodiments. The transmitter 400 may for example be the BTS 10 (e.g., in forward link embodiments), or a smartphone, user equipment or other wireless device (e.g., in reverse link embodiments). Regardless, as shown, the transmitter 400 includes processing circuitry 410 and communication circuitry 420. The communication circuitry 420 is configured to communication with one or more other nodes, e.g., destination device(s) and/or auxiliary device(s). Where the transmitter 400 transmits using wireless technology, the communication circuitry 420 is configured to transmit and/or receive via one or more antennas. The processing circuitry 410 is configured to perform processing described above, e.g., in FIG. 6, such as by executing instructions stored in memory 430. Note that this does not preclude the processing circuitry 410 from being configured to perform other processing. Nor does this preclude the transmitter 400 from comprising other processing circuitry (not shown) configured to perform other processing.

Similarly, a destination device as described above may perform the processing herein by implementing any functional means or units. In one embodiment, for example, the destination device comprises respective circuits configured to perform the steps shown in FIG. 7. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the destination device contains instructions executable by the processing circuitry whereby the destination device is configured to carry out the processing herein.

Figure 10:
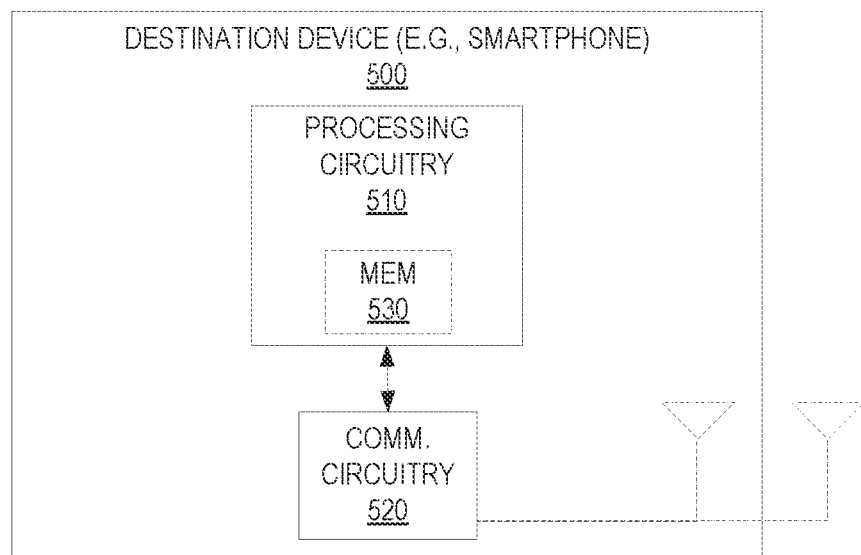
FIG. 10 is a schematic illustration of a destination device according to some embodiments.

FIG. 10 illustrates additional details of a destination device 500 in accordance with one or more embodiments. The destination device 500 may for example be the BTS 10 (e.g., in reverse link embodiments), or a smartphone, user equipment or other wireless device (e.g., in forward link embodiments). Regardless, as shown, the destination device 500 includes processing circuitry 510 and communication circuitry 520. The communication circuitry 520 is configured to communication with one or more other nodes, e.g., transmitter(s) and/or auxiliary device(s). Where the destination device 500 transmits using wireless technology, the communication circuitry 520 is configured to transmit and/or receive via one or more antennas. The processing circuitry 510 is configured to perform processing described above, e.g., in FIG. 7, such as by executing instructions stored in memory 530. Note that this does not preclude the processing circuitry 510 from being configured to perform other processing. Nor does this preclude the destination device 500 from comprising other processing circuitry (not shown) configured to perform other processing.

Further, an auxiliary device as described above may perform the processing herein by implementing any functional means or units. In one embodiment, for example, the auxiliary device comprises respective circuits configured to perform the steps shown in FIG. 8. The circuits in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more microprocessors, carries out the techniques described herein. That is, in some embodiments memory of the auxiliary device contains instructions executable by the processing circuitry whereby the auxiliary device is configured to carry out the processing herein.

Figure 11:
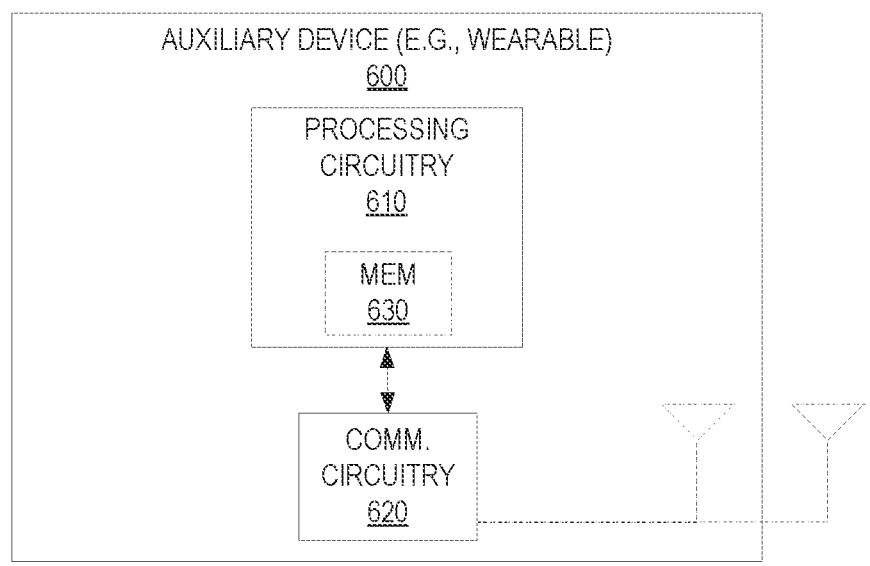
FIG. 11 is a schematic illustration of an auxiliary device according to some embodiments.

FIG. 11 illustrates additional details of an auxiliary device 600 in accordance with one or more embodiments. The auxiliary device 600 may for example a wearable device or other device proximate to the destination device. Regardless, as shown, the auxiliary device 600 includes processing circuitry 610 and communication circuitry 620. The communication circuitry 620 is configured to communication with one or more other nodes, e.g., transmitter(s) and/or destination device(s). Where the auxiliary device 600 transmits using wireless technology, the communication circuitry 620 is configured to transmit and/or receive via one or more antennas. The processing circuitry 610 is configured to perform processing described above, e.g., in FIG. 8, such as by executing instructions stored in memory 630. Note that this does not preclude the processing circuitry 610 from being configured to perform other processing. Nor does this preclude the auxiliary device 600 from comprising other processing circuitry (not shown) configured to perform other processing.

Note that the transmitter, destination device, and/or auxiliary device may be, comprise, or be a part of radio equipment herein. Radio equipment is any type of equipment configured for radio communication with other radio equipment. The radio equipment may for instance constitute radio network equipment (e.g., a base station) or user equipment (UE). Radio network equipment is any equipment capable of communicating with a user equipment over radio signals. Examples of radio network equipment include, but are not limited to, base stations (BSs), radio base stations, Node Bs, multi-standard radio (MSR) radio nodes such as MSR BSs, evolved Node Bs (eNBs), gNodeBs (gNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), etc.

A user equipment is any type device capable of communicating with radio network equipment over radio signals. A user equipment may therefore refer to a machine-to-machine (M2M) device, a machine-type communications (MTC) device, a NB-IoT device, etc. However, it should be noted that the UE does not necessarily have a "user" in the sense of an individual person owning and/or operating the device. A user equipment may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction.

In an IOT scenario, a user equipment as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a user equipment as described herein may be comprised in a vehicle and may perform monitoring and/or reporting of the vehicle's operational status or other functions associated with the vehicle.

It would be unduly repetitious and obfuscating to describe and/or illustrate every combination and/or sub-combination of the plurality of embodiments that are described herein. Accordingly, the present specification, including the drawings and Claims thereof shall be construed to constitute a complete written description of all combinations and/or sub-combinations of the embodiments described herein, and of the manner and process of making and using them, and shall support Claims to any such combination and/or sub-combination.

Specific exemplary embodiments of the inventive concepts have been described with reference to the accompanying drawings. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. It will be understood that any two or more embodiments of the present inventive concepts as presented herein may be combined in whole or in part to form one or more additional embodiments.

It will be understood that when an element is referred to as being "connected" or "coupled" to another element, it can be directly connected or coupled to the other element or intervening elements may be present. Furthermore, "connected" or "coupled" as used herein includes wirelessly connected or coupled.

The terminology used herein is for the purpose of describing particular embodiments only and is not intended to be limiting of the inventive concepts. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although terms such as first, second, desired and interference are used herein to describe various elements and/or signals, these elements/signals should not be limited by these terms. These terms are only used to distinguish one element/signal from another element/signal. Thus, a first element/signal could be termed a second element/signal, and a second element/signal may be termed a first element/signal without departing from the teachings of the present inventive concepts. Similarly, a desired element/signal could be termed an interference element/signal, and an interference element/signal may be termed a desired element/signal without departing from the teachings of the present inventive concepts, as will be appreciated by those skilled in the art.

As used herein, the term "and/or" includes any and all combinations of one or more of the associated listed items. The symbol "/" is also used as a shorthand notation for "and/or". Further, as used herein the term "DFT/FFT" refers to Discrete Fourier Transform and/or Fast Fourier Transform and may include any other Fourier transform. The term IDFT/IFFT as used herein refers to Inverse Discrete Fourier Transform and/or Inverse Fast Fourier Transform and may include any other inverse Fourier transform.

As used herein, the term "transmitter" and/or "receiver" include(s) transmitters/receivers of cellular and/or satellite terminals with or without a multi-line display; smartphones and/or Personal Communications System (PCS) terminals that may include data processing, facsimile and/or data communications capabilities; Personal Digital Assistants (PDA) that can include a radio frequency transceiver and/or a pager, Internet/Intranet access, Web browser, organizer, calendar and/or a Global Positioning System (GPS) receiver; and/or conventional laptop and/or palmtop computers or other appliances, which include a radio frequency transmitter and/or receiver. As used herein, the term "transmitter"

and/or "receiver" also include(s) any other radiator and/or receptor of electromagnetic energy that may have time-varying and/or fixed geographic coordinates and/or may be portable, transportable, installed in a vehicle (aeronautical, maritime, or land-based) and/or situated/configured to operate locally and/or in a distributed fashion on earth, in vehicles (land-mobile, maritime and/or aeronautical) and/or in space. A transmitter and/or receiver also may be referred to herein as a "BTS", "base station," "access point," "device," "mobile device," "wireless device," "terminal," "smartphone" and/or as a "radioterminal".

The present inventive concepts have been described with reference to figure(s), block diagram(s) and/or flowchart illustration(s) of methods, apparatus (systems) and/or computer program products according to embodiments of the inventive concepts. It is understood that a block of the block diagram(s) and/or flowchart illustration(s), and combinations of blocks in the block diagram(s) and/or flowchart illustration(s), can be implemented by computer program instructions. These computer program instructions may be provided to a processor of a general-purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the figure(s), block diagram(s) and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the figure(s), block diagram(s) and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the figure(s), block diagram(s) and/or flowchart block or blocks.

Accordingly, the present inventive concepts may be embodied in hardware and/or in software (including firmware, resident software, micro-code, etc.). Furthermore, the present inventive concepts may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

It should also be noted that in some alternate implementations, the functions/acts noted in the blocks of the block diagram(s)/flowchart(s) and/or figure(s) may occur out of the order noted in the block diagram(s)/flowchart(s) and/or figure(s). For example, two blocks shown in succession may in fact be executed substantially concurrently or the blocks may sometimes be executed in the reverse order, depending upon the functionality/acts involved. Moreover, the functionality of a given block of the flowchart(s)/block diagram(s) and/or figure(s) may be separated into multiple blocks and/or the functionality of two or more blocks of the flowchart(s)/block diagram(s) and/or figure(s) may be at least partially integrated with one another.

According to various embodiments of inventive concepts disclosed herein, a method of conveying by a transmitter to a destination device a number of bits of information that are in excess of a number of bits of information that are transmitted by the transmitter is disclosed; the method comprising:

responsive to a state of L bits of information that the transmitter desires to convey to the destination device, selecting by said transmitter an auxiliary device of at least one auxiliary device; said auxiliary device comprising an index that is associated with said state of said L bits of information; and transmitting by the transmitter a signal comprising N bits of information to the selected auxiliary device while refraining by the transmitter from transmitting to the selected auxiliary device any of said L bits of information;

wherein said signal comprising said N bits of information is received at the auxiliary device;

wherein a signal is transmitted by said auxiliary device responsive to the auxiliary device having received said signal comprising said N bits of information;

wherein the destination device determines that it has received said N bits of information and said L bits of information responsive to having received the signal that has been transmitted by said auxiliary device; and wherein $L \geq 1$ and $N \geq 0$.

According to some embodiments, the method further comprises: refraining by the transmitter from conveying any of the N bits of information and any of the L bits of information directly to the destination device.

According to other embodiments, said at least one auxiliary device comprises M auxiliary devices, wherein $M \geq 2^L \geq 2$; and wherein the index of the auxiliary device that is selected by the transmitter, is associated with the state of said L bits that the transmitter desires to transmit to the destination device; wherein said state of said L bits is one of $2^L$ different states, and wherein said at least one auxiliary device comprises at least $2^L$ different auxiliary devices each one of which is associated with a different one of at least $2^L$ different indices that respectively correspond to said $2^L$ different states of said L bits.

According to further embodiments, one or more auxiliary devices of said at least one auxiliary device are proximate to the destination device, wherein said proximate to the destination device comprises being on a person who is using the destination device, in some embodiments.

According to yet other embodiments, said signal that is transmitted by said auxiliary device comprises said N bits of information received by the auxiliary device from the transmitter; wherein said selecting by said transmitter an auxiliary device of said at least one auxiliary device comprises associating by the transmitter said state of said L bits that the transmitter desires to transmit to the destination device with said index of said auxiliary device; and wherein said index of said auxiliary device is predetermined to be associated with said state of said L bits.

According to additional embodiments, it is predetermined that, upon reception at the auxiliary device of said signal comprising said N bits of information that has been transmitted by the transmitter, the auxiliary device is to augment said N bits by appending thereto said L bits and/or responsive to the destination device receiving said signal that has been transmitted by said auxiliary device, comprising said N bits, said destination device is to augment said N bits by appending thereto said L bits.

According to yet further embodiments, said destination device and/or said auxiliary device augment/augments said N bits by appending said N bits by at least some of said L bits at an end of said N bits, beyond the end of said N bits and/or prior to the end of said N bits.

According to some embodiments, said destination device and/or said auxiliary device augment/augments said N bits by appending said N bits by at least some of said L bits at a beginning of said N bits, prior to the beginning of said N bits and/or beyond the beginning of said N bits.

According to other embodiments, said destination device and/or said auxiliary device augment/augments said N bits by appending said N bits by at least some of said L bits at a location beyond a beginning but before an end of said N bits.

According to further embodiments, said destination device and/or said auxiliary device augment/augments said N bits by appending said N bits by at least some of said L bits and distributing said at least some of said L bits over a plurality of different non-contiguous locations of said N bits.

Yet according to additional embodiments, said N bits and said L bits are to appear at the destination device in a predetermined order.

According to some embodiments, said predetermined order comprises augmenting by the auxiliary device and/or the destination device said N bits by appending said N bits by at least some of said L bits at an end of said N bits, beyond the end of said N bits and/or before the end of said N bits.

According to other embodiments, said predetermined order comprises augmenting by the auxiliary device and/or the destination device said N bits by appending said N bits by at least some of said L bits at a beginning of said N bits, beyond the beginning of said N bits and/or prior to the beginning of said N bits.

In accordance with yet additional embodiments, said predetermined order comprises augmenting by the auxiliary device and/or the destination device said N bits by appending said N bits by at least some of said L bits at a location beyond a beginning but before an end of said N bits.

In accordance with further embodiments, said predetermined order comprises augmenting by the auxiliary device and/or the destination device said N bits by appending said N bits by at least some of said L bits and distributing said at least some of said L bits over a plurality of different non-contiguous locations of said N bits.

In accordance with yet further embodiments, said transmitting by the transmitter comprises transmitting by the transmitter using frequencies of a cellular band of frequencies; and wherein the signal that is transmitted by said auxiliary device comprises at least one frequency that is mutually exclusive to the frequencies of said cellular band of frequencies.

According to some embodiments, said transmitting by the transmitter comprises transmitting by the transmitter using frequencies of a cellular band of frequencies; and wherein the signal that is transmitted by said auxiliary device comprises frequencies of said cellular band of frequencies.

According to other embodiments, said transmitting by the transmitter comprises transmitting by the transmitter using a first protocol; and wherein the signal that is transmitted by said auxiliary device is based upon a second protocol that differs from the first protocol.

According to yet additional embodiments, said transmitting by the transmitter comprises transmitting by the transmitter using a first protocol; and wherein the signal that is transmitted by said auxiliary device is based upon the first protocol or a variant thereof.

And, in accordance with yet additional embodiments, the method further comprising: providing privacy, security and/or encryption by conveying by the transmitter, via said auxiliary device, to the destination device said N+L bits of information via a transmission by the transmitter to said auxiliary device that is limited to said N bits of information.

According to some embodiments, a first auxiliary device of the plurality of auxiliary devices is connected to said transmitter, receives information from said transmitter and uses said received information from said transmitter to convey information to said destination device; and wherein a second auxiliary device of the plurality of auxiliary devices is also connected to said transmitter, receives information from said transmitter and uses said received information from said transmitter to also convey information to said destination device.

According to other embodiments, said first auxiliary device and said second auxiliary device convey information to the destination device over respective first and second time intervals that overlap with one another at least partially.

According to additional embodiments, said first auxiliary device and said second auxiliary device convey information to the destination device over respective first and second time intervals that do not overlap with one another.

According to further embodiments, each one of said first and second auxiliary devices is attached, installed and/or positioned in/on a building.

According to yet further embodiments, each one of said first and second auxiliary devices is attached and/or situated on a person.

In accordance with some embodiments, the first and second auxiliary devices convey information to the destination device using respective first and second frequency sets that are at least partially mutually exclusive with one another.

In accordance with other embodiments, the first and second auxiliary devices convey information to the destination device using respective first and second frequency sets that are at least partially overlapping with one another.

In accordance with additional embodiments, the first and second auxiliary devices convey information to the destination device using respective first and second frequency sets that are at least partially mutually exclusive with one another.

In accordance with yet additional embodiments, the first and second auxiliary devices convey information to the destination device using respective first and second frequency sets that are at least partially overlapping with one another.

In accordance with further embodiments, a communications system comprising a transmitter is provided;
wherein the transmitter comprises a processor that is configured to control the transmitter to perform operations comprising:
responsive to a state of L bits of information that the transmitter desires to transmit to a destination device, selecting by said transmitter an auxiliary device whose index is associated with said state of said L bits of information; and
transmitting by the transmitter to the selected auxiliary device a signal comprising N bits of information, other than the L bits of information, while refraining by the transmitter from transmitting to the selected auxiliary device any of said L bits of information;

wherein said signal comprising said N bits of information is received at the auxiliary device;

wherein the auxiliary device transmits a signal comprising said N bits of information responsive to having received the signal from said transmitter comprising said N bits of information;

wherein responsive to having received at the destination device the signal transmitted by the auxiliary device comprising the N bits of information, the destination device determines that it has received N bits of information and L bits of information responsive to having received the signal that has been transmitted by said auxiliary device; and wherein $L \geq 1$ and $N \geq 0$.

In accordance with yet further embodiments, said operations further comprise: refraining by the transmitter from conveying any of the N bits of information and any of the L bits of information directly to the destination device.

According to some embodiments, said auxiliary device comprises a plurality of auxiliary devices; wherein the plurality of auxiliary devices comprises M auxiliary devices, wherein $M \geq 2^L \geq 2$; and wherein the index of the auxiliary device that is selected by the transmitter is associated with the state of said L bits that the transmitter desires to transmit to the destination device; wherein said state of said L bits is one of $2^L$ different states, and wherein said plurality of auxiliary devices comprises at least $2^L$ different auxiliary devices each one of which is associated with a different one of at least $2^L$ different indices that respectively correspond to said $2^L$ different states of said L bits.

According to further embodiments, at least one auxiliary device of the plurality of auxiliary devices is proximate to the destination device; and according to yet further embodiments, said proximate to the destination device comprises being on a person who is using the destination device.

According to additional embodiments, said signal that is transmitted by said auxiliary device comprises information received at the auxiliary device from the transmitter; wherein said selecting by said transmitter an auxiliary device comprises associating by the transmitter said state of said L bits that the transmitter desires to transmit to the destination device with said index of said auxiliary device; and wherein said index of said auxiliary device is predetermined to be associated with said state of said L bits; and according to yet additional embodiments, it is predetermined that, responsive to said index of said selected auxiliary device and responsive to said transmitting by the transmitter to the selected auxiliary device, the selected auxiliary device and/or the destination device augment/augments said N bits by said L bits.

In accordance with yet other embodiments, said selected auxiliary device and/or said destination device augment/augments said N bits by appending said N bits by at least some of said L bits at an end of said N bits and/or at a distance from the end of said N bits.

In accordance with some embodiments, said selected auxiliary device and/or said destination device augment/augments said N bits by appending said N bits by at least some of said L bits at a beginning of said N bits and/or at a distance from the beginning of said N bits.

In accordance with further embodiments, said selected auxiliary device and/or said destination device augment/augments said N bits by appending said N bits by at least some of said L bits at a location beyond a beginning but before an end of said N bits.

In accordance with yet additional embodiments, said selected auxiliary device and/or said destination device augment/augments said N bits by appending said N bits by at least some of said L bits and distributing said at least some of said L bits over a plurality of different non-contiguous locations of said N bits.

According to some embodiments, it is predetermined that, responsive to said transmitting by the transmitter to the selected auxiliary device, said selected auxiliary device and/or said destination device is/are to augment said N bits by said L bits; and wherein said selected auxiliary device and/or said destination device augment/augments said N bits by appending thereto said L bits at an end of said N bits.

According to other embodiments, said selected auxiliary device and/or said destination device augment/augments said N bits by appending thereto said L bits at a beginning of said N bits.

According to further embodiments, said selected auxiliary device and/or said destination device augment/augments said N bits by appending thereto said L bits at a location beyond a beginning but before an end of said N bits.

According to yet additional embodiments, said selected auxiliary device and/or said destination device augment/augments said N bits by appending thereto said L bits and distributing said L bits over a plurality of different non-contiguous locations of said N bits.

According to some other embodiments, said transmitting by the transmitter comprises transmitting by the transmitter using frequencies of a cellular band of frequencies; and wherein the signal transmitted by the auxiliary device comprises at least one frequency that is mutually exclusive to the frequencies of said cellular band of frequencies.

According to yet further embodiments, said transmitting by the transmitter comprises transmitting by the transmitter using frequencies of a cellular band of frequencies; and wherein said signal that is transmitted by said auxiliary device comprises frequencies of said cellular band of frequencies.

According to various other embodiments, said transmitting by the transmitter comprises transmitting by the transmitter using a first protocol; and wherein said signal that is transmitted by said auxiliary device is based upon a second protocol that differs from the first protocol.

According to at least one other embodiment, said transmitting by the transmitter comprises transmitting by the transmitter using a first protocol; and wherein said signal that is transmitted by said auxiliary device is based upon the first protocol.

According to at least one further embodiment, said transmitter provides privacy, security and/or encryption by conveying, via said auxiliary device, to the destination device said N bits of information and said L bits of information via a transmission by the transmitter to said auxiliary device that is limited to only said N bits of information.

According to some embodiments, said auxiliary device comprises a first auxiliary device and a second auxiliary device; wherein the first auxiliary device is connected to said transmitter, receives information from said transmitter and uses said received information from said transmitter to convey information to said destination device; and wherein the second auxiliary device is also connected to said transmitter, receives information from said transmitter and uses said received information from said transmitter to also convey information to said destination device.

According to some other embodiments, said first auxiliary device and said second auxiliary device convey information to the destination device over respective first and second time intervals that overlap with one another at least partially.

According to yet further embodiments, said first auxiliary device and said second auxiliary device convey information to the destination device over respective first and second time intervals that do not overlap with one another.

According to additional embodiments, at least one of said first and second auxiliary devices is attached to, installed and/or positioned in/on a building; and according to yet other embodiments, at least one of said first and second auxiliary devices is attached to and/or situated/positioned on a person.

In accordance with some embodiments, the first and second auxiliary devices convey information to the destination device using respective first and second frequency sets that are at least partially mutually exclusive with one another.

In accordance with other embodiments, the first and second auxiliary devices convey information to the destination device using respective first and second frequency sets that are at least partially overlapping with one another.

In accordance with further embodiments, the first and second auxiliary devices convey information to the destination device using respective first and second frequency sets that are at least partially mutually exclusive with one another.

In accordance with yet additional embodiments, the first and second auxiliary devices convey information to the destination device using respective first and second frequency sets that are at least partially overlapping with one another.

According to further embodiments, said first auxiliary device and said second auxiliary device convey information to the destination device using respective first and second protocols that differ with one another.

According to some embodiments, said first auxiliary device conveys information to the destination device using a protocol and wherein said second auxiliary device conveys information to the destination device also using said protocol.

Yet, according to further embodiments, said communications system comprising the transmitter further comprises a receiver.

According to some embodiments, said destination device provides information to said receiver and/or transmitter; and according to some embodiments, the destination device provides said information to said receiver and/or transmitter via the auxiliary device.

According to some embodiments, said information comprises a determination by the destination device of a plurality of auxiliary devices that the destination device is capable of communicating with.

According to some embodiments, the auxiliary device is integrated with the destination device; and, according to other embodiments, said transmitting by the transmitter comprises wirelessly and/or non-wirelessly transmitting by the transmitter.

Further, according to some embodiments, said transmitting by the transmitter comprises a signal at a first power level and the auxiliary device transmits a signal to the destination device, responsive to having received the signal transmitted by the transmitter, at a second power level that is less than the first power level.

In accordance with some embodiments, said system comprising the transmitter further comprises the auxiliary device and/or the destination device.

Other embodiments present a method of receiving at a destination device a number of information bits that a transmitter is to convey to the destination device; wherein said number of information bits that the transmitter desires to convey to the destination device is greater than a number of information bits that the transmitter transmits; the method comprising:
  identifying at least one auxiliary device that is proximate to and/or capable of communicating with the destination device;
  informing the transmitter of the identified at least one auxiliary device that is proximate to and/or capable of communicating with the destination device;
  receiving at the destination device a signal from an auxiliary device of said at least one auxiliary device; wherein said signal that is received at the destination device from the auxiliary device comprises N bits of information and is transmitted by the auxiliary device responsive to the auxiliary device having received a signal from the transmitter conveying thereto said N bits of information; and
  augmenting by the destination device and/or by the auxiliary device said N bits of information by appending thereto L bits of information whose state corresponds to, and/or is associated with, an index of the auxiliary device that relays to the destination device the signal comprising said N bits of information;
  wherein the transmitter desires to convey said N bits of information to the destination device and further desires to convey said L bits of information to the destination device in addition to said N bits of information;
  wherein responsive to said L bits of information that the transmitter desires to convey to the destination device, the transmitter selects the auxiliary device of said at least one auxiliary device such that an index thereof corresponds to, and/or is associated with, the state of said L bits of information;
  wherein the transmitter transmits a signal comprising said N bits of information to the selected auxiliary device while refraining from transmitting to the selected auxiliary device any of said L bits of information; and
  wherein L≥1 and N≥0.

According to some embodiments, the destination device receives said N bits of information and said L bits of information by communicating with the auxiliary device and does not receive any of said N bits of information and any of said L bits of information directly from the transmitter.

In accordance with some embodiments, said at least one auxiliary device comprises M auxiliary devices, wherein $M≥2^L≥2$; and wherein the index of the auxiliary device that is selected by the transmitter, is associated with the state of said L bits that the transmitter desires to convey to the destination device; wherein said state of said L bits is one of $2^L$ different states, and wherein said at least one auxiliary device comprises at least $2^L$ different auxiliary devices each one of which is associated with a different one of at least $2^L$ different indices that respectively correspond to said $2^L$ different states of said L bits.

According to some embodiments, one or more auxiliary devices of said at least one auxiliary device are proximate to the destination device; and, according to some embodiments, said proximate to the destination device comprises being on a person who is using the destination device.

According to further embodiments, said signal that is transmitted by said auxiliary device comprises information received at the auxiliary device from the transmitter;

wherein said transmitter selects an auxiliary device of said at least one auxiliary device by associating said state of said L bits that the transmitter desires to transmit to the destination device with said index of said auxiliary device that the transmitter selects; and wherein said index of said auxiliary device that the transmitter selects is predetermined to be associated with said state of said L bits.

According to additional embodiments, said augmenting by the destination device and/or by the auxiliary device said N bits of information by appending thereto L bits of information comprises:

forming by the destination device and/or by the auxiliary device a sequence of bits comprising N+L bits that the transmitter intended to convey to the destination device.

According to yet other embodiments, said auxiliary device and/or said destination device augment/augments said N bits by appending thereto at least some of said L bits at an end of said N bits and/or by appending thereto at least some of said L bits at a distance from the end of said N bits.

In accordance with some embodiments, said auxiliary device and/or said destination device augment/augments said N bits by appending thereto at least some of said L bits at a beginning of said N bits and/or by appending thereto at least some of said L bits at a distance from the beginning of said N bits.

In accordance with yet additional embodiments, said auxiliary device and/or said destination device augment/augments said N bits by appending thereto at least some of said L bits at a location thereof beyond a beginning but before an end of said N bits and/or by appending thereto at least some of said L bits at a location thereof prior to the beginning and/or following the end of said N bits.

In accordance with further embodiments, said auxiliary device and/or said destination device augment/augments said N bits by appending thereto at least some of said L bits over a plurality of different non-contiguous locations of said N bits.

According to some embodiments, said augmenting by the destination device and/or by the auxiliary device said N bits of information by appending thereto L bits of information comprises:

forming by the destination device and/or by the auxiliary device a sequence of bits comprising N+L bits that the transmitter intended to convey to the destination device.

According to other embodiments, said destination device and/or said auxiliary device augment/augments said N bits by appending thereto at least some of said L bits at an end of said N bits and/or by appending thereto at least some of said L bits at a distance from the end of said N bits; wherein said distance from the end of said N bits comprises a distance following said end and/or a distance prior to said end.

According to additional embodiments, said destination device and/or said auxiliary device augment/augments said N bits by appending thereto at least some of said L bits at a beginning of said N bits and/or by appending thereto at least some of said L bits at a distance from the beginning of said N bits; wherein said distance from the beginning of said N bits comprises a distance following said beginning and/or a distance prior to said beginning.

According to further embodiments, said destination device and/or said auxiliary device augment/augments said N bits by appending thereto at least some of said L bits at a location thereof beyond a beginning but before an end of said N bits and/or by appending thereto at least some of said L bits at a location thereof prior to the beginning and/or following the end of said N bits.

According to yet additional embodiments, said destination device and/or said auxiliary device augment/augments said N bits by appending thereto at least some of said L bits over a plurality of different non-contiguous locations of said N bits.

According to some embodiments, the signal that is received at the destination device from the auxiliary device comprises at least one frequency that is mutually exclusive to frequencies used for cellular communications.

In accordance with some embodiments, the signal that is received at the destination device from the auxiliary device comprises frequencies that are used for cellular communications.

In accordance with further embodiments, the signal that is received at the destination device from the auxiliary device is based upon a protocol that differs from a protocol used by said transmitter to transmit said signal comprising said N bits of information to the selected auxiliary device.

In accordance with yet additional embodiments, the signal that is received at the destination device from the auxiliary device is based upon a protocol that is used by said transmitter to transmit said signal comprising said N bits of information to the selected auxiliary device.

In accordance with some embodiments, the method further comprises: providing privacy, security and/or encryption by conveying to the destination device said N bits of information and said L bits of information via a transmission that is limited to only said N bits of information;

wherein L≥1 and N≥0.

According to some embodiments, said at least one auxiliary device comprises a first auxiliary device and a second auxiliary device; wherein the destination device is connected to, and communicates with, the first auxiliary device and receives information from said first auxiliary device; and wherein the destination device is also connected to, and communicates with, the second auxiliary device and receives information from said second auxiliary device.

According to additional embodiments, said destination device receives information from said first auxiliary device and from said second auxiliary device over respective first and second time intervals that overlap with one another at least partially.

According to further embodiments, said destination device receives information from said first auxiliary device and from said second auxiliary device over respective first and second time intervals that do not overlap with one another.

According to yet additional embodiments, at least one of said first and second auxiliary devices is attached to, installed and/or positioned in/on, a building; and, in accordance with some embodiments, at least one of said first and second auxiliary devices is attached to, and/or is situated on, a person.

According to some embodiments, said destination device receives information from said first and second auxiliary devices using respective first and second frequency sets that are at least partially mutually exclusive with one another.

According to other embodiments, said destination device receives information from said first and second auxiliary devices using respective first and second frequency sets that are at least partially overlapping with one another.

According to further embodiments, said destination device receives information from said first and second auxiliary devices using respective first and second frequency sets that are at least partially mutually exclusive with one another.

According to additional embodiments, said destination device receives information from said first and second auxiliary devices using respective first and second frequency sets that are at least partially overlapping with one another.

According to yet other embodiments, said identifying and said informing is performed by the destination device, by said transmitter, by a base station that is associated with said transmitter and/or by one or more auxiliary devices of said at least one auxiliary device.

According to some embodiments, one or more auxiliary devices of said at least one auxiliary device is integrated with the destination device.

According to yet other embodiments, the destination device receives information from at least one auxiliary device over first and second time intervals that overlap with one another at least partially, receives information from at least one auxiliary device over third and fourth time intervals that do not overlap with one another, receives information from at least one auxiliary device via first and second protocols that differ from one another or are the same with one another, receives information from at least one auxiliary device via first and second frequency sets whose frequencies are at least partially mutually exclusive with one another and/or receives information via third and fourth frequency sets comprising at least one frequency that is common with one another.

According to further embodiments, the destination device receives information indirectly from the transmitter via said auxiliary device and also receives information directly from the transmitter.

According to yet additional embodiments, the destination device receives information directly from the transmitter via frequencies of a cellular frequency band and receives information indirectly from the transmitter via said auxiliary device via frequencies that are at least partially mutually exclusive to frequencies of said cellular frequency band.

According to some other embodiments, the destination device receives information directly from the transmitter and receives information indirectly from the transmitter concurrently with one another.

According to some embodiments, the destination device receives information directly from the transmitter via frequencies of a cellular frequency band and receives information indirectly from the transmitter via said auxiliary device via frequencies of said cellular frequency band.

In accordance with further embodiments, the destination device receives information directly from the transmitter and further receives information indirectly from the transmitter, via said auxiliary device, concurrently with receiving information directly from the transmitter.

In accordance with additional embodiments, the destination device receives first information and receives second information, concurrently with one another, from respective first and second auxiliary devices of said at least one auxiliary device.

In accordance with yet additional embodiments, the destination device comprises a smartphone.

According to some embodiments, a communications system is provided comprising a destination device;
wherein the destination device comprises a processor that is configured to control the destination device to perform operations comprising:
identifying at least one auxiliary device that is proximate to and/or is capable of communicating with the destination device;
informing a transmitter of the identified at least one auxiliary device that is proximate to and/or is capable of communicating with the destination device;
receiving at the destination device a signal from an auxiliary device of said at least one auxiliary device; wherein said signal that is received at the destination device from the auxiliary device comprises N bits of information and is transmitted by the auxiliary device responsive to the auxiliary device having received a signal from the transmitter conveying thereto said N bits of information; and
augmenting by the destination device and/or by the auxiliary device said N bits of information by appending thereto L bits of information whose state corresponds to, and/or is associated with, an index of the auxiliary device that has conveyed said N bits of information to the destination device;
wherein the transmitter desires to convey said N bits of information to the destination device and further desires to convey said L bits of information, in addition to said N bits of information, to the destination device;
wherein responsive to the state of said L bits of information that the transmitter desires to convey to the destination device, the transmitter selects an auxiliary device of the at least one auxiliary device such that an index thereof corresponds to, and/or is associated with, said state of said L bits of information;
wherein the transmitter transmits a signal comprising said N bits of information to the selected auxiliary device while refraining from transmitting to the selected auxiliary device any of said L bits of information; and
wherein $L \geq 1$ and $N \geq 0$.

According to further embodiments, the destination device receives N bits of information and L bits of information by communicating with the auxiliary device and does not receive any of said N bits of information and L bits of information directly from the transmitter.

According to additional embodiments, said at least one auxiliary device comprises M auxiliary devices, wherein $M \geq 2^L \geq 2$; and wherein the index of the auxiliary device that is selected by the transmitter, is associated with the state of said L bits that the transmitter desires to convey to the destination device; wherein said state of said L bits is one of $2^L$ different states, and wherein said at least one auxiliary device comprises at least $2^L$ different auxiliary devices each one of which is associated with a different one of at least $2^L$ different indices that respectively correspond to said $2^L$ different states of said L bits.

According to yet other embodiments, one or more auxiliary devices of said at least one auxiliary device are proximate to the destination device; and, according with some embodiments, said proximate to the destination device comprises being on a person who is using the destination device.

In accordance with some embodiments, said signal that is received at the destination device from the auxiliary device comprises the N bits of information that are received by the auxiliary device from the transmitter; wherein the transmitter selects an auxiliary device of said at least one auxiliary device based on an association of said state of said L bits with said index of said auxiliary device; and wherein said index of said auxiliary device is predetermined to be associated with said state of said L bits.

In accordance with other embodiments, said augmenting by the destination device and/or by the auxiliary device said N bits of information by appending thereto L bits of information comprises:

forming by the destination device and/or by the auxiliary device a sequence of bits comprising N+L bits that the transmitter intended to convey to the destination device.

In accordance with additional embodiments, said auxiliary device and/or said destination device augment/augments said N bits by appending thereto at least some of said L bits at an end of said N bits and/or by appending thereto at least some of said L bits at a distance from the end of said N bits.

In accordance with further embodiments, said auxiliary device and/or destination device augment/augments said N bits by appending thereto at least some of L bits at a beginning of said N bits and/or by appending thereto at least some of said L bits at a distance from the beginning of said N bits.

In accordance with yet more embodiments, said auxiliary device and/or said destination device augment/augments said N bits by appending thereto at least some of said L bits at a location thereof beyond a beginning but before an end of said N bits and/or by appending thereto at least some of said L bits at a location thereof prior to the beginning and/or following the end of said N bits.

In accordance with yet additional embodiments, said auxiliary device and/or said destination device augment/augments said N bits by appending thereto at least some of said L bits over a plurality of different non-contiguous locations of said N bits.

According to some embodiments, said augmenting by the destination device and/or by the auxiliary device said N bits of information by appending thereto L bits of information comprises:

forming by the destination device and/or by the auxiliary device a sequence of bits comprising N+L bits that the transmitter intended to convey to the destination device.

According with further embodiments, said destination device and/or said auxiliary device augment/augments said N bits by appending thereto at least some of said L bits at an end of said N bits and/or by appending thereto at least some of said L bits at a distance from the end of said N bits; wherein said distance from the end of said N bits comprises a distance following said end and/or a distance prior to said end.

According to additional embodiments, said destination device and/or said auxiliary device augment/augments said N bits by appending thereto at least some of said L bits at a beginning of said N bits and/or by appending thereto at least some of said L bits at a distance from the beginning of said N bits; wherein said distance from the beginning of said N bits comprises a distance following said beginning and/or a distance prior to said beginning.

According to yet further embodiments, said destination device and/or said auxiliary device augment/augments said N bits by appending thereto at least some of said L bits at a location thereof beyond a beginning but before an end of said N bits and/or by appending thereto at least some of said L bits at a location thereof prior to the beginning and/or following the end of said N bits.

According to some embodiments, said destination device and/or said auxiliary device augment/augments said N bits by appending thereto at least some of said L bits over a plurality of different non-contiguous locations of said N bits.

In accordance with some additional embodiments, the signal that is received at the destination device from the auxiliary device comprises at least one frequency that is mutually exclusive to frequencies that the Federal Communications Commission (FCC) has allocated for use by cellular communications systems in the United States.

In accordance with further embodiments, the signal that is received at the destination device from the auxiliary device comprises frequencies that the Federal Communications Commission (FCC) has allocated for use by cellular communications systems in the United States.

In accordance with yet other embodiments, the signal that is received at the destination device from the auxiliary device is based upon a protocol that differs from a protocol used by said transmitter to transmit said signal comprising said N bits of information to the selected auxiliary device.

Yet, in accordance with more embodiments, the signal that is received at the destination device from the auxiliary device is based upon a protocol that is used by said transmitter to transmit said signal comprising said N bits of information to the selected auxiliary device.

According to some embodiments, the destination device provides privacy, security and/or encryption by receiving said N bits of information and said L bits of information via a transmission by the transmitter that is limited to only said N bits of information;

wherein L≥1 and N≥0.

According to further embodiments, the destination device is connected to, and communicates with, a first auxiliary device of said at least one auxiliary device, and receives information from said first auxiliary device; and wherein the destination device is also connected to, and communicates with, a second auxiliary device of said at least one auxiliary device and receives information from said second auxiliary device.

According to various other embodiments, said destination device receives information from said first auxiliary device and from said second auxiliary device over respective first and second time intervals that overlap with one another at least partially.

According to yet additional embodiments, said destination device receives information from said first auxiliary device and from said second auxiliary device over respective first and second time intervals that do not overlap with one another.

Yet, according to further embodiments, at least one of said first and second auxiliary devices is attached to, installed and/or positioned in/on, a building; and, according to some embodiments, at least one of said first and second auxiliary devices is attached to, and/or is situated on, a person.

According to even more embodiments, said destination device receives information from said first and second auxiliary devices using respective first and second frequency sets that are at least partially mutually exclusive with one another.

In accordance with some embodiments, said destination device receives information from said first and second auxiliary devices using respective first and second frequency sets that are at least partially overlapping with one another.

In accordance with additional embodiments, said destination device receives information from said first and second auxiliary devices using respective first and second frequency sets that are at least partially mutually exclusive with one another.

According to yet other embodiments, said destination device receives information from said first and second auxiliary devices using respective first and second frequency sets that are at least partially overlapping with one another.

According to some embodiments, said identifying and said informing is performed by the destination device, by said transmitter, by a base station that is associated with said transmitter and/or by one or more auxiliary devices of said at least one auxiliary device; and, in accordance with some embodiments, the destination device is integrated with said auxiliary device of said at least one auxiliary device.

Accordance to other embodiments, the destination device receives information from at least one auxiliary device over first and second time intervals that overlap with one another at least partially, receives information from at least one auxiliary device over third and fourth time intervals that do not overlap with one another, receives information from at least one auxiliary device via first and second protocols that differ from one another or are the same with one another, receives information from at least one auxiliary device via first and second frequency sets whose frequencies are at least partially mutually exclusive with one another and/or receives information via third and fourth frequency sets comprising at least one frequency that is common with one another.

In accordance with further embodiments, the destination device receives information indirectly from the transmitter via said auxiliary device and also receives information directly from the transmitter.

In accordance with yet additional embodiments, the destination device receives information directly from the transmitter via frequencies of a cellular frequency band and receives information indirectly from the transmitter via said auxiliary device via frequencies that are at least partially mutually exclusive to frequencies of said cellular frequency band.

Yet, in accordance with more embodiments, the destination device receives information directly from the transmitter and receives information indirectly from the transmitter concurrently with receiving information directly from the transmitter.

According to some embodiments, the destination device receives information directly from the transmitter via frequencies of a cellular frequency band and receives information indirectly from the transmitter via said auxiliary device via frequencies of said cellular frequency band.

According to other embodiments, the destination device receives information directly from the transmitter and receives information indirectly from the transmitter concurrently with receiving information directly from the transmitter.

According to additional embodiments, the destination device receives first information and receives second information, concurrently with one another, from respective first and second auxiliary devices of said at least one auxiliary device.

According to further embodiments, the destination device comprises a smartphone; and, according to yet other embodiments, the communications system being provided comprises the auxiliary device; yet further, according to other embodiments, the auxiliary device comprises a smartphone.

According to some embodiments, said operations further comprise:
identifying at least one new auxiliary devise responsive to the destination device having changed position, responsive to an interference level, responsive to a quality-of-service concern and/or responsive to one or more auxiliary devices of said at least one auxiliary device having changed position; and wherein, according to some embodiments, said at least one new auxiliary devise comprises an auxiliary device that was not included in said at least one auxiliary device.

In accordance with some embodiments, said destination device communicates with said first auxiliary device using a first protocol and communicates with said second auxiliary device using a second protocol that differs from the first protocol.

In accordance with other embodiments, said destination device communicates with said first auxiliary device using a protocol and further communicates with said second auxiliary device using the protocol.

According to some embodiments, the destination device communicates directly with the transmitter using a 4G-LTE protocol comprising an Orthogonal Frequency Division Multiplexed (OFDM), Orthogonal Frequency Division Multiple Access (OFDMA) and/or Single Carrier Frequency Division Multiple Access (SC-FDMA) air interface and communicates indirectly with the transmitter via the auxiliary device using a protocol that differs from said 4G-LTE protocol and/or from said Orthogonal Frequency Division Multiplexed (OFDM), Orthogonal Frequency Division Multiple Access (OFDMA) and/or Single Carrier Frequency Division Multiple Access (SC-FDMA) air interface.

According to other embodiments, the destination device communicates directly with the transmitter using a 4G-LTE protocol comprising an Orthogonal Frequency Division Multiplexed (OFDM), Orthogonal Frequency Division Multiple Access (OFDMA) and/or Single Carrier Frequency Division Multiple Access (SC-FDMA) air interface and communicates indirectly with the transmitter via the auxiliary device using said 4G-LTE protocol and/or said Orthogonal Frequency Division Multiplexed (OFDM), Orthogonal Frequency Division Multiple Access (OFDMA) and/or Single Carrier Frequency Division Multiple Access (SC-FDMA) air interface.

According to additional embodiments, said operations further comprise:
establishing a direct wireless link between the destination device and the transmitter and informing, via said direct wireless link, the transmitter of said identified at least one auxiliary device and/or establishing an indirect wireless link between the destination device and the transmitter, via at least one auxiliary device, and informing the transmitter via said indirect link of said identified at least one auxiliary device.

According to further embodiments, a power level used by the destination device over said direct wireless link exceeds a power level used by the destination device over said indirect wireless link.

According to some embodiments, a method is provided for conveying by a transmitter, to a destination device, N bits of information and, further to said N bits of information, conveying by the transmitter to the destination device an additional L bits of information, while limiting the transmitter to only transmit said N bits of information; the method comprising:
responsive to a state of said L bits of information, selectively receiving at an auxiliary device whose index is associated with said state of said L bits of information, a signal that has been transmitted by the transmitter selectively for reception only by said auxiliary device; said signal that has been transmitted by the transmitter selectively for reception only by said auxiliary device comprising said N bits of information that the transmitter desires to convey to the destination device and being devoid of said L bits of information that the transmitter also desires to convey to the destination device; and
transmitting by the auxiliary device a signal comprising said N bits of information responsive to having received at the auxiliary device said signal comprising said N bits of information and being devoid of said L bits of information;

wherein the auxiliary device that selectively receives the signal comprising said N bits of information is selected responsive to said index of said auxiliary device corresponding to, and being associated with, said state of said L bits of information that the transmitter desires to convey to the destination device;

wherein the auxiliary device and/or the destination device append/appends said N bits of information with at least some bits of said L bits of information responsive to having received the signal comprising said N bits of information and responsive to said index of the auxiliary device that is associated with said state of said L bits of information; and wherein L≥1 and N≥0.

In accordance with other embodiments, the auxiliary device determines that it has received from the transmitter said N bits of information and, further, said L bits of information, in addition to the N bits of information, even though the signal transmitted by the transmitter and received at the auxiliary device comprises said N bits of information and is devoid of said L bits of information; wherein the auxiliary device determines that it has received from the transmitter said N bits of information and, in addition to the N bits of information, said L bits of information, responsive to the auxiliary device having been selected to receive said signal that comprises said N bits of information even though said signal comprising said N bits of information is devoid of said L bits of information; and wherein said transmitting by the auxiliary device a signal comprising said N bits of information comprises: transmitting by the auxiliary device a signal comprising said N bits of information and/or at least some bits of said L bits of information.

In accordance with further embodiments, said auxiliary device is an auxiliary device of a plurality of auxiliary devices comprising M auxiliary devices, wherein M≥$2^L$≥2; and wherein the index of the auxiliary device that is involved in said selectively receiving is associated with the state of said L bits that the transmitter desires to convey to the destination device; wherein said state of said L bits is one of $2^L$ different states, and wherein said plurality of auxiliary devices comprises at least $2^L$ different auxiliary devices each one of which is associated with a different one of at least $2^L$ different indices that respectively correspond to said $2^L$ different states of said L bits.

In accordance with yet other embodiments, at least one of the plurality of auxiliary devices is proximate to the destination device; and, according to additional embodiments, said proximate to the destination device comprises being on a person who is using the destination device.

According to additional embodiments, said signal that is transmitted by said auxiliary device comprises information received at the auxiliary device from the transmitter; wherein said selectively receiving at an auxiliary device comprises associating by the transmitter said state of said L bits that the transmitter desires to transmit to the destination device with said index of said auxiliary device; and wherein said index of said auxiliary device is predetermined to be associated with said state of said L bits.

According to further embodiments, it is predetermined that, responsive to the auxiliary device having transmitted said signal comprising said N bits of information and responsive to the destination device having received said signal transmitted by the auxiliary device, said destination device is to augment said N bits conveyed by said signal received at the destination device by at least some bits of said L bits.

According to yet additional embodiments, the signal that is transmitted by the auxiliary device comprises at least one frequency that is mutually exclusive to frequencies used for cellular communications.

According to some embodiments, the signal that is transmitted by the auxiliary device comprises frequencies used for cellular communications.

According to further embodiments, the signal that is transmitted by the auxiliary device is based upon a protocol that differs from a protocol used by said transmitter to transmit said signal comprising said N bits of information to the selected auxiliary device.

Yet further, according to some embodiments, the signal that is transmitted by the auxiliary device is based upon a protocol that is used by said transmitter to transmit said signal comprising said N bits of information to the selected auxiliary device.

In accordance with additional embodiments, the method provided further comprises:

providing privacy, security and/or encryption by conveying to the destination device N bits of information and L bits of information via a reception at the auxiliary device that is limited to only N bits of information;

wherein L≥1 and N≥0.

In accordance with further embodiments, said auxiliary device comprises a first auxiliary device and a second auxiliary device; wherein the first auxiliary device is connected to, and communicates with, the destination device and transmits/receives information to/from the destination device; and wherein the second auxiliary device is also connected to, and communicates with, the destination device and transmits/receives information to/from the destination device.

In accordance with some embodiments, said first auxiliary device and said second auxiliary device transmit/receive information to/from the destination device over respective first and second time intervals that overlap with one another at least partially.

In accordance with yet other embodiments, said first auxiliary device and said second auxiliary device transmit/receive information to/from the destination device over respective first and second time intervals do not overlap with one another.

In accordance with additional embodiments, at least one of said first and second auxiliary devices is attached to, installed and/or positioned in/on, a building; and, in accordance with yet further embodiments, at least one of said first and second auxiliary devices is attached to, and/or is situated on, a person.

According to further embodiments, said first and second auxiliary devices transmit/receive information to/from the destination device using respective first and second frequency sets that are at least partially mutually exclusive with one another.

According to some other embodiments, said first and second auxiliary devices transmit/receive information to/from the destination device using respective first and second frequency sets that are at least partially overlapping with one another.

According to additional embodiments, said first and second auxiliary devices transmit/receive information to/from the destination device using respective first and second frequency sets that are at least partially mutually exclusive with one another.

According to yet more embodiments, said first and second auxiliary devices transmit/receive information to/from the destination device using respective first and second frequency sets that are at least partially overlapping with one another.

According to yet further embodiments, the auxiliary device whose index is associated with said state of said L bits of information is selected by the destination device, by said transmitter, by a base station that is associated with said transmitter and/or by one or more auxiliary devices of a plurality of auxiliary devices.

In accordance with some embodiments, the auxiliary device is integrated with the destination device.

Yet further, in accordance with additional embodiments, said auxiliary device comprises at least one auxiliary device; and the method provided further comprises:

transmitting/receiving information by the at least one auxiliary device to/from the destination device and/or the transmitter over first and second time intervals that overlap with one another at least partially;

transmitting/receiving information by the at least one auxiliary device to/from the destination device and/or the transmitter over third and fourth time intervals that do not overlap with one another;

transmitting/receiving information by the at least one auxiliary device to/from the destination device and/or the transmitter via first and second protocols that differ from one another or are the same with one another;

transmitting/receiving information by the at least one auxiliary device to/from the destination device and/or the transmitter via first and second frequency sets whose frequencies are at least partially mutually exclusive with one another, and/or transmitting/receiving information by the at least one auxiliary device to/from the destination device and/or the transmitter via third and fourth frequency sets comprising at least one common frequency with one another.

According to some embodiments, the auxiliary device receives information directly from the transmitter and also receives information directly from the destination device.

According to other embodiments, the auxiliary device transmits/receives information directly to/from the transmitter via frequencies of a cellular frequency band and transmits/receives information directly to/from the destination device via frequencies that are at least partially mutually exclusive with frequencies of said cellular frequency band.

According to further embodiments, the auxiliary device transmits/receives information directly to/from the transmitter and transmits/receives information directly to/from the destination device concurrently with one another.

According to additional embodiments, the auxiliary device transmits/receives information directly to/from the transmitter via frequencies of a cellular frequency band and transmits/receives information directly to/from the destination device via frequencies of said cellular frequency band.

According to yet other embodiments, said auxiliary device comprises first and second auxiliary devices; and wherein said first and second auxiliary devices transmit/receive concurrently with one another.

Further, according to additional embodiments, the auxiliary device comprises a smartphone.

According to some embodiments, a communications system is provided comprising:

an auxiliary device that comprises a processor that is configured to control the auxiliary device to perform operations comprising:

storing information received from a destination device and/or a transmitter regarding a value of an index associated with the auxiliary device;

receiving from the transmitter, a signal comprising N bits of information that the transmitter desires to convey to the destination device; said signal comprising said N bits of information having been transmitted by said transmitter so as to be received by said auxiliary device only; wherein the auxiliary device receives from the transmitter said signal comprising said N bits of information responsive to L bits of information, other than said N bits of information, that the transmitter also desires to convey to the destination device and responsive to said value of said index associated with said auxiliary device; and transmitting a signal comprising said N bits of information responsive to having received the signal from the transmitter comprising said N bits of information;

wherein the auxiliary device receives the signal comprising said N bits of information responsive to said index of said auxiliary device corresponding to, and being associated with, said state of said L bits of information that the transmitter also desires to convey to the destination device in addition to said N bits of information;

wherein the auxiliary device and/or the destination device append/appends said N bits of information with at least some bits of said L bits of information responsive to having received said N bits of information and/or responsive to said index of the auxiliary device; and wherein $L \geq 1$ and $N \geq 0$.

In accordance with additional embodiments, the auxiliary device determines that it has received N bits of information and L bits of information, in addition to the N bits of information, from the transmitter, even though the auxiliary device receives said signal comprising said N bits of information and devoid of said L bits of information;

wherein the auxiliary device determines that it has received N bits of information and L bits of information, in addition to the N bits of information, responsive to the auxiliary device having been selected by the transmitter to receive said signal comprising said N bits of information; and wherein said transmitting a signal comprising said N bits of information comprises:

transmitting by the auxiliary device a signal comprising said N bits of information and/or at least some bits of said L bits of information.

In accordance with yet other embodiments, said auxiliary device is an auxiliary device of a plurality of auxiliary devices comprising M auxiliary devices, wherein $M \geq 2^L \geq 2$; and wherein the value of the index that is associated with the auxiliary device is also associated with said state of said L bits; wherein said state of said L bits is one of $2^L$ different states, and wherein said plurality of auxiliary devices comprises at least $2^L$ different auxiliary devices each one of which is associated with a different one of at least $2^L$ different indices that respectively correspond to said $2^L$ different states of said L bits.

According to yet further embodiments, at least one auxiliary device of the plurality of auxiliary devices is proximate to the destination device; and, wherein, according to some embodiments, said proximate to the destination device comprises being on a person who is using the destination device.

According to additional embodiments, said transmitting a signal comprising said N bits of information comprises information received at the auxiliary device from the transmitter wherein said receiving from a transmitter comprises associating by the transmitter said state of said L bits with said value of said index of the auxiliary device; and wherein said value of said index of the auxiliary device is predetermined to be associated with said state of said L bits.

Yet, according to more embodiments, it is predetermined that, responsive to the auxiliary device having transmitted said signal comprising said N bits of information and responsive to the destination device having received said signal that has been transmitted by the auxiliary device comprising said N bits of information, said destination device is to augment/append said N bits by/with at least some bits of said L bits.

Further to the above, according to other embodiments, said transmitting a signal comprises transmitting at least one frequency that is mutually exclusive to frequencies used for said receiving.

In accordance with various other embodiments, said transmitting a signal comprises frequencies that are used for cellular communications.

In accordance with further embodiments, said transmitting a signal comprises a protocol that differs from a protocol used in said receiving.

In accordance with yet additional embodiments, said transmitting a signal comprises a protocol and wherein said receiving comprises the protocol.

According to further embodiments, the auxiliary device provides privacy, security and/or encryption by conveying to the destination device said N bits of information and also said L bits of information via a reception at the auxiliary device that is limited to only said N bits of information;

wherein L≥1 and N≥0.

According to some embodiments, said auxiliary device comprises a first and a second auxiliary device; wherein the first auxiliary device is connected to, and communicates with, the destination device and transmits/receives information to/from the destination device; and wherein the second auxiliary device is also connected to, and communicates with, the destination device and transmits/receives information to/from the destination device.

According to yet other embodiments, said first auxiliary device and said second auxiliary device transmit/receive information to/from the destination device over respective first and second time intervals that overlap with one another at least partially.

According to additional embodiments, said first auxiliary device and said second auxiliary device transmit/receive information to/from the destination device over respective first and second time intervals do not overlap with one another.

Yet according to further embodiments, at least one of said first and second auxiliary devices is attached to, installed and/or positioned in/on, a building; and, in accordance with some embodiments, at least one of said first and second auxiliary devices is attached to, and/or is situated on, a person.

According to even more embodiments, said first and second auxiliary devices transmit/receive information to/from the destination device using respective first and second frequency sets that are at least partially mutually exclusive with one another.

Still according to additional embodiments, said first and second auxiliary devices transmit/receive information to/from the destination device using respective first and second frequency sets that are at least partially overlapping with one another.

Further, in accordance with still more embodiments, said first and second auxiliary devices transmit/receive information to/from the destination device using respective first and second frequency sets that are at least partially mutually exclusive with one another.

According to further embodiments, said first and second auxiliary devices transmit/receive information to/from the destination device using respective first and second frequency sets that are at least partially overlapping with one another.

According to yet additional embodiments, the auxiliary device whose index value is associated with said state of said L bits of information is selected by the destination device, by said transmitter, by a base station that is associated with said transmitter and/or by one or more auxiliary devices of a plurality of auxiliary devices.

Further embodiments provide configurations wherein the auxiliary device is integrated with the destination device.

According to some embodiments, said auxiliary device comprises at least one auxiliary device and wherein said operations further comprise:

transmitting/receiving information by the at least one auxiliary device to/from the destination device and/or the transmitter over first and second time intervals that overlap with one another at least partially;

transmitting/receiving information by the at least one auxiliary device to/from the destination device and/or the transmitter over third and fourth time intervals that do not overlap with one another;

transmitting/receiving information by the at least one auxiliary device to/from the destination device and/or the transmitter via first and second protocols that differ from one another or are the same with one another;

transmitting/receiving information by the at least one auxiliary device to/from the destination device and/or the transmitter via first and second frequency sets whose frequencies are at least partially mutually exclusive with one another; and/or transmitting/receiving information by the at least one auxiliary device to/from the destination device and/or the transmitter via third and fourth frequency sets comprising at least one common frequency with one another.

According to yet other embodiments, the auxiliary device transmits/receives information directly to/from the transmitter and also transmits/receives information directly to/from the destination device.

According to further embodiments, the auxiliary device transmits/receives information directly to/from the transmitter via frequencies of a cellular frequency band and transmits/receives information directly to/from the destination device via frequencies that are at least partially mutually exclusive with frequencies of said cellular frequency band.

And, in accordance with additional embodiments, the auxiliary device transmits/receives information directly to/from the transmitter and transmits/receives information directly to/from the destination device concurrently with one another.

Many other embodiments are possible; according to one embodiment of said many other embodiments, the auxiliary device transmits/receives information directly to/from the transmitter via frequencies of a cellular frequency band and transmits/receives information directly to/from the destination device via frequencies of said cellular frequency band.

In accordance with another embodiment, said auxiliary device comprises first and second auxiliary devices; wherein said first and second auxiliary devices transmit/receive concurrently with one another.

In accordance with yet a further embodiment, the system provided includes the auxiliary device which comprises a smartphone; and, still further, in accordance with another embodiment, the system provided comprises the destination device. Many different embodiments, besides those described herein, are possible in connection with the above description and drawing(s). It will be understood that it would be unduly repetitious and obfuscating to describe/illustrate every combination and sub-combination of these embodiments. Accordingly, the present specification, including the drawings and Claims, shall be construed to constitute a complete written description of all combinations and/or sub-combinations of embodiments described herein, and of the manner and process of making and using them, and shall support Claims to any such combination and/or sub-combination.

In the drawings and specification, there have been disclosed inventive concepts and embodiments associated therewith and, although specific terms may have been employed, they are used in a generic and descriptive sense only and not for purposes of limitation, the scope of the inventive concepts being set forth in the following claims.

The invention claimed is:

1. A first system that is configured to perform operations comprising:
    identifying a plurality of transmission paths, at least two of which comprise a heterogeneous difference with one another, for relaying information to a second system;
    transmitting first information to the second system by transmitting first data over a first transmission path of the plurality of transmission paths;
    transmitting second information to the second system by transmitting second data over a second transmission path of the plurality of transmission paths; and
    causing the second system to augment the first data with the second data;
    wherein the first transmission path comprises a heterogeneous difference from the second transmission path and is physically distinct from the second transmission path;
    wherein said transmitting first information to the second system by transmitting first data over a first transmission path of the plurality of transmission paths comprises transmitting the first data to a first device that is associated with said first transmission path; and then, causing the first device to relay the first data to the second system;
    wherein said transmitting second information to the second system by transmitting second data over a second transmission path of the plurality of transmission paths comprises transmitting the second data to a second device that is associated with said second transmission path; and then, causing the second device to relay the second data to the second system; and
    wherein the first device is distinct, heterogeneously different and at a distance from the second device.

2. The first system of claim 1,
    wherein the first system comprises an antenna comprising different linear polarizations including a vertical linear polarization and a horizontal linear polarization;
    wherein said transmitting first information to the second system by transmitting first data over a first transmission path of the plurality of transmission paths further comprises transmitting the first information to the second system by transmitting the first data over the first transmission path of the plurality of transmission paths using said different linear polarizations comprising said vertical linear polarization and said horizontal linear polarization;
    wherein the first system comprises a smartphone or a base station;
    wherein said transmitting first information comprises wirelessly transmitting the first information;
    wherein said transmitting second information comprises wirelessly transmitting the second information;
    wherein the first device comprises a base station; and
    wherein the second device comprises a WiFi access point.

3. The first system of claim 2,
    wherein said transmitting first information to the second system by transmitting first data over a first transmission path comprises wirelessly transmitting the first information and wirelessly transmitting the first data using a first set of frequencies; and
    wherein said transmitting second information to the second system by transmitting second data over a second transmission path comprises wirelessly transmitting the second information and wirelessly transmitting the second data using a second set of frequencies that differs from the first set of frequencies.

4. The first system of claim 3,
    wherein the first set of frequencies comprises licensed frequencies; and
    wherein the second set of frequencies that differs from the first set of frequencies comprises unlicensed frequencies.

5. The first system of claim 1,
    wherein said transmitting first information to the second system by transmitting first data over a first transmission path of the plurality of transmission paths; and said transmitting second information to the second system by transmitting second data over a second transmission path of the plurality of transmission paths occur concurrently in time with one another.

6. The first system of claim 1,
    wherein said transmitting first information to the second system by transmitting first data over a first transmission path of the plurality of transmission paths; and said transmitting information to the second system by transmitting second data over a second transmission path of the plurality of transmission paths occur sequentially in time with one another.

7. The first system of claim 6, wherein said sequentially in time with one another comprises:
    transmitting the first information to the second system by transmitting the first data over the first transmission path; and then
    transmitting the second information to the second system by transmitting the second data over the second transmission path.

8. The first system of claim 1, wherein the operations further comprise:
    selecting to transmit information to the second system by transmitting data solely over the first transmission path or by transmitting data solely over the second transmission path.

9. The first system of claim 2,
    wherein said transmitting first information to the second system by transmitting first data over a first transmission path comprises wirelessly transmitting the first information and wirelessly transmitting the first data using a first protocol or first air interface; and wherein said transmitting second information to the second system by transmitting second data over a second transmission path comprises wirelessly transmitting the second information and wirelessly transmitting the second data using a second protocol or second air interface that differs from the first protocol or first air interface.

10. The first system of claim 9,
wherein said first protocol or first air interface comprises a cellular protocol or a cellular air interface; and
wherein said second protocol or second air interface comprises a WiFi protocol or a WiFi air interface.

11. A method comprising:
identifying a plurality of transmission paths, at least two of which comprise a heterogeneous difference with one another, for relaying information from a first system to a second system;
transmitting first information by the first system to the second system by transmitting first data over a first transmission path of the plurality of transmission paths;
transmitting second information by the first system to the second system by transmitting second data over a second transmission path of the plurality of transmission paths; and
causing the second system to augment the first data with the second data;
wherein the first transmission path comprises a heterogeneous difference from the second transmission path and is physically distinct from the second transmission path;
wherein said transmitting first information by the first system to the second system by transmitting first data over a first transmission path of the plurality of transmission paths comprises transmitting the first data to a first device that is associated with said first transmission path; and then, causing the first device to relay the first data to the second system;
wherein said transmitting second information by the first system to the second system by transmitting second data over a second transmission path of the plurality of transmission paths comprises transmitting the second data to a second device that is associated with said second transmission path; and then, causing the second device to relay the second data to the second system; and
wherein the first device is distinct, heterogeneously different and at a distance from the second device.

12. The method of claim 11,
wherein the first system comprises an antenna comprising different linear polarizations including a vertical linear polarization and a horizontal linear polarization;
wherein said transmitting first information by the first system to the second system by transmitting first data over a first transmission path of the plurality of transmission paths further comprises transmitting the first information by the first system to the second system by transmitting the first data over the first transmission path of the plurality of transmission paths using said different linear polarizations comprising said vertical linear polarization and said horizontal linear polarization;
wherein the first system comprises a smartphone or a base station;
wherein said transmitting first information comprises wirelessly transmitting the first information;

wherein said transmitting second information comprises wirelessly transmitting the second information;
wherein the first device comprises a base station; and
wherein the second device comprises a WiFi access point.

13. The method of claim 12,
wherein said transmitting first information by the first system to the second system by transmitting first data over a first transmission path comprises wirelessly transmitting the first information and wirelessly transmitting the first data using a first set of frequencies; and
wherein said transmitting second information by the first system to the second system by transmitting second data over a second transmission path comprises wirelessly transmitting the second information and wirelessly transmitting the second data using a second set of frequencies that differs from the first set of frequencies.

14. The method of claim 13,
wherein the first set of frequencies comprises licensed frequencies; and
wherein the second set of frequencies that differs from the first set of frequencies comprises unlicensed frequencies.

15. The method of claim 11,
wherein said transmitting first information by the first system to the second system by transmitting first data over a first transmission path of the plurality of transmission paths; and said transmitting second information by the first system to the second system by transmitting second data over a second transmission path of the plurality of transmission paths occur concurrently in time with one another.

16. The method of claim 11,
wherein said transmitting first information by the first system to the second system by transmitting first data over a first transmission path of the plurality of transmission paths; and said transmitting second information by the first system to the second system by transmitting second data over a second transmission path of the plurality of transmission paths occur sequentially in time with one another.

17. The method of claim 16, wherein said sequentially in time with one another comprises:
transmitting the first information by the first system to the second system by transmitting the first data over the first transmission path; and then
transmitting the second information by the first system to the second system by transmitting the second data over the second transmission path.

18. The method of claim 11, further comprising:
selecting to transmit information by the first system to the second system by transmitting data solely over the first transmission path or by transmitting data solely over the second transmission path.

19. The method of claim 12,
wherein said transmitting first information by the first system to the second system by transmitting first data over a first transmission path comprises wirelessly transmitting the first information and wirelessly transmitting the first data using a first protocol or first air interface; and
wherein said transmitting second information by the first system to the second system by transmitting second data over a second transmission path comprises wirelessly transmitting the second information and wirelessly transmitting the second data using a second protocol or second air interface that differs from the first protocol or first air interface.

20. The method of claim 19,
wherein said first protocol or first air interface comprises a cellular protocol or a cellular air interface; and
wherein said second protocol or second air interface comprises a WiFi protocol or a WiFi air interface.

* * * * *